US008894215B2

(12) United States Patent
Miura

(10) Patent No.: US 8,894,215 B2
(45) Date of Patent: Nov. 25, 2014

(54) ILLUMINATION UNIT, PROJECTION DISPLAY UNIT, AND DIRECT VIEW DISPLAY UNIT

(75) Inventor: Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 13/414,817

(22) Filed: Mar. 8, 2012

(65) Prior Publication Data

US 2012/0249973 A1  Oct. 4, 2012

(30) Foreign Application Priority Data

Mar. 28, 2011  (JP) ................................ 2011-071151

(51) Int. Cl.

| | | |
|---|---|---|
| G03B 21/14 | (2006.01) | |
| F21V 5/00 | (2006.01) | |
| G02B 27/09 | (2006.01) | |
| G03B 21/20 | (2006.01) | |
| H04N 9/31 | (2006.01) | |
| G02B 27/10 | (2006.01) | |
| G02B 27/14 | (2006.01) | |

(52) U.S. Cl.
CPC ........ *G02B 27/1053* (2013.01); *G02B 27/0961* (2013.01); *G02B 27/0905* (2013.01); *G03B 21/2013* (2013.01); *H04N 9/3164* (2013.01); *G03B 21/2033* (2013.01); *G03B 21/208* (2013.01); *H04N 9/3161* (2013.01); *G02B 27/145* (2013.01)
USPC .......................................................... 353/38

(58) Field of Classification Search
USPC ................. 353/38, 102; 362/97.3, 227, 244, 362/249.02, 309, 308, 311.02, 330, 326, 362/336, 800
See application file for complete search history.

(56) References Cited

U.S. PATENT DOCUMENTS

| | | | | |
|---|---|---|---|---|
| 5,418,583 | A * | 5/1995 | Masumoto | 353/38 |
| 5,662,401 | A * | 9/1997 | Shimizu et al. | 353/38 |
| 5,786,939 | A * | 7/1998 | Watanabe | 359/621 |
| 6,604,276 | B2 * | 8/2003 | Jeong et al. | 29/610.1 |
| 7,988,300 | B2 * | 8/2011 | Matsumoto | 353/38 |
| 8,408,713 | B2 * | 4/2013 | Huang | 353/38 |
| 2005/0280783 | A1 * | 12/2005 | Yamasaki et al. | 353/94 |
| 2006/0132725 | A1 * | 6/2006 | Terada et al. | 353/102 |
| 2012/0133900 | A1 * | 5/2012 | Miura | 353/31 |
| 2014/0002801 | A1 * | 1/2014 | Miura | 353/31 |

FOREIGN PATENT DOCUMENTS

JP  2008-134324  6/2008

* cited by examiner

*Primary Examiner* — William C Dowling
(74) *Attorney, Agent, or Firm* — Dentons US LLP

(57) ABSTRACT

An illumination unit includes one or more light sources and an optical member. The optical member includes an integrator having a first fly-eye lens on which light from a solid-state light-emitting device is incident and a second fly-eye lens on which the light from the first fly-eye lens is incident. The integrator uniformalizes an illuminance distribution of light in a predetermined illumination region illuminated by the light incident from the solid-state light-emitting device. Each of the first fly-eye lens and the second fly-eye lens has a plurality of cells. The cells of the first fly-eye lens are arranged in a first direction and a second direction that intersect each other, and positions of the cells in the second direction are different from one another at least partially among a plurality of cell rows arranged along the first direction in the first fly-eye lens.

13 Claims, 35 Drawing Sheets

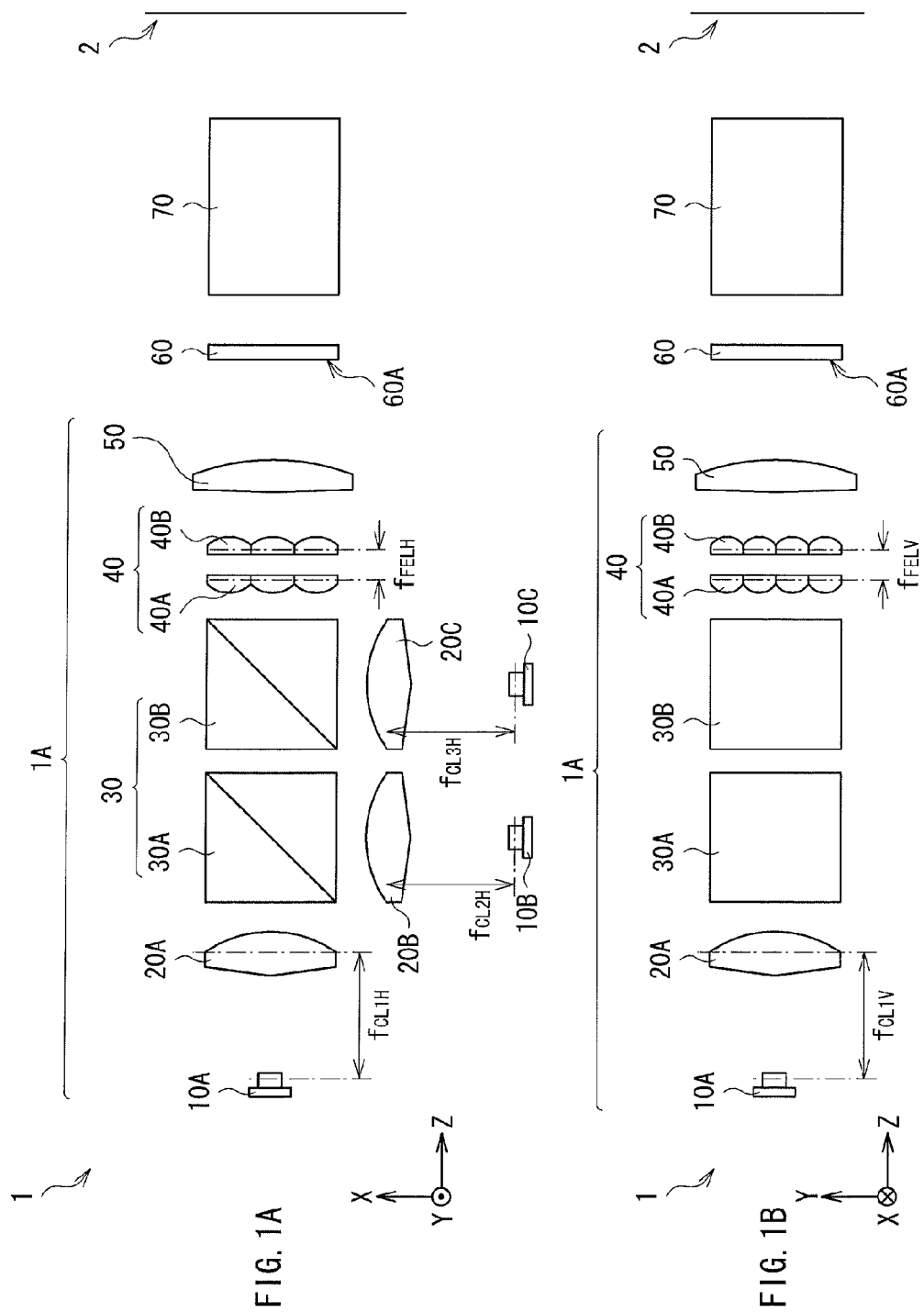

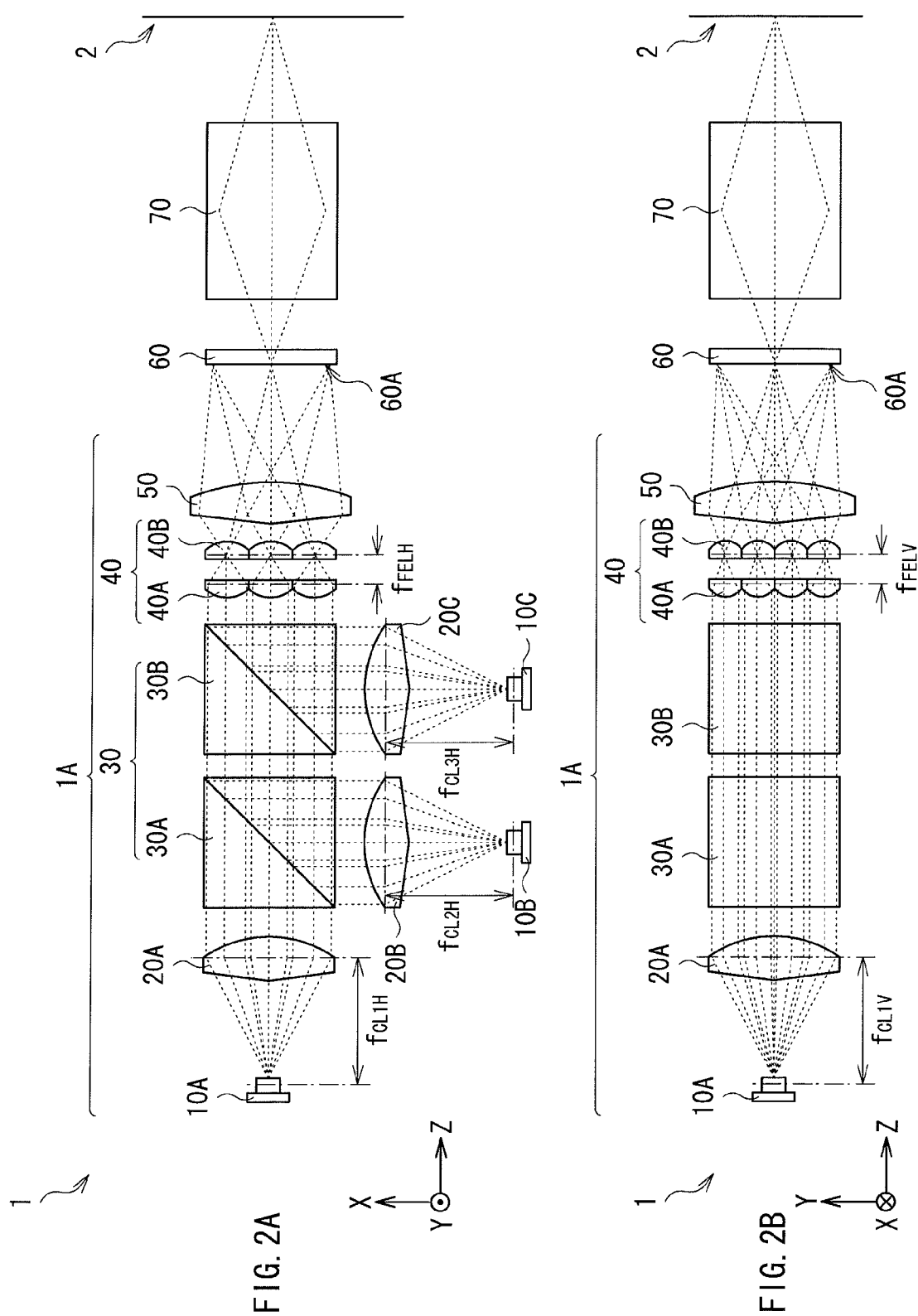

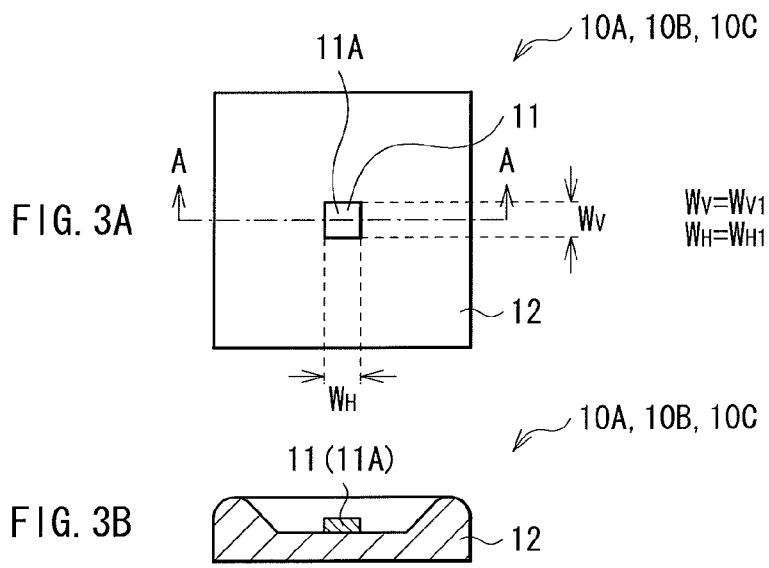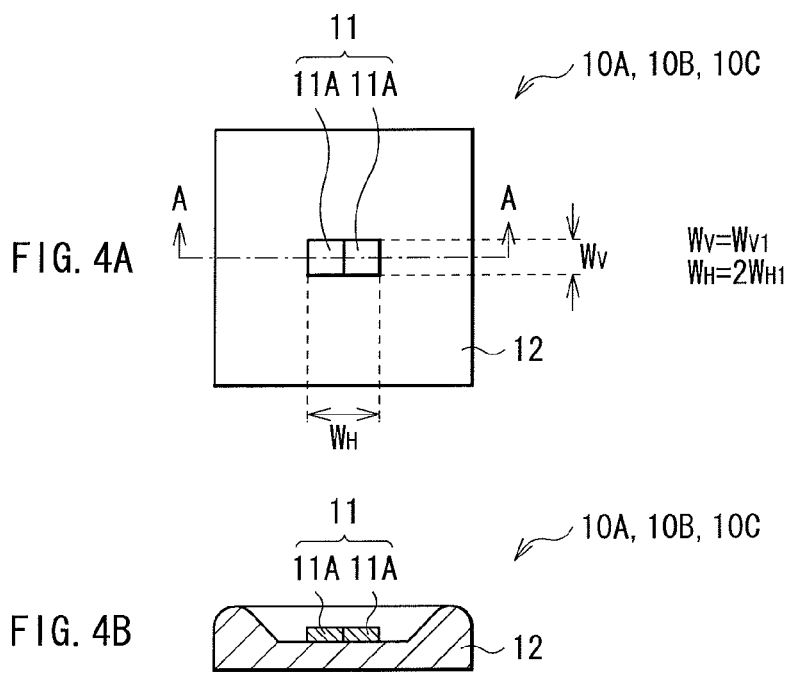

$W_V = W_{V1}$
$W_H \geq 2W_{H1}$

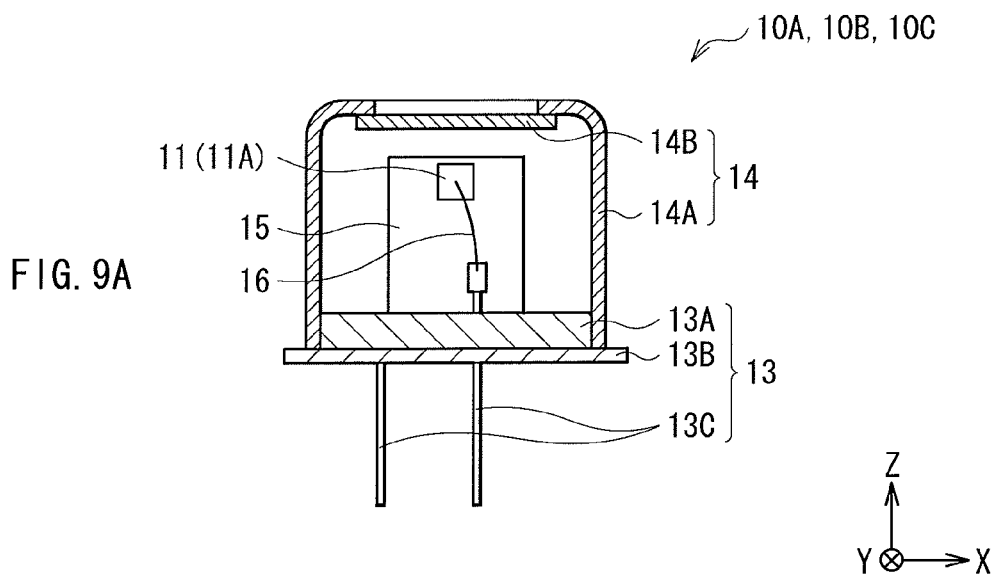
FIG. 9A
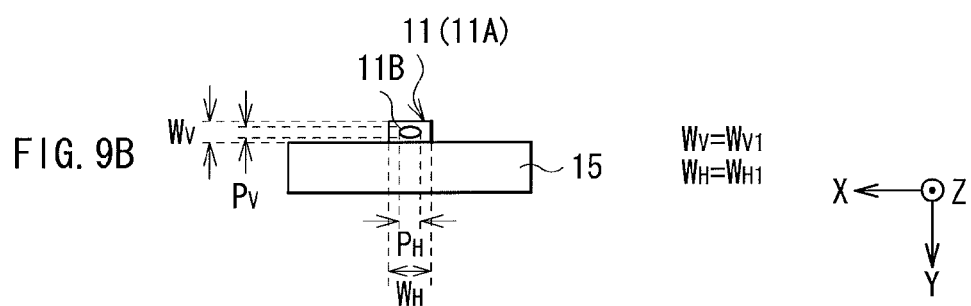
FIG. 9B    $W_V = W_{V1}$
$W_H = W_{H1}$
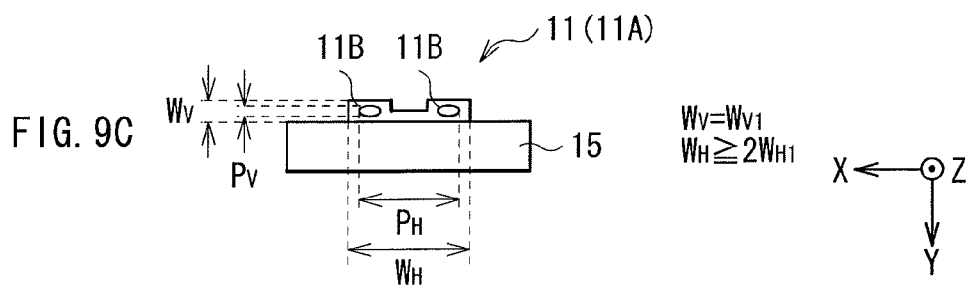
FIG. 9C    $W_V = W_{V1}$
$W_H \geq 2W_{H1}$ $W_V \geqq 2W_{V1}$
$W_H = W_{H1}$

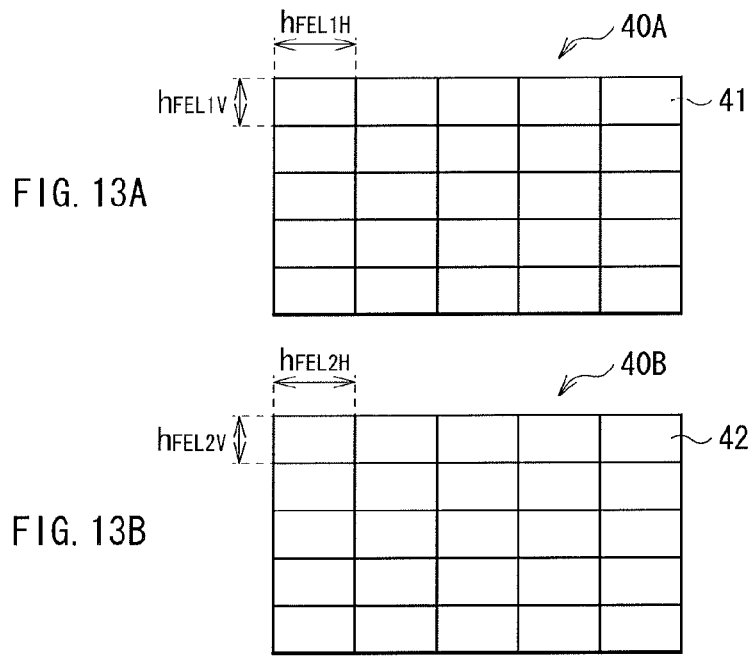
FIG. 13A
FIG. 13B
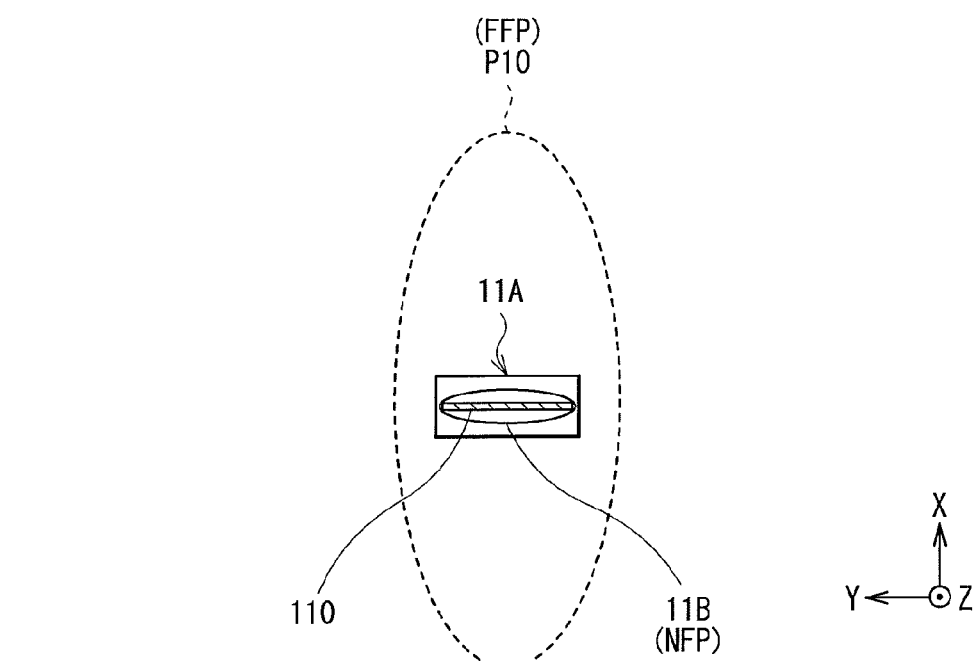
FIG. 14

| ASPECT RATIO | 16:9 | 4:3 | 16:9 | 16:9 |
|---|---|---|---|---|
| $n_H$ [Pcs] | 6 | 6 | 8 | 12 |
| $h_{FEL1H}$ [mm] | 1.33 | 1.00 | 0.75 | 0.33 |
| $h_{FEL1V}$ [mm] | 0.75 | 0.75 | 0.42 | 0.19 |
| $\theta$ [deg] | 5.4 | 7.1 | 4.0 | 2.7 |

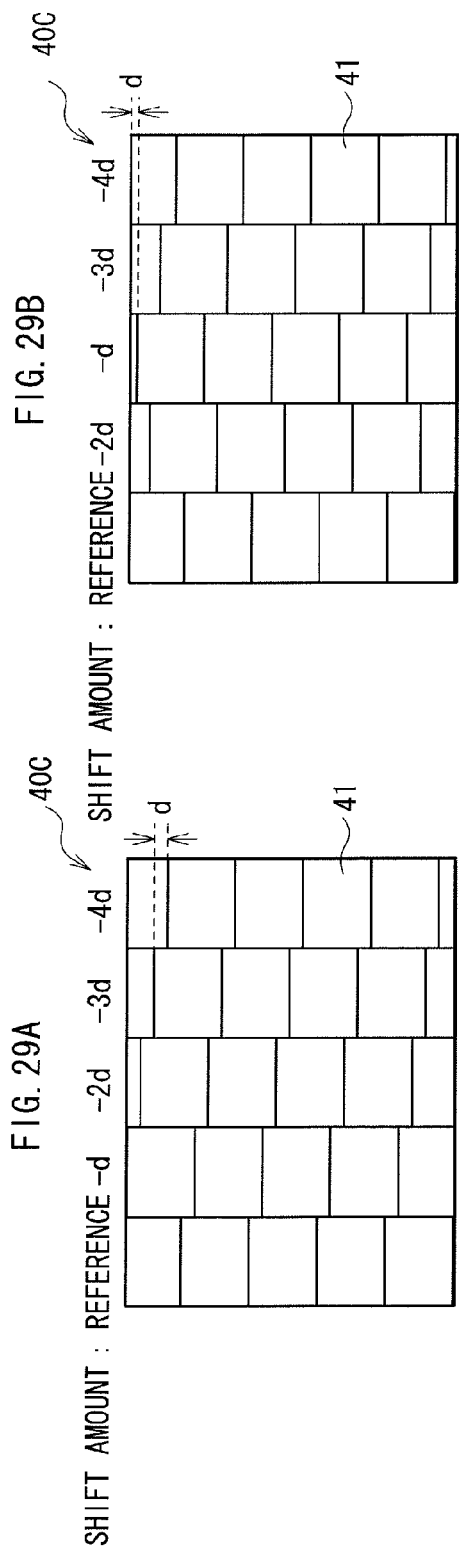

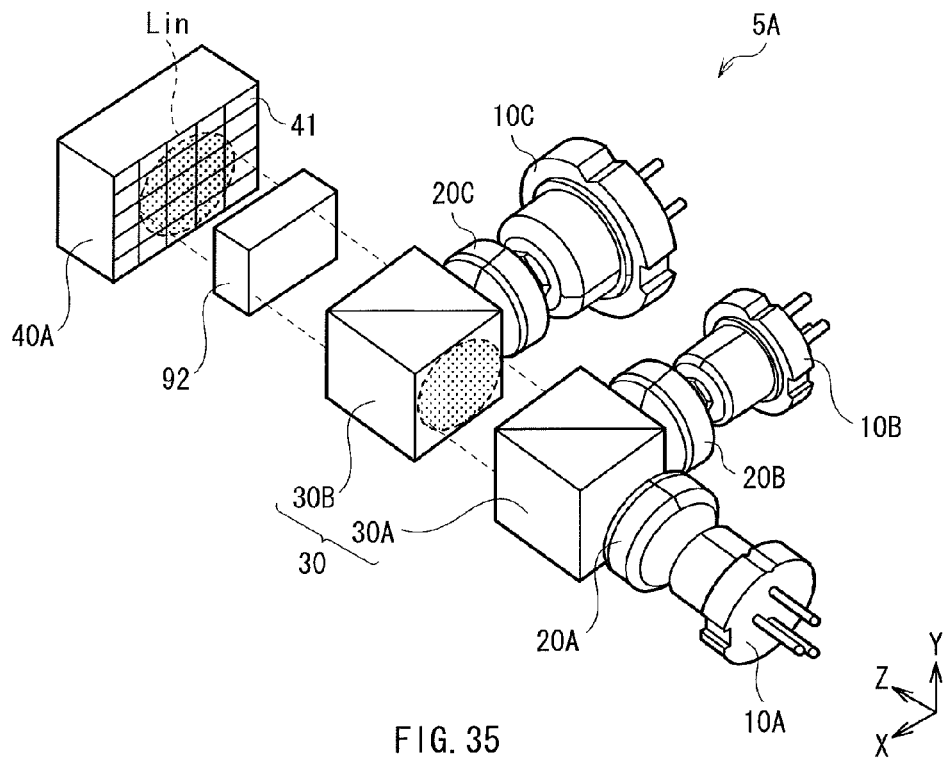
FIG. 35
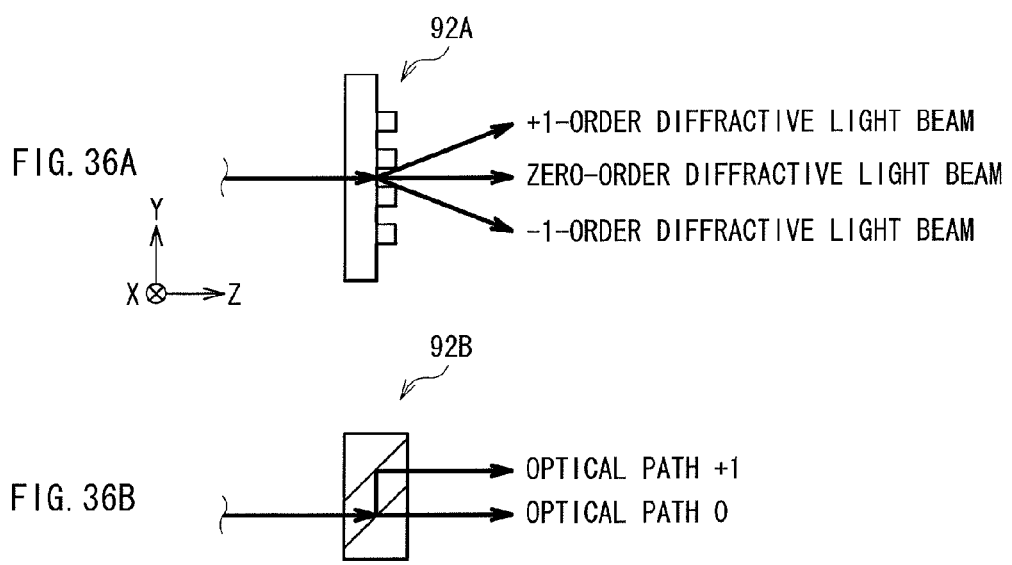
FIG. 36A
+1-ORDER DIFFRACTIVE LIGHT BEAM
ZERO-ORDER DIFFRACTIVE LIGHT BEAM
-1-ORDER DIFFRACTIVE LIGHT BEAM
FIG. 36B
OPTICAL PATH +1
OPTICAL PATH 0

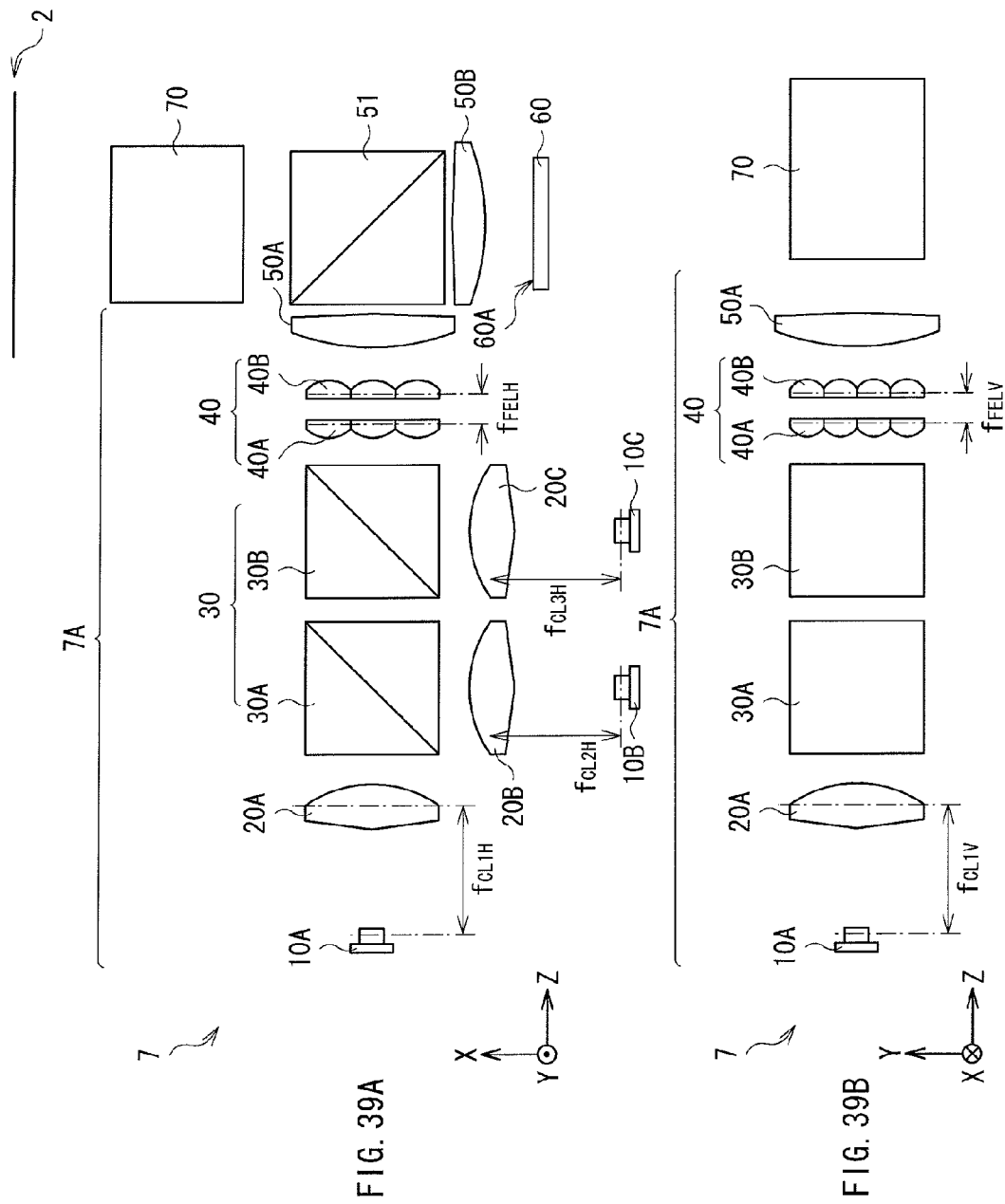

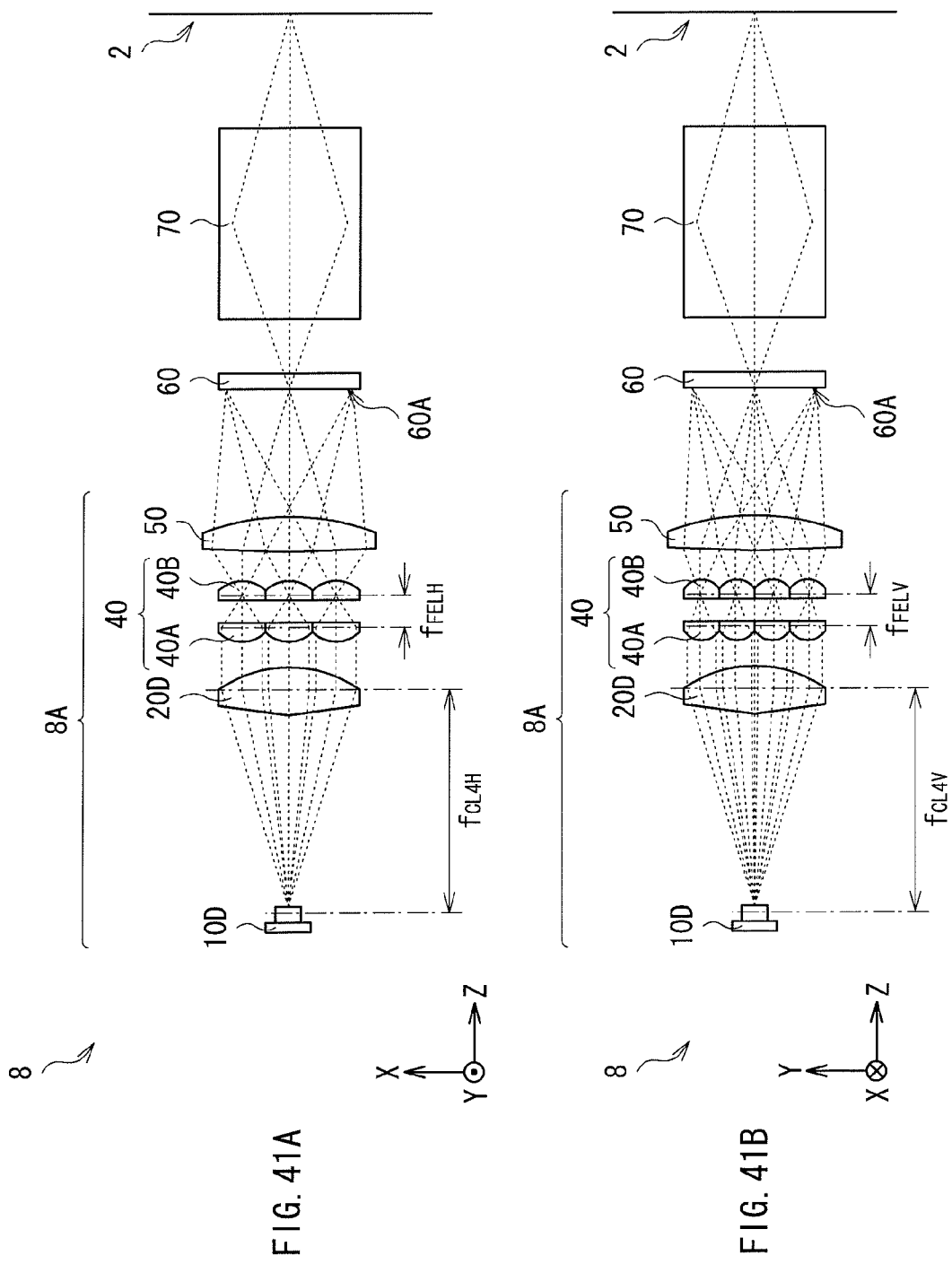

ILLUMINATION UNIT, PROJECTION DISPLAY UNIT, AND DIRECT VIEW DISPLAY UNIT

BACKGROUND

The present disclosure relates to an illumination unit including a solid-state light emitting device such as a laser diode (LD), and a projection display unit and a direct view display unit which are equipped with the illumination unit.

In recent years, projectors for projecting an image onto a screen are being widely used in offices, as well as households. A typical projector generates image light by modulating light from a light source with a light bulb, and projects and displays the image light onto a screen (for example, refer to Japanese Unexamined Patent Application Publication No. 2008-134324). Nowadays, palm-size, ultra-compact projectors, portable phones equipped with such an ultra-compact projector, and the like are commercially available.

SUMMARY

Generally, a projector employs a high-intensity discharge lamp as a light source. However, high-intensity discharge lamps are relatively large in size and have high power consumption. Therefore, attempts to replace high-intensity discharge lamps with solid-state light emitting devices, including light emitting diodes (LEDs), laser diodes (LDs), and organic light emitting diodes (OLEDs), are currently attracting interest. Solid-state light emitting devices are advantageous over high-intensity discharge lamps in terms of not only compactness and power consumption but also reliability.

A typical projector is provided with an integrator including fly-eye lenses, in order to decrease the degree of the luminance non-uniformity of illumination light (or equalize the luminance of illumination light). However, even by using an integrator, the degree of the luminance non-uniformity of illumination light may not be reduced (or the luminance of illumination light may not be made uniform) enough. Thus, the further improvement is desirable.

It is desirable to provide an illumination unit capable of reducing luminance non-uniformity of illumination light, and a projection display unit and a direct view display unit each of which uses the illumination light.

An illumination unit according to an embodiment of the present disclosure includes: one or more light sources each including a solid-state light-emitting device configured to emit light from a light emission region including a single or a plurality of light-emitting spots; and an optical member allowing the light incident from the solid-state light-emitting device to pass therethrough and exit therefrom, the solid-state light-emitting device including a single chip or a plurality of chips each emitting the light. One or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, each of the first fly-eye lens and the second fly-eye lens has a plurality of cells, the cells of the first fly-eye lens being arranged in a first direction and a second direction that intersect each other, and positions of the cells in the second direction are different from one another at least partially among a plurality of cell rows arranged along the first direction in the first fly-eye lens.

A projection display unit according to an embodiment of the present disclosure includes: an illumination optical system; a spatial modulation device modulates, based on a picture signal inputted, light from the illumination optical system to thereby generate image light; and a projection optical system projecting the image light generated by the spatial modulation device. The illumination optical system includes one or more light sources each including a solid-state light-emitting device configured to emit light from a light emission region including a single or a plurality of light-emitting spots, and an optical member allowing the light incident from the solid-state light-emitting device to pass therethrough and exit therefrom, the solid-state light-emitting device including a single chip or a plurality of chips each emitting the light. One or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, each of the first fly-eye lens and the second fly-eye lens has a plurality of cells, the cells of the first fly-eye lens being arranged in a first direction and a second direction that intersect each other, and positions of the cells in the second direction are different from one another at least partially among a plurality of cell rows arranged along the first direction in the first fly-eye lens.

A direct view display unit according to an embodiment of the present disclosure includes: an illumination optical system; a spatial modulation device modulates, based on a picture signal inputted, light from the illumination optical system to thereby generate image light; a projection optical system projecting the image light generated by the spatial modulation device; and a transmissive screen on which the image light projected from the projection optical system is displayed. The illumination optical system includes one or more light sources each including a solid-state light-emitting device configured to emit light from a light emission region including a single or a plurality of light-emitting spots, and an optical member allowing the light incident from the solid-state light-emitting device to pass therethrough and exit therefrom, the solid-state light-emitting device including a single chip or a plurality of chips each emitting the light. One or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, each of the first fly-eye lens and the second fly-eye lens has a plurality of cells, the cells of the first fly-eye lens being arranged in a first direction and a second direction that intersect each other, and positions of the cells in the second direction are different from one another at least partially among a plurality of cell rows arranged along the first direction in the first fly-eye lens.

In the illumination unit, the projection display unit, and the direct view display unit according to the embodiments of the present disclosure, the cells of the first fly-eye lens are arranged in the first direction and, in the first fly-eye lens, the second direction that intersect each other, and the positions of the cells in the second direction are different from one another at least partially among the plurality of cell rows arranged along the first direction. This makes it easier to reduce luminance non-uniformity of the incidence light in the integrator, even when the light emitted from the one or more light sources including the one or more chips configured by the laser diode shows a sharp luminance distribution shape (for example, even when a shape of a far-field pattern (FFP) is not a circle (isotropic) such as a shape of oval).

According to the illumination unit, the projection display unit, and the direct view display unit according to the embodiments of the present disclosure, the positions of the cells in the second direction are different from one another at least partially among a plurality of cell rows arranged along the first direction in the first fly-eye lens. This makes it easier to reduce luminance non-uniformity of the incidence light in the integrator. Hence, it is possible to reduce the luminance non-uniformity in the illumination light, and to improve displaying quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B illustrate a schematic structure of a projector according to a first embodiment of the present disclosure.

FIGS. 2A and 2B illustrate exemplary optical paths in the projector of FIGS. 1A and 1B.

FIG. 3A illustrates a top view of an exemplary structure of the light source, when a light source in the projector of FIGS. 1A and 1B has a chip of an upper surface emitting type.

FIG. 3B illustrates a cross section of the structure of the light source, taken along the line A-A of FIG. 3A.

FIG. 4A illustrates a top view of another exemplary structure of the light source, when a light source in the projector of FIGS. 1A and 1B has a chip of an upper surface emitting type.

FIG. 4B illustrates a cross section of the structure of the light source, taken along the line A-A of FIG. 4A.

FIG. 9A illustrates a cross section of further another exemplary structure of a light source in the projector of FIGS. 1A and 1B, when chips in the light source are of an end face emitting type.

FIG. 9B illustrates a solid-state light emitting device in the light source as seen from its light emitting surface.

FIG. 9C illustrates a solid-state light emitting device of a monolithic structure in the light source as seen from its light emitting surface.

FIG. 13A illustrates a schematic structure of a primary fly-eye lens.

FIG. 13B illustrates a schematic structure of a secondary fly-eye lens.

FIG. 14 illustrates an exemplary arrangement of a FFP and a light emitting spot formed on a light source in the projector of FIGS. 1A and 1B.

FIGS. 29A, 29B, 29C, and 29D schematically illustrate exemplary detailed structure of the primary fly-eye lens according to the second embodiment.

FIG. 35 illustrates an exemplary structure of main parts of the illumination optical system of FIGS. 34A and 34B in perspective.

FIG. 36A schematically illustrates an exemplary optical path branching device shown in FIG. 35 and a function thereof.

FIG. 36B schematically illustrates an exemplary optical path branching device shown in FIG. 35 and a function thereof.

FIGS. 39A and 39B illustrate a schematic structure of a projector according to modification 1 of the first to fifth embodiments.

FIGS. 41A and 41B illustrate an exemplary optical path in the projector of FIG. 40.

DETAILED DESCRIPTION

Figure 5A:
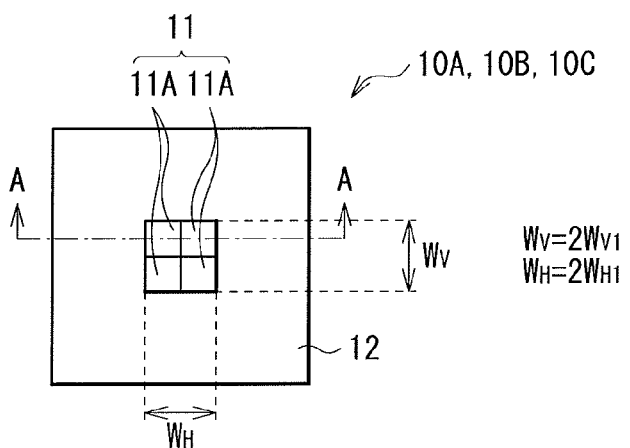
FIG. 5A illustrates a top view of still another exemplary structure of the light source, when a light source in the projector of FIGS. 1A and 1B has a chip of an upper surface emitting type.
Figure 5B:
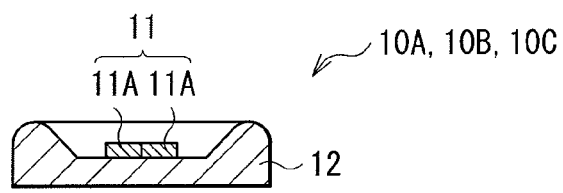
FIG. 5B illustrates a cross section of the structure of the light source, taken along the line A-A of FIG. 5A.

Some embodiments of the present disclosure will be explained below in detail with reference to the accompanying drawings. This description will be given in the following orders.

1. First embodiment (an example of inclining the luminance distribution of a light beam incident on a primary fly-eye lens)
2. Second embodiment (an example of misaligning cells in a primary fly-eye lens)
3. Third embodiment (an example of proving an anamorphic lens in an illumination optical system)
4. Fourth embodiment (an example of providing an optical path branching device in an illumination optical system)
5. Fifth embodiment (an example of proving both an anamorphic lens and an optical path branching device in an illumination optical system)
6. Modifications applicable to first to fifth embodiments in common Modification 1 (an example of employing a reflection type device as a spatial modulation device)

Modification 2 (an example of providing a single light source in an illumination optical system)

Modification 3 (an example of positioning an chip in a light source while the chip is angled with respect to an optical axis), and Other modifications (an example of combining the embodiments and applying the embodiments to a rear-type projection display unit)

First Embodiment

[Whole Structure of Projector 1]

FIGS. 1A and 1B show a schematic structure of a projector (projector 1) according to a first embodiment of the present disclosure. Note that this projector 1 corresponds to a concrete example of a "projection display unit" according to an embodiment of the present disclosure. FIG. 1A shows an example of a structure of the projector 1 as seen from the above (or on a Y axis), and FIG. 1B shows it as seen from one side (or on an X axis). FIGS. 2A and 2B show an example of optical paths in the projector 1 of FIGS. 1A and 1B. FIG. 2A shows an example of the optical paths in the projector 1 as seen from the above (or on the Y axis), and FIG. 2B shows an example of the optical paths in the projector 1 as seen from the side (or on an X axis).

Generally, the Y axis extends vertically and the X axis extends horizontally, but instead, the Y axis may extend horizontally and the X axis may extend vertically. For the sake of convenience, an explanation will be given for a case where the Y and X axes are vertical and horizontal axes, respectively, in the embodiments. Furthermore, a word "laterally" or "horizontal direction" indicates a direction along the X axis, and a word "longitudinally" or "vertical direction" indicates a direction along the Y axis.

The projector 1 includes, for example, an illumination optical system 1A, a spatial modulation device 60, and a projection optical system 70. Specifically, the spatial modulation device 60 generates image light by modulating light from the illumination optical system 1A on the basis of a picture signal inputted, and the projection optical system 70 projects the image light generated by the spatial modulation device 60 onto a reflection type screen 2. Note that the illumination optical system 1A corresponds to a concrete example of an "illumination unit" according to an embodiment of the present disclosure.

[Structure of Illumination Optical System 1A]

The illumination optical system 1A serves a purpose of supplying light beams for irradiating an illumination region (surface for irradiation) 60A on the spatial modulation device 60. Note that any optical device may be located in a region where the light beams travel in the illumination optical system 1A, as necessary. For example, an optical filter for attenuating invisible light components that is contained in the light beam output from the illumination optical system 1A or the like may be provided in a region where the light beams travel in the illumination optical system 1A.

Referring to the example of FIGS. 1A and 1B, the illumination optical system 1A includes light sources 10A, 10B, and 10C, coupling lens (directivity angle changing devices) 20A, 20B, and 20C, an optical path unifying device 30, an integrator 40, and a condenser lens 50. The optical path unifying device 30 unifies the respective light beams from the light sources 10A, 10B, and 10C, and includes, for example, two dichroic mirrors 30A and 30B. The integrator 40 uniformalizes the illuminance distribution on the illumination region 60A, and includes, for example, a pair of fly-eye lenses 40A and 40B. The coupling lens 20A, the optical path unifying device 30, the integrator 40, and the condenser lens 50 are aligned with one another on the optical axis of the light source 10A in this order from the location of the light source 10A. The optical axis of the light source 10B intersects that of the light source 10A in the dichroic mirror 30A, and on the optical axis of the light source 10B, the coupling lens 20B and the dichroic mirror 30A are aligned in this order from the location of the light source 10B. The optical axis of the light source 10C intersects that of the light source 10A in the dichroic mirror 30B, and on the optical axis of the light source 10C, the coupling lens 20C and the dichroic mirror 30B are aligned in this order from the location of the light source 10C.

Note that the combination of the coupling lens (directivity angle changing devices) 20A, 20B, and 20C and the integrator 40 correspond to a concrete example of an "optical member" according to an embodiment of the present disclosure (or an optical member to which light beams from solid-state light emitting devices are input and from which the light beams are output, as described later).

In the example of FIGS. 1A and 1B, the components constituting the projector 1 (other than the light sources 10B and 10C and the coupling lenses 20B and 20C) are aligned with one another on a line parallel to the Z axis. However, any of these components may be aligned on a line that is not parallel to the Z axis. For example, although not shown, the layout of the components in the illumination optical system 1A may be rotated 90 degrees with respect to the exemplary layout of FIGS. 1A and 1B, so that the optical axis of the illumination optical system 1A is perpendicular to the Z axis. In this case, it is preferable that an additional optical device (for example, a mirror) be provided to direct the light beams output from the illumination optical system 1A to the spatial modulation device 60. Moreover, for example, the layout of the light source 10A, the coupling lens 20A, and the optical path unifying device 30 may be angled 90 degrees with respect to the layout of FIGS. 1A and 1B, so that the optical axis thereof is perpendicular to the Z axis. Even in this case, it is preferable that an additional optical device (for example, a mirror) be also provided to lead the light beams output from the optical path unifying device 30 to the integrator 40.

[Structure where Light Sources 10A, 10B, and 10C have Chips 11A of Upper Surface Emitting Type]

Referring to examples shown in FIGS. 3A and 3B to 5A and 5B, each of the light sources 10A, 10B, and 10C includes, for example, a solid-state light emitting device 11, and a package 12 supporting the solid-state light emitting device 11 (or a substrate on which the solid-state light emitting device 11 is mounted). In other words, each of the light sources 10A, 10B, and 10C may be implemented by a package in which the solid-state light emitting device 11 is mounted on the substrate. Each of the solid-state light emitting devices 11 is adapted to emit light beams from a light emitting region having one or more light emitting spots of a dot or non-dot shape. The solid-state light emitting device 11 may be configured of a single chip 11A for emitting a light beam of a predetermined wavelength, as in the example of FIGS. 3A and 3B. Alternatively, the solid-state light emitting device 11 may be configured of multiple chips 11A for emitting light beams of the same wavelength or different wavelengths, as in examples of FIGS. 4A, 4B, 5A, and 5B. When the solid-state light emitting device 11 is configured of the multiple chips 11A, these chips 11A may be arranged laterally in a line, as in the example of FIGS. 4A and 4B or arranged laterally and longitudinally, namely, in a matrix form, as in the example of FIGS. 5A and 5B. Moreover, the light sources 10A, 10B, and 10C may have the different number of chips 11A or the same number of chips 11A in the respective solid-state light emitting devices 11.

When the solid-state light emitting device 11 is configured of the single chip 11A, the size ($W_V \times W_H$) of the solid-state light emitting device 11 may be the same as the size ($W_{V1} \times W_{H1}$) of the single chip 11A, as in the example of FIG. 3A. Meanwhile, when the solid-state light emitting device 11 is configured of the multiple chips 11A, the size of the solid-state light emitting device 11 may be the same as that of a region defined by arranging all the chips 11A adjacent to one another, as in the examples of FIGS. 4A and 5A. When the multiple chips 11A are arranged laterally in a line, as in the example shown in FIG. 4A, the size ($W_V \times W_H$) of the solid-state light emitting device 11 is equal to the size ($W_{V1} \times 2W_{H1}$). Meanwhile, when the multiple chips 11A are arranged laterally and longitudinally, namely, in a matrix form, as in the example of FIG. 5A, the size ($W_V \times W_H$) of the solid-state light emitting device 11 is equal to the size ($2W_{V1} \times 2W_{H1}$).

The chip 11A may be any of a light emitting diode (LED), an organic light emitting diode (OLED), and a laser diode (LD). In this embodiment, at least one of all the chips 11A in the light sources 10A, 10B, and 10C is an LD. Note that each of the chips 11A except for the chip 11A of an LD may be any of an LED, an OLED and an LD.

The respective chips 11A placed in the light sources 10A, 10B, and 10C emit light beams of, for example, different wavelengths. The chip 11A placed in the light source 10A emits a light beam having a wavelength of approximately 400 nm to 500 nm (blue light beam). The chip 11A placed in the light source 10B emits a light beam having a wavelength of approximately 500 nm to 600 nm (green light beam). The chip 11A placed in the light source 10C emits a light beam having a wavelength of approximately 600 nm to 700 nm (red light beam). Alternatively, the chip 11A of the light source 10A may emit a light beam other than a blue light beam (green or red light beam). The chip 11A of the light source 10B may emit a light beam other than a green light beam (blue or red light beam). The chip 11A of the light source 10C may emit a light beam other than a red light beam (green or blue light beam).

Referring to the examples of FIGS. 3A and 3B to 5A and 5B and examples shown in 6A, 6B, and 6C, each chip 11A has a light emitting spot 11B, the size ($P_{V1} \times P_{H1}$) of which is smaller than the size ($W_V \times W_H$) of the chip 11A itself. This light emitting spot 11B corresponds to a region from which a light beam is emitted when the chip 11A is driven by supplying a current thereto (light emitting region). When the chip 11A is configured of an LED or OLED, the light emitting spot 11B thereon has a non-dot shape (a planar shape such as square shape and rectangular shape). Meanwhile, when the chip 11A is configured of an LD, the light emitting spot 11B thereon has a dot shape which is smaller than the light emitting spot 11B of the LED or OLED.

Figure 6A:
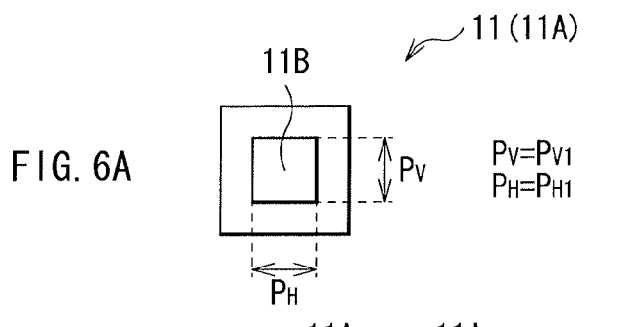
FIG. 6A illustrates a top view of an exemplary light emitting spot on the light source, when a chip in a light source in the projector of FIGS. 1A and 1B has an upper surface emitting type.
Figure 6B:
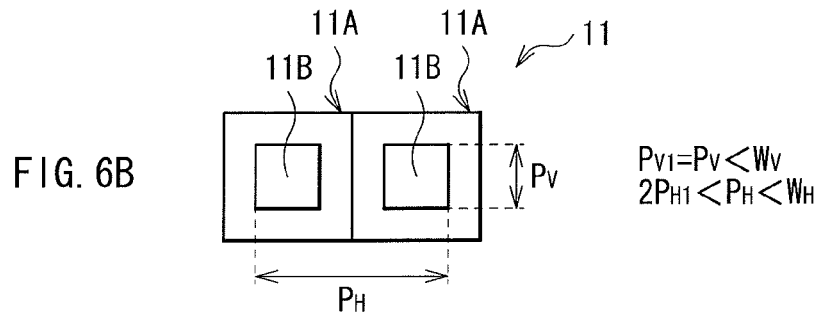
FIG. 6B illustrates a top view of an exemplary arrangement of light emitting spots on the light source, when a chip in a light source in the projector of FIGS. 1A and 1B has an upper surface emitting type.
Figure 6C:
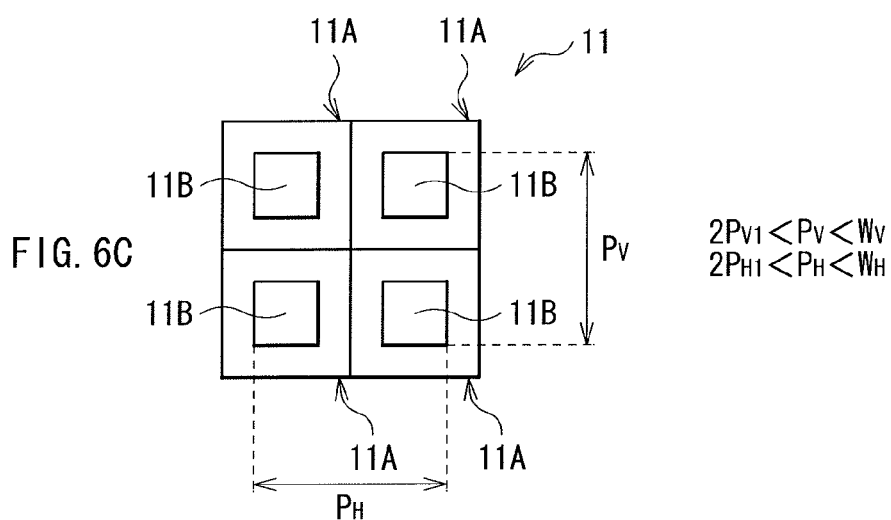
FIG. 6C illustrates a top view of another exemplary arrangement of light emitting spots on the light source, when a chip in a light source in the projector of FIGS. 1A and 1B has an upper surface emitting type.
Figure 7A:
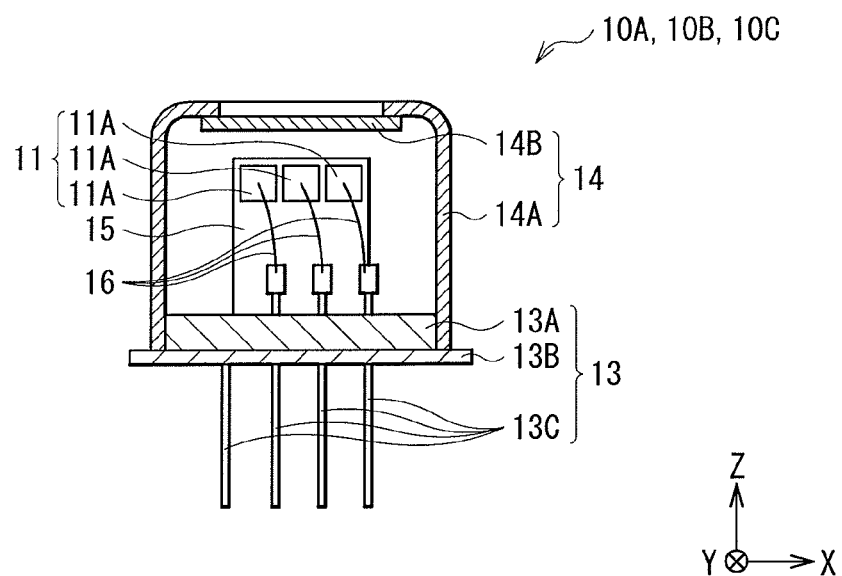
FIG. 7A illustrates a cross section of an exemplary structure of a light source in the projector of FIGS. 1A and 1B, when chips in the light source are of an end face emitting type.
Figure 7B:
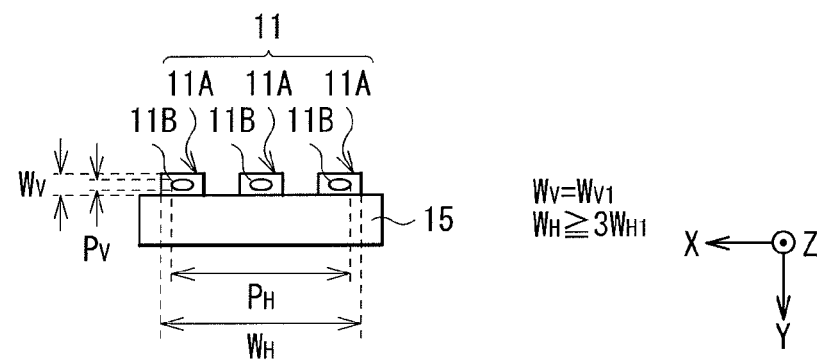
FIG. 7B illustrates a solid-state light emitting device in the light source as seen from a light emitting surface thereof.
Figure 8A:
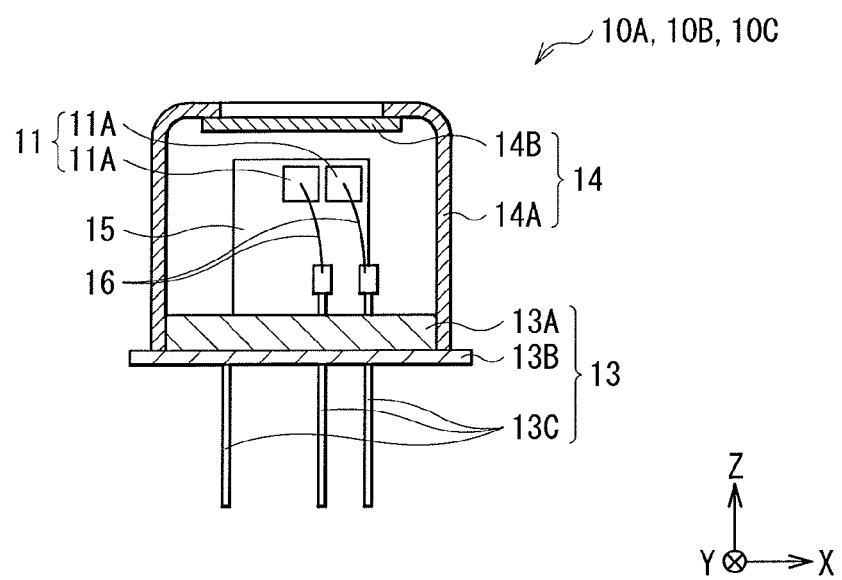
FIG. 8A illustrates a cross section of another exemplary structure of a light source in the projector of FIGS. 1A and 1B, when chips in the light source are of an end face emitting type.
Figure 8B:
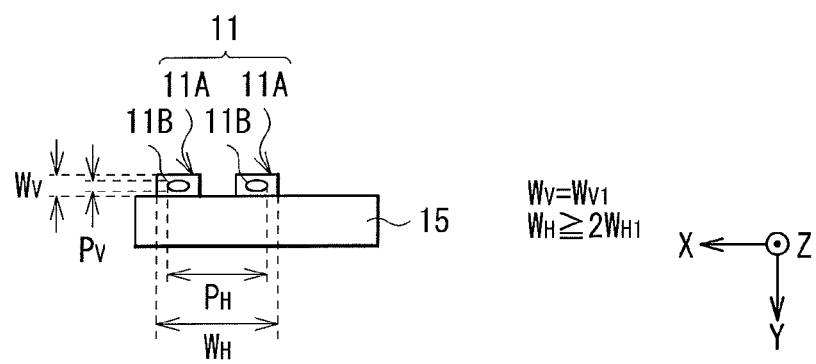
FIG. 8B illustrates a solid-state light emitting device in the light source as seen from a light emitting surface thereof.
Figure 10A:
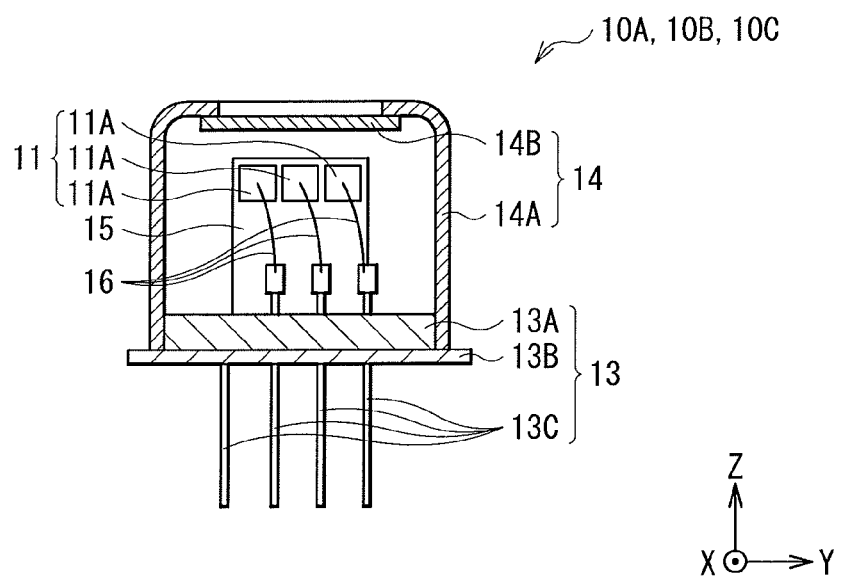
FIG. 10A illustrates a cross section of the structure of the light source of FIG. 7A, when it is angled 90 degrees on the X-Y plane.
Figure 10B:
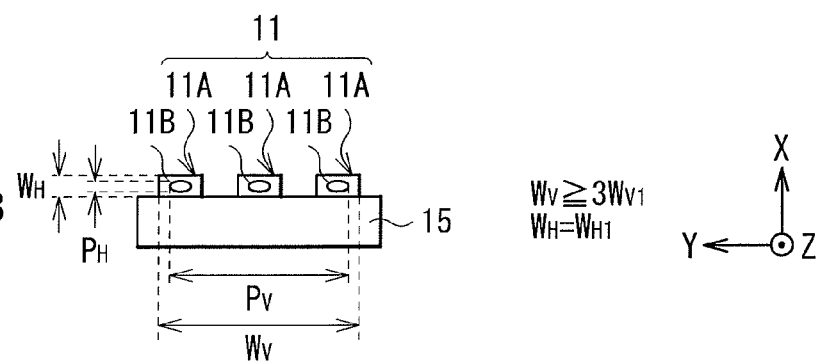
FIG. 10B illustrates the solid-state light emitting device in the light source as seen from a light emitting surface thereof.
Figure 11A:
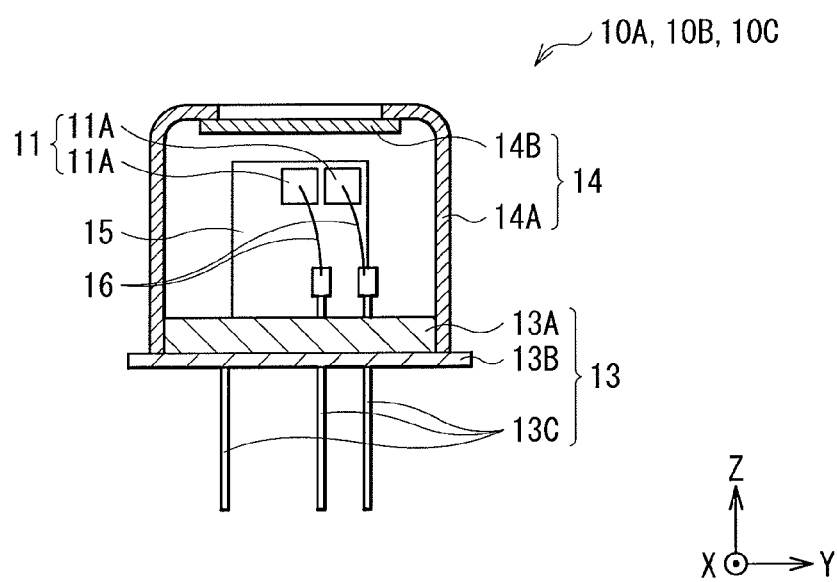
FIG. 11A illustrates a cross section of the structure of the light source of FIG. 8A, when it is angled 90 degrees on the X-Y plane.
Figure 11B:
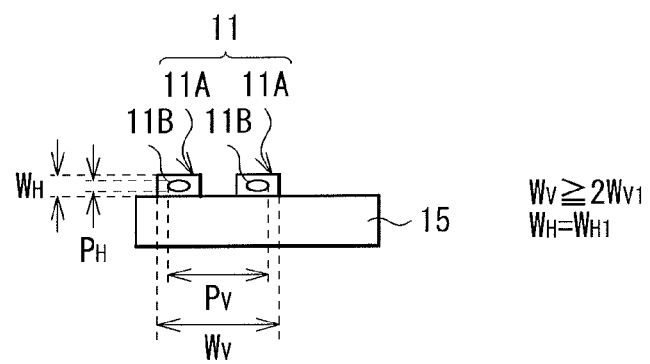
FIG. 11B illustrates the solid-state light emitting device in the light source as seen from its light emitting surface.

When the solid-state light emitting device 11 is configured of the single chip 11A, the number of light emitting spots 11B formed thereon is one, as in the example of FIG. 6A. Exceptionally, if the solid-state light emitting device 11 has a monolithic structure, then the number of light emitting spots 11B is plural, as will be described in detail later, and this applies to the following cases. Meanwhile, when the solid-state light emitting device 11 is configured of the multiple chips 11A, the light emitting spot 11B formed thereon are equal in number to the chips 11A, as in the examples of FIGS. 6B and 6C (However, if the solid-state light emitting device 11 has a monolithic structure, then the number of light emitting spots 11B is greater than that of the chips 11A as described above). When the solid-state light emitting device 11 is configured of the single chip 11A, the size ($P_V \times P_H$) of the light emitting region in the solid-state light emitting device 11 is equal to the size ($P_{V1} \times P_{H1}$) of the light emitting spot 11B. (However, a case where the solid-state light emitting device 11 has a monolithic structure is made an exception as described above). Meanwhile, when the solid-state light emitting device 11 is configured of the multiple chips 11A, the size ($P_V \times P_H$) of the light emitting region in the solid-state light emitting device 11 is equal to the size of the region defined by the outer frame of the light emitting spots 11B of the chips 11A when all the chips 11A are arranged so as to minimize an occupied region thereof. When the multiple chips 11A are arranged laterally in a line, as in the example of FIG. 6B, the size ($P_V \times P_H$) of the light emitting region is larger than the size ($P_{V1} \times 2P_{H1}$) and smaller than the size ($W_V \times W_H$). In addition, when the multiple chips 11A are arranged laterally and longitudinally, namely, in a matrix shape, as in the example of FIG. 6C, the size ($P_V \times P_H$) of the light emitting region is larger than the size ($2P_{V1} \times 2P_{H1}$) and smaller than the size ($W_V \times W_H$).

[Structure where Light Sources 10A, 10B, and 10C have Chips 11A of End Face Emitting Type]

Up to this point, with reference to FIGS. 3A and 3B to 6A and 6B, the description has been given for the case where the chips 11A are of an upper surface emitting type. However, alternatively, the chip 11A may be of an end face emitting type, as will be described below. In this case, as in examples shown in FIGS. 7A and 7B to 12A, 12B, and 12C, each of the light sources 10A, 10B, and 10C is implemented by a can where the solid-state light emitting device 11 configured of one or more end face emitting type chips 11A is placed within an inner space defined by a stem 13 and a cap 14. In other words, each of the light sources 10A, 10B, and 10C has a package housing the solid-state light emitting device 11.

The stem 13 constitutes the package for the light sources 10A, 10B, and 10C together with the cap 14, and includes, for example, a support substrate 13A supporting a sub-mount 15, an outer-rim substrate 13B located on the rear surface of the support substrate 13A, and multiple connecting pins 13C.

The sub-mount 15 is made of conductive and heat dissipating material. Each of the support substrate 13A and the outer-rim substrate 13B has a configuration in which one or more insulating through-holes and one or more conductive through-holes are formed in a conductive and heat dissipating substrate. Each of the support substrate 13A and the outer-rim substrate 13B has, for example, a disc-shape, and both of them are stacked while being concentric with each other. The diameter of the outer-rim substrate 13B is larger than that of the support substrate 13A. The outer-rim substrate 13B has an outer rim that forms a circular flange extending in any directions from a central axis of the outer-rim substrate 13B on a plane perpendicular to the central axis of the outer-rim substrate 13B. This circular flange serves a purpose of defining the reference position of the cap 14 with respect to the support substrate 13A, when the cap 14 is secured to the support substrate 13A during a manufacturing process.

The connecting pins 13C pass through at least the support substrate 13A. The connecting pins 13C except for one or more connecting pins, (called "connecting pins α" for convenience' sake hereinafter) are electrically connected to the electrodes (not shown) on the corresponding chips 11A. For example, the connecting pins α protrude long from the outer-rim substrate 13B and short from the support substrate 13A. Meanwhile, the connecting pins 13C except for the connecting pins α, (called "connecting pins β" for convenience' sake hereinafter) are electrically connected to the other electrodes (not shown) on the chips 11A. For example, respective one ends of the connecting pins β protrude long from the outer-rim substrate 13B, and the other ends thereof are embedded in the support substrate 13A. The ends of the connecting pins 13C which protrude far from the outer-rim substrate 13B correspond to portions to be inserted into, for example, a circuit board or the like. Meanwhile, the ends of the connecting pins 13C which protrude a little from the support substrate 13A correspond to portions to be connected to the corresponding chips 11A through wires 16. The portions of the connecting pins 13C which are embedded in the support substrate 13A are electrically connected to all the chips 11A through the support substrate 13A and the sub-mount 15. The connecting pins α are supported by the insulating through-holes formed in the support substrate 13A and the outer-rim substrate 13B, and are insulated and isolated from both the support substrate 13A and the outer-rim substrate 13B by the insulating through-holes. Also, the connecting pins α are insulated from one another by the abovementioned insulating members. Meanwhile, the connecting pins β are supported by conductive through-holes formed in both the support substrate 13A and the outer-rim substrate 13B, and are electrically connected to these through-holes.

The cap 14 serves a purpose of sealing the solid-state light emitting device 11. This cap 14 includes, for example, a cylinder portion 14A provided with openings at the upper and lower ends. For example, the lower end of the cylinder portion 14A is in contact with, for example, the side of the support substrate 13A, and the solid-state light emitting device 11 is placed in an inner space of the cylinder portion 14A. The cap 14 has a light-transmitting window 14B disposed covering the upper opening of the cylinder portion 14A. The light-transmitting window 14B is placed opposite the light-emitting region of the solid-state light emitting device 11, and has a function of allowing the light beams output from the solid-state light emitting device 11 to pass therethrough.

As described above, even when the chip 11A is of the end face emitting type, the solid-state light emitting device 11 also emits light beams from the light emitting region configured of one or more light emitting spots of a dot or non-dot shape. The solid-state light emitting device 11 may be configured of, for example, the single chip 11A for emitting a light beam of a predetermined wavelength, the multiple chips 11A for emitting light beams of the same wavelength, or the multiple chips 11A for emitting light beams of different wavelengths. When the solid-state light emitting device 11 is configured of the multiple chips 11A, the chips 11A may be arranged laterally in a line as in the examples of FIGS. 7A, 7B, 8A, and 8B, or longitudinally as in the examples of FIGS. 10A, 10B, 11A, and 11B. In addition, the individual solid-state light emitting devices 11 in the light sources 10A, 10B, and 10C may have the different number of chips 11A or the same number of chips 11A.

Figure 12A:
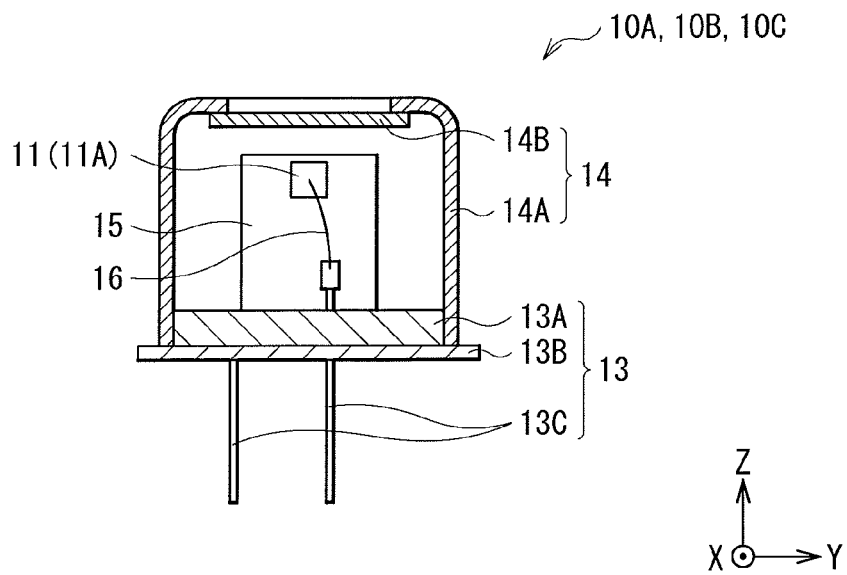
FIG. 12A illustrates a cross section of the structure of the light source of FIGS. 9A to 9C, when it is angled 90 degrees on the X-Y plane.
Figure 12B:
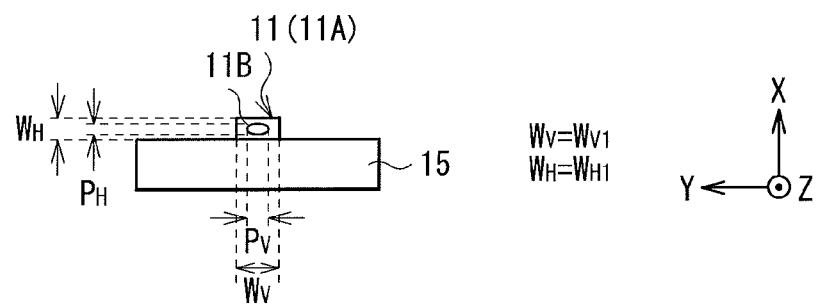
FIG. 12B illustrates the solid-state light emitting device in the light source as seen from a light emitting surface thereof.
Figure 12C:
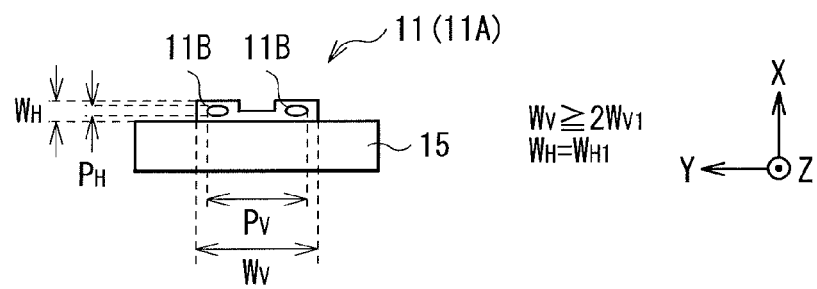
FIG. 12C illustrates a solid-state light emitting device of a monolithic structure in the light source as seen from a light emitting surface thereof.

When the solid-state light emitting device 11 is configured of the single chip 11A, the size ($W_V \times W_H$) of the solid-state light emitting device 11 is equal to the size ($W_{V1} \times W_{H1}$) of the single chip 11A, as in the example of FIGS. 9B and 12B. Exceptionally, if the solid-state light emitting device 11 has a monolithic structure, as in the examples of FIGS. 9C and 12C, then the size ($W_V \times W_H$) of the solid-state light emitting device 11 is as follows. Specifically, the size ($W_V \times W_H$) of the solid-state light emitting device 11 is larger than the size ($W_{V1} \times 2W_{H1}$) in the example of FIG. 9C, and larger than the size ($2W_{V1} \times W_{H1}$) in the example of FIG. 12C. Meanwhile, when the solid-state light emitting device 11 is configured of the multiple chips 11A, the size of the solid-state light emitting device 11 is equal to the size of a region defined by arranging all the chips 11A adjacent to one another, as in the examples of FIGS. 7B, 8B, 10B, and 11B. When the chips 11A are arranged laterally in a line, the size ($W_V \times W_H$) of the solid-state light emitting device 11 is larger than the size ($W_{V1} \times 3W_{H1}$) in the example of FIG. 7B, and larger than the size ($W_{V1} \times 2W_{H1}$) in the example of FIG. 8B. In addition, when the chips 11A are arranged longitudinally in a line, the size ($W_V \times W_H$) of the solid-state light emitting device 11 is larger than the size ($3W_{V1} \times W_{H1}$) in the example of FIG. 10B, and larger than the size ($2W_{V1} \times W_{H1}$) in the example of FIG. 11B.

Each chip 11A may be, for example, a laser diode (LD). In this embodiment, at least one of all the chips 11A in the light sources 10A, 10B, and 10C is an LD, as described above. Note that each of the chips 11A except for the chip 11A of an LD may be an LED, an OLEDs, and an LD.

Each chip 11A has a light emitting spot 11B, the size ($P_{V1} \times P_{H1}$) of which is smaller than the size ($W_V \times W_H$) of the chip 11A itself, as in the examples of FIGS. 7A and 7B to 15A, 15B, and 15C. This light emitting spot 11B defines a region from which a light beam is emitted when the chip 11A is driven by supplying a current thereto (light emitting region). When the chip 11A is configured of an LD, the light emitting spot 11B of the chip 11A has a dot-shape and is smaller than that of an LED or OLED.

When the solid-state light emitting device 11 is configured of the single chip 11A, the number of light emitting spots 11B formed thereon is one, as in the examples of FIGS. 9B and 12B. Exceptionally, if the solid-state light emitting device 11 has a monolithic structure, then the number of light emitting spots 11B is plural (two in this case), as in the examples of FIGS. 9C and 12C. Meanwhile, if the solid-state light emitting device 11 is configured of the multiple chips 11A, the number of light emitting spots 11B formed thereon is equal to that of the chips 11A, as in the examples of FIGS. 7B, 8B, 10B, and 11B. When the solid-state light emitting device 11 is configured of the single chip 11A, the size ($P_V \times P_H$) of the light emitting region in the solid-state light emitting device 11 is equal to the size ($P_{V1} \times P_{H1}$) of the light emitting spot 11B. Exceptionally, if the solid-state light emitting device 11 has a monolithic structure, as in the examples of FIGS. 9C and 12C, then the size ($P_V \times P_H$) of the light emitting region in the solid-state light emitting device 11 is as follows. Specifically, the size ($P_V \times P_H$) of the light emitting region in the solid-state light emitting device 11 is larger than the size ($P_{V1} \times 2P_{H1}$) and smaller than the size ($W_V \times W_H$) in the example of FIG. 9C. In addition, the size ($P_V \times P_H$) of the light emitting region in the solid-state light emitting device 11 is larger than the size ($2P_{V1} \times P_{H1}$) and smaller than the size ($W_V \times W_H$) in the example of FIG. 12C. Meanwhile, when the solid-state light emitting device 11 is configured of the multiple chips 11A, the size ($P_V \times P_H$) of the light emitting region in the solid-state light emitting device 11 is equal to the size of the region defined by the outer frame of the light emitting spots 11B of the chips 11A when all the chips 11A are arranged so as to minimize an occupied region thereof. When the chips 11A are arranged laterally in a line, the size ($P_V \times P_H$) of the light emitting region is larger than the size ($P_{V1} \times 3P_{H1}$) and smaller than the size ($W_V \times W_H$) in the example of FIG. 7B. Likewise, the size ($P_V \times P_H$) of the light emitting region is larger than the size ($P_{V1} \times 2P_{H1}$) and smaller than the size ($W_V \times W_H$) in the example of FIG. 8B. Furthermore, when the chips 11A are arranged longitudinally in a line, the size ($P_V \times P_H$) of the light emitting region is larger than the size ($3P_{V1} \times P_{H1}$) and smaller than the size of ($W_V \times W_H$) in the example of FIG. 10B. Likewise, the size ($P_V \times P_H$) of the light emitting region is larger than the size ($2P_{V1} \times P_{H1}$) and smaller than the size of ($W_V \times W_H$) in the example of FIG. 11B.

Referring to the example shown in FIGS. 2A and 2B again, the coupling lens 20A converts the light beam emitted from the light source 10A into a substantially collimated light beam. In other words, the coupling lens 20A changes the directivity angles ($\theta_H$, $\theta_V$) of the light beam from the light source 10A such that the directivity angles ($\theta_H$, $\theta_V$) is the same as or similar to the directivity angles of a collimated light beam. This coupling lens 20A is positioned such that light components in the light beam from the light source 10A which are contained at the directivity angles or less enter the coupling lens 20A. The coupling lens 20B converts the light beam from the light source 10B into a substantially collimated light beam, as in the example of FIGS. 2A and 2B. In other words, the coupling lens 20B changes the directivity angles ($\theta_H$, $\theta_V$) of the light beam from the light source 10B such that the directivity angles ($\theta_H$, $\theta_V$) is the same as or similar to the directivity angles of a collimated light beam. This coupling lens 20B is positioned such that light components in the light beam from the light source 10B which are contained at the directivity angles or less enter the coupling lens 20B. The coupling lens 20C converts the light beam from the light source 10C into a substantially collimated light beam, as in the example of FIGS. 2A and 2B. In other words, the coupling lens 20C changes the directivity angles ($\theta_H$, $\theta_V$) of the light beam from the light source 10C such that the directivity angles ($\theta_H$, $\theta_V$) is the same as or similar to the directivity angles of a collimated light beam. This coupling lens 20C is positioned such that light components in the light beam from the light source 10C which are contained at the directivity angles or less enter the coupling lens 20C. Thus, the abovementioned coupling lenses 20A, 20B and 20C are positioned corresponding to the light sources 10A, 10B, and 10C (or packages thereof), respectively. Note that each of the coupling lenses 20A, 20B and 20C may be implemented by a single lens or a combination of multiple lenses.

Each of the dichroic mirrors 30A and 30B includes a single mirror having a wavelength selective property. This mirror may have a configuration obtained by, for example, depositing multiple-layered interference films. As in the example of FIGS. 2A and 2B, the dichroic mirror 30A allows a light beam incident on the rear surface of the mirror (or a light beam input from the light source 10A) to pass through the mirror, and reflects a light beam incident on the front surface of the mirror (or a light beam input from the light source 10B) by the front surface. Meanwhile, as in the example of FIGS. 2A and 2B, the dichroic mirror 30B allows light beams incident from the rear surface of the mirror (or the light beams emitted from the light sources 10A and 10B through the dichroic mirror 30A) to pass through the mirror, and reflects a light beam incident from the front surface of the mirror (or the light beam emitted from the light source 10C), by the front surface. In this manner, the optical path unifying device 30 unifies the respective light beams emitted from the light sources 10A, 10B, and 10C into a single light beam.

The fly-eye lenses 40A and 40B, which constitute the integrator 40, each include multiple lens parts (or cells) arranged in a predetermined form (5×5 (length×width) matrix form in this case) as in an example shown in FIGS. 13A and 13B. Specifically, the cells 41 in the fly-eye lens 40A and the cells 42 in the fly-eye lens 40B are arranged in respective alignment directions. In other words, the cells are arrayed in the lateral (X or first) and the vertical (Y or second) directions that intersect each other. The cells 42 in the fly-eye lens 40B are positioned facing the corresponding cells 41 in the fly-eye lens 40A. The fly-eye lens 40A (first fly-eye lens) is positioned at the focal positions (or substantially focal positions) of the fly-eye lens 40B (second fly-eye lens), while the fly-eye lens 40B is positioned at the focal positions (or substantially focal positions) of the fly-eye lens 40A. Accordingly, in the integrator 40, the multiple light beams that have been separated by the fly-eye lens 40A are focused near corresponding lens surfaces of the fly-eye lens 40B on an image side of the fly-eye lens 40B, thereby forming secondary light source surfaces (light source images) thereon. This secondary light source surfaces are positioned on a conjugate plane of the incident pupil in the projection optical system 70. However, this secondary light source surfaces may not be positioned on the conjugate plane of the incident pupil in the projection optical system 70 precisely. Alternatively, it may be simply positioned within an allowable design range. Note that the fly-eye lenses 40A are 40B may be integrally formed.

Generally, any of the light beams from the light sources 10A, 10B, and 10C exhibits nonuniform intensity (luminance) distribution on a plane perpendicular to a travel direction thereof. If the light beams are led to the illumination region 60A (surface for irradiation), then the illuminance (luminance) distribution thereon may be nonuniform. Therefore, the integrator 40 splits each of the light beams from the light sources 10A, 10B, and 10C into multiple light beams, and leads and overlays the split light beams on the illumination region 60A, thereby uniformalizing the illuminance distribution thereon (decreasing the degree of the non-uniformity of illuminance distribution).

The condenser lens 50 converges the light beams from the multiple light sources formed by the integrator 40, thereby irradiating the illumination region 60A while overlaying the light beams thereon.

The spatial modulation device 60 subjects the light from the illumination optical system 1A to the two-dimensional modulation on the basis of color picture signals corresponding to the wavelengths of the light beams from the light sources 10A, 10B, and 10C. This makes it possible to generate the image light. This spatial modulation device 60 may be a light-transmitting device such as a light-transmitting type liquid crystal panel, as in the example of FIGS. 2A and 2B.

[Structure of Projector 1]

An explanation will be give below of a structure of the projector 1 according to the first embodiment.

[First Part]

In this embodiment, at least one of all the chips 11A in the light sources 10A, 10B, and 10C is configured of an LD (for example, semiconductor laser diode). Accordingly, a laser light beam that is emitted from the light emitting spot 11B in the chip 11A configured of an LD exhibits a far filed pattern (FFP) of a sharp luminance distribution shape, as in an example shown in FIG. 14. Specifically, the FFP of this laser light beam does not have a circular (isotropic) shape, but a non-isotropic shape (elliptic shape in this case) (see a dot-line denoted by "P10" in FIG. 14).

Figure 15A:
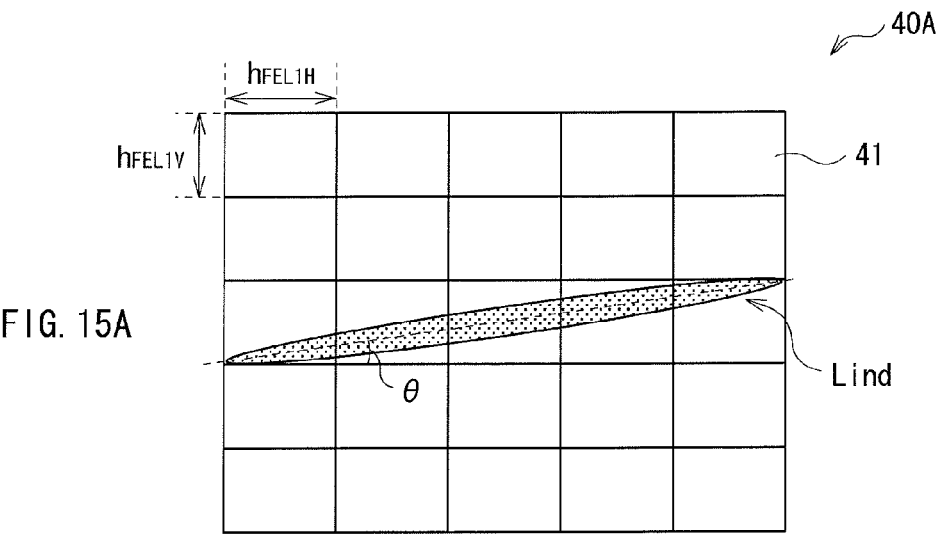
FIGS. 15A and 15B schematically illustrate exemplary luminance distribution of a light beam incident on the primary fly-eye lens of FIGS. 1A and 1B.
Figure 15B:
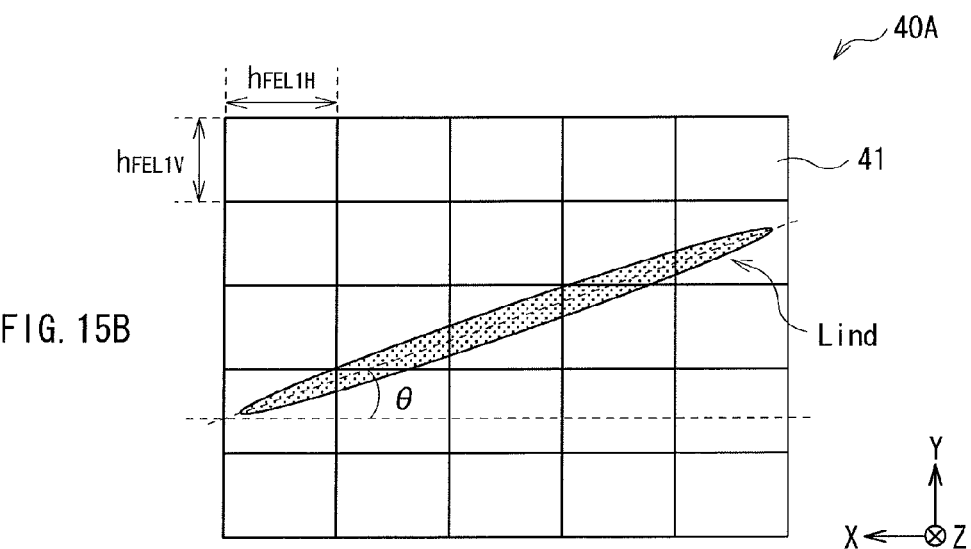

In this embodiment, a light beam incident on a surface (light incidence plane) of the fly-eye lens 40A exhibits a shape of luminance distribution (Lind) (luminance distribution shape), and the major axis of this luminance distribution (Lind) shape extends in a direction different from any of directions where the cells 41 of the fly-eye lens 40A are arrayed, as examples shown in FIGS. 15A and 15B. Specifically, each of the major and minor axes of the luminance distribution (Lind) of the incident light beam extends in the direction different from any of the array directions (or lateral (X-axis) and vertical (Y-axis) directions) of the cells 41. In more detail, the major axis of the luminance distribution (Lind) and any of the array directions of the cells 41 (X-axis direction in this case) are not aligned with each other, and form a predetermined angle θ (inclination or rotation angle), as examples shown in FIGS. 15A and 15B. This makes it easier for the integrator 40 to decrease the degree of the luminance non-uniformity of the incident light beam. The detail thereof will be described later. Furthermore, as in the example of FIG. 15A, it is preferable that the angle θ be set to be nearly equal to (preferably, exactly equal to) an angle formed by the vertical size ($h_{FEL1V}$) of the cell 41 and the whole lateral length (period) of the fly-eye lens 40A. In other words, preferably the angle θ is set to satisfy the following relational equation. One reason is that this makes it easier to decrease the degree of the luminance non-uniformity of the incident light beam by the integrator 40. The detail thereof will be described later. Note that although the detailed description is omitted, the wording "a shape of the luminance distribution (Lind) (luminance distribution (Lind) shape) of the incident light beam" shown in FIGS. 21A and 21B, 15A and 15B and the like refers to a shape formed by contour lines (luminance contour lines), each of which indicates a predetermined intensity value (luminance value), and this applies to the following cases.

$$\theta = \tan^{-1}[h_{FEL1V}/(h_{FEL1H} \times n_H)]$$

where $h_{FEL1H}$: a size of the cell 41 of the fly-eye lens 40A in the first direction, $h_{FEL1V}$: a size of the cell 41 of the fly-eye lens 40A in the second direction, and $n_H$: the number of cells 41 of the fly-eye lens 40A that are arrayed in the first direction (the number of cells).

Figure 16:
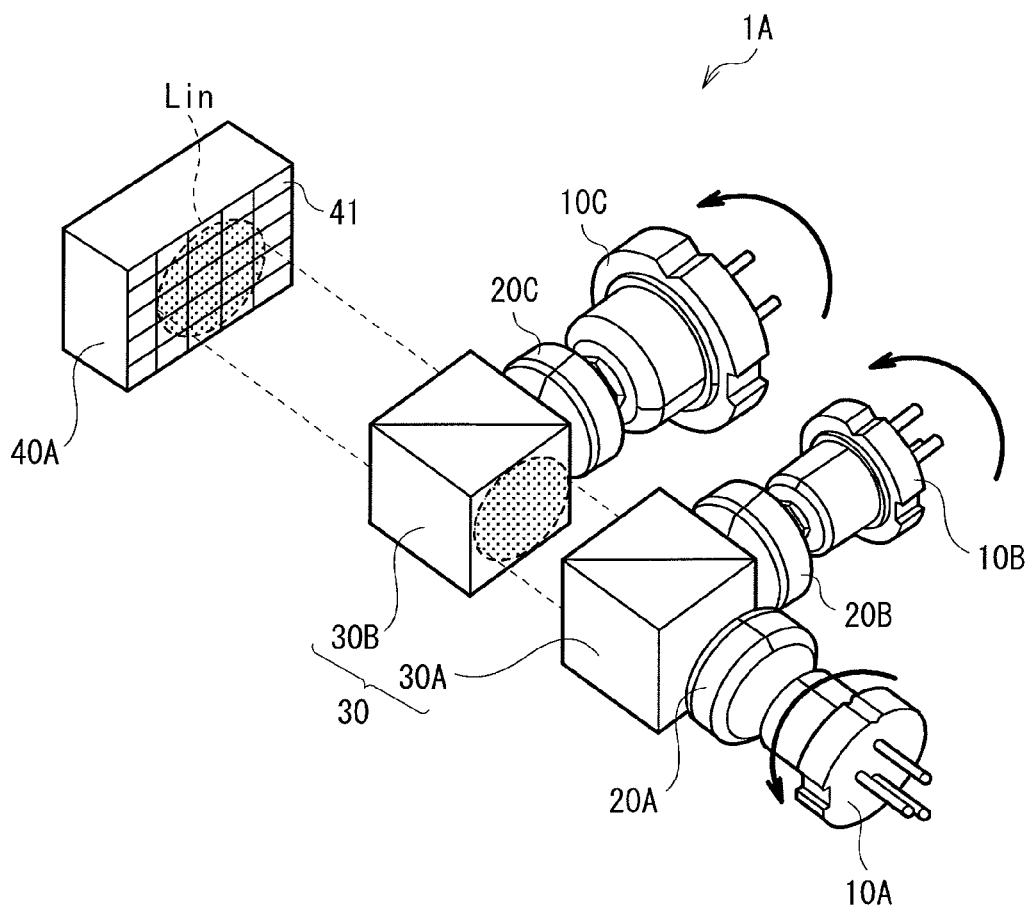
FIG. 16 illustrates an exemplary structure of main parts of the illumination optical system of FIGS. 1A and 1B in perspective.

In this embodiment, in order to incline (or rotate) the major axis of the luminance distribution (Lind) of the incident light beam with respect to the array direction of the cells 41, the light sources 10A, 10B, and 10C may be inclined (or rotated), as in an example shown in FIG. 16. In other words, the inclining (or rotation) of the major axis is realized by rotating, for example, the chip 11A of an LD, the solid-state light emitting device 11 containing the chip 11A of an LD, the light sources 10A, 10B, 10C or the like. For example, the chip 11A configured of an LD is inclined (or rotated), such that the major axis (or minor axis) of the luminance distribution (Lind) of the FFP of the laser beam which the light emitting spot 11B in the chip 11A of the LD emits is misaligned with any of the lateral and vertical directions (first and second directions) of the fly-eye lens 40A. Alternatively, in addition to the above-mentioned example, in order to incline (or rotate) the major axis of the luminance distribution (Lind) with respect to the array direction of the cells 41, other optical components in the illumination optical system 1A (for example, the coupling lenses 20A, 20B, and 20C, the dichroic mirrors 30A and 30B or the like) may be inclined (rotated).

[Second Part]

In this embodiment, when at least one of the light sources 10A, 10B, and 10C (first light source) is provided with the multiple light emitting spots 11B on one or more chips 11A configured of LDs, it is preferable that the projector 1 have the following structure. Specifically, it is preferable that the minor axes of the FFPs of the light beams from the light emitting spots 11B be substantially aligned with (preferably, aligned with) the minor axis (parallel to the Y axis in this case) on a plane (parallel to the X-Y plane in this case) perpendicular to the optical axis (parallel to the Z-axis in this case) of the abovementioned optical member (integrator 40 in this case). In other words, it is preferable that the respective minor axes of the FFPs of the light beams from the light emitting spots 11B in the abovementioned first light source be substantially aligned with (preferably, aligned with) the minor axis of the outer shape (for example, a rectangular case) of the projector 1. Moreover, if the first light source emits two or more light beams of different wavelengths, then it is preferable that the major axes of the FFPs of the light beams from the light emitting spots 11B be substantially aligned with (preferably, aligned with) each other.

Figure 17:
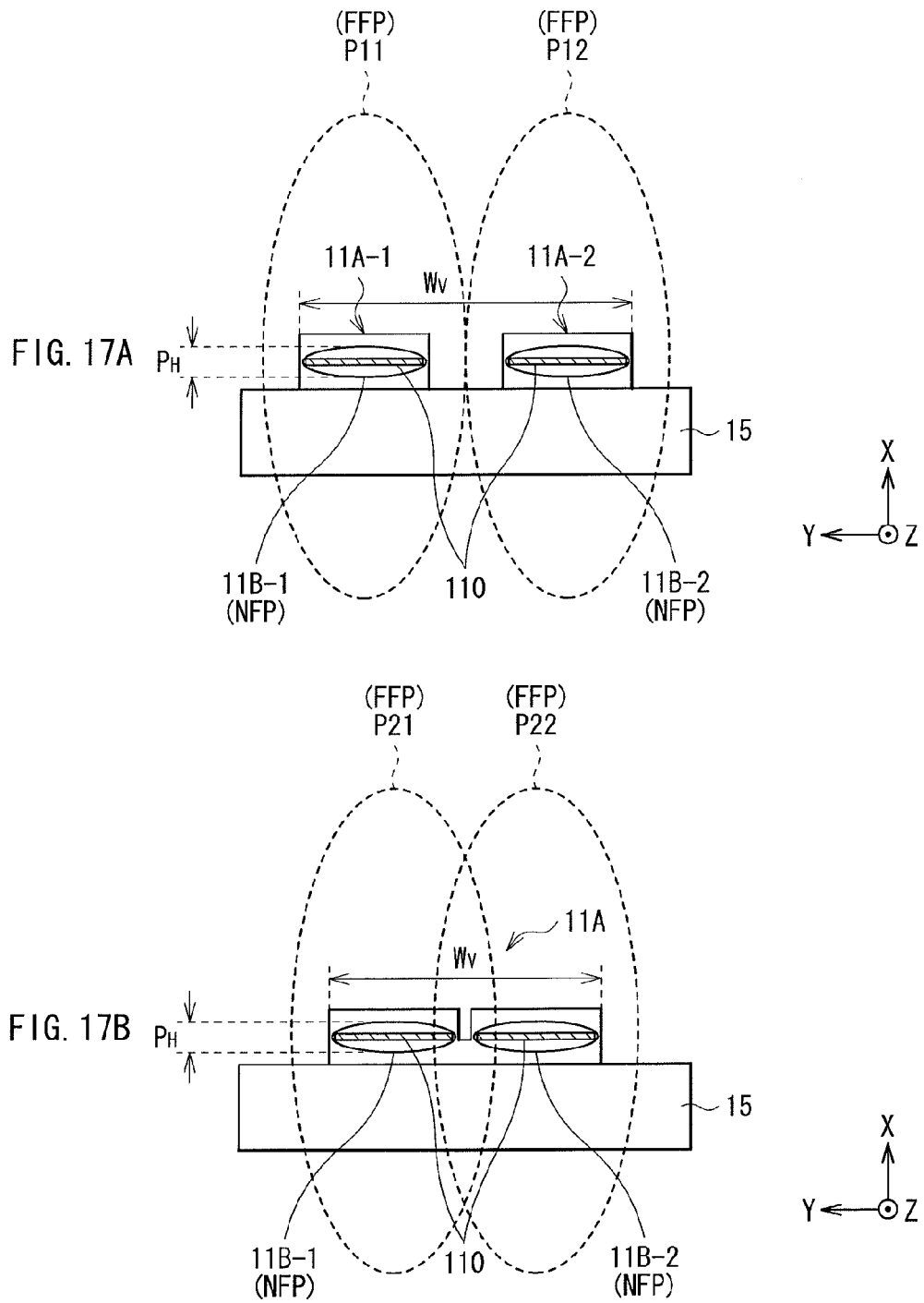
FIG. 17A illustrates an exemplary arrangement of FFPs and light emitting spots formed on a light source in the projector of FIGS. 1A and 1B.
FIG. 17B illustrates another exemplary arrangement of FFPs and light emitting spots formed on a light source in the projector of FIGS. 1A and 1B.

Referring to the example of FIG. 17A, the first light source has two chips 11A-1 and 11A-2 that are configured of LDs, and both chips are provided with respective light emitting spots (near field patterns (NFPs)) 11B-1 and 11B-2 including active layers 110. Meanwhile, referring to the example of FIG. 17B (example of the aforementioned monolithic structure), the first light source has the single chip 11A configured of an LD, and the chip 11A is provided with two light emitting spots 11B-1 and 11B-2. In addition, the light emitting spots 11B-1 and 11B-2 may emit light beams of the same wavelength or different wavelengths. In this case, the minor axes (parallel to the Y-axis direction in this case) of the FFPs (see dot-lines denoted by "P11" and "P12" in this figure) of the light beams from the light emitting spots 11B-1 and 11B-2 are aligned with the minor axis (parallel to the Y-axis in this case) on a plane perpendicular to the optical axis of the integrator 40. Furthermore, the major axes (parallel to the X-axis in this case) of the FFPs of the light beams from the light emitting spots 11B-1 and 11B-2 are aligned with each other.

[Third Part]

Figure 18:
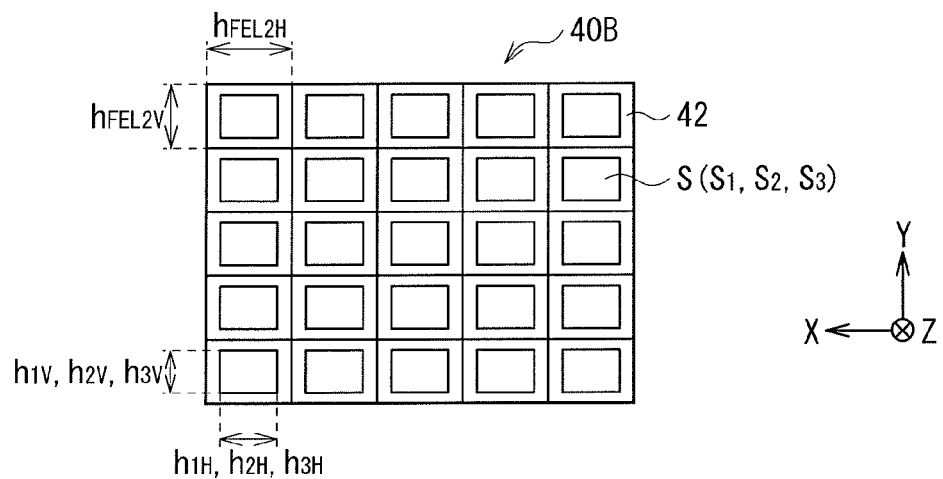
FIG. 18 schematically illustrates exemplary light source images appearing on the secondary fly-eye lens in the projector of FIGS. 1A and 1B.

In this embodiment, it is preferable that the individual focal distances of the coupling lenses 20A, 20B, and 20C and of the fly-eye lenses 40A and 40B be determined such that the sizes of light source images S which the cells 41 of the fly-eye lens 40A forms on the fly-eye lens 40B are not larger than the sizes of the corresponding cells 42 of the fly-eye lens 40B, respectively. This condition is expressed by the following equations (1) to (3). In addition, the condition is illustrated in FIG. 18. This figure shows an example in which each of the cells in fly-eye lenses 40A and 40B has a ratio of lateral and vertical lengths (aspect ratio) other than 1. The example of FIG. 18 will be described in detail later.

$$h_1 = P_1 \times (f_{FEL}/f_{CL1}) \le h_{FEL2} \quad (1)$$

$$h_2 = P_2 \times (f_{FEL}/f_{CL2}) \le h_{FEL2} \quad (2)$$

$$h_3 = P_3 \times (f_{FEL}/f_{CL3}) \le h_{FEL2} \quad (3)$$

where $h_1$ denotes a size of a light source image S (light source image $S_1$) created by a light beam from the light source 10A, $h_2$ denotes a size of a light source image S (light source image $S_2$) created by a light beam from the light source 10B, $h_3$ denotes a size of a light source image S (light source image $S_3$) created by a light beam from the light source 10C, $P_1$ denotes a size of a light emitting region in the solid-state light emitting device 11 contained in the light source 10A, $P_2$ denotes a size of a light emitting region in the solid-state light emitting device 11 contained in the light source 10B, $P_3$ denotes a size of a light emitting region in the solid-state light emitting device 11 contained in the light source 10C, $f_{FEL}$ denotes a focal distance of the fly-eye lenses 40A and 40B, $f_{CL1}$ denotes a focal distance of the coupling lens 20A, $f_{CL2}$ denotes a focal distance of the coupling lens 20B, $f_{CL3}$ denotes a focal distance of the coupling lens 20C, and $h_{FEL2}$ denotes a size of one cell 42 in the fly-eye lens 40B.

When the solid-state light emitting device 11 in the light source 10A is configured of the single chip 11A, the $P_1$ is equal to the size of the light emitting spot 11B in the chip 11A. Likewise, when the solid-state light emitting device 11 in the light source 10B is configured of the single chip 11A, the $P_2$ is equal to the size of the light emitting spot 11B in the chip 11A. When the solid-state light emitting device 11 in the light source 10C is configured of the single chip 11A, the $P_3$ is equal to the size of the light emitting spot 11B in the chip 11A. Meanwhile, when the solid-state light emitting device 11 in the light source 10A is configured of the multiple chips 11A, the $P_1$ is equal to the size of the region defined by the outer frame of the light emitting spots 11B of the chips 11A when all the chips 11A are arranged so as to minimize an occupied region thereof. Likewise, when the solid-state light emitting device 11 in the light source 10B is configured of the multiple chips 11A, the $P_2$ is equal to the size of the region defined by the outer frame of the light emitting spots 11B of the chips 11A when all the chips 11A are arranged so as to minimize an occupied region thereof. When the solid-state light emitting device 11 in the light source 10C is configured of the multiple chips 11A, the $P_3$ is equal to the size of the region defined by the outer frame of the light emitting spots 11B of the chips 11A when all the chips 11A are arranged so as to minimize an occupied region thereof. Furthermore, when the coupling lens 20A is formed by a combination of multiple lenses, the $f_{CL1}$ corresponds to a combined focal distance of these lenses. Likewise, when the coupling lens 20B is formed by a combination of multiple lenses, the $f_{CL2}$ corresponds to a combined focal distance of these lenses. When the coupling lens 20C is formed by a combination of multiple lenses, the $f_{CL3}$ corresponds to a combined focal distance of these lenses.

The following equations (4) to (6), which are substantially equivalent to the equations (1) to (3), respectively, are given below. These equations are effective especially when the size of the light emitting region in the solid-state light emitting device 11 is nearly equal to the size of the solid-state light emitting device 11 itself.

$$h_1 = W_1 \times (f_{FEL}/f_{CL1}) \le h_{FEL2} \quad (4)$$

$$h_2 = W_2 \times (f_{FEL}/f_{CL2}) \le h_{FEL2} \quad (5)$$

$$h_3 = W_3 \times (f_{FEL}/f_{CL3}) \le h_{FEL2} \quad (6)$$

where $W_1$ denotes a size of the solid-state light emitting device 11 in the light source 10A, $W_2$ denotes a size of the solid-state light emitting device 11 in the light source 10B, and $W_3$ denotes a size of the solid-state light emitting device 11 in the light source 10C.

When the solid-state light emitting device 11 is configured of the single chip 11A, the W is equal to the size of the chip 11A itself. Meanwhile, when the solid-state light emitting device 11 is configured of the multiple chips 11A, the W is equal to the size of the single chip when the multiple chips are regarded as a combined single chip.

In this embodiment, when the cells 41 and 42 of the fly-eye lenses 40A and 40B, respectively, have an aspect ratio other than 1, as in the example of FIGS. 13A and 13B, it is preferable that the respective focal distances of the coupling lenses 20A, 20B and 20C and of the fly-eye lenses 40A and 40B satisfy the relationship defined by the following equations (7) to (12). In addition, it is more preferable that the ratios of vertical and lateral focal distances (anamorphic ratio) in the coupling lenses 20A, 20B and 20C ($f_{CL1H}/f_{CL1V}$, $f_{CL2H}/f_{CL2V}$, and $f_{CL3H}/f_{CL3V}$) be each equal to the reciprocal of a ratio of vertical and lateral lengths of each cell 42 in the fly-eye lens 40B ($h_{FEL1V}/h_{FEL2H}$), and the illumination optical system 1A employ an anamorphic optical system. For example, when each cell 42 of the fly-eye lens 40B has a diameter in the first direction (for example, lateral direction) longer than that in the second direction (for example, vertical direction), it is preferable that the focal distances $f_{CL1V}$, $f_{CL2V}$, and $f_{CL3V}$ of the coupling lenses 20A, 20B and 20C be longer than the focal distances $f_{CL1H}$, $f_{CL2H}$, and $f_{CL3H}$ thereof, respectively. The relationship represented by the equations (7) to (12) is illustrated in FIG. 18.

$$h_{1H}=P_{1H} \times (f_{FELH}/f_{CL1H}) \le h_{FEL2H} \quad (7)$$

$$h_{2H}=P_{2H} \times (f_{FELH}/f_{CL2H}) \le h_{FEL2H} \quad (8)$$

$$h_{3H}=P_{3H} \times (f_{FELH}/f_{CL3H}) \le h_{FEL2H} \quad (9)$$

$$h_{1V}=P_{1V} \times (f_{FELV}/f_{CL1V}) \le h_{FEL2V} \quad (10)$$

$$h_{2V}=P_{2V} \times (f_{FELV}/f_{CL2V}) \le h_{FEL2V} \quad (11)$$

$$h_{3V}=P_{3V} \times (f_{FELV}/f_{CL3V}) \le h_{FEL2V} \quad (12)$$

where $h_{1H}$ denotes a size of a light source image S (light source image $S_1$) in the first direction (for example, lateral direction), which is created by a light beam from the light source 10A, $h_{2H}$ denotes a size of a light source image S (light source image $S_2$) in the first direction (for example, lateral direction), which is created by a light beam from the light source 10B, $h_{3H}$ denotes a size of a light source image S (light source image $S_3$) in the first direction (for example, lateral direction), which is created by a light beam from the light source 10C, $h_{1V}$ denotes a size of a light source image S (light source image $S_1$) in the second direction perpendicular to the first direction (for example, vertical direction), which is created by a light beam from the light source 10A, $h_{2V}$ denotes a size of a light source image S (light source image $S_2$) in the second direction perpendicular to the first direction (for example, vertical direction), which is created by a light beam from the light source 10B, $h_{3V}$ denotes a size of a light source image S (light source image $S_3$) in the second direction perpendicular to the first direction (for example, the vertical direction), which is created by a light beam from the light source 10C, $P_{1H}$ denotes a size of the light emitting region in the first direction or a direction corresponding thereto, which is located on the solid-state light emitting device 11 contained in the light source 10A, $P_{2H}$ denotes a size of the light emitting region in the first direction or a direction corresponding thereto, which is located on the solid-state light emitting device 11 contained in the light source 10B, $P_{3H}$ denotes a size of the light emitting region in the first direction or a direction corresponding thereto, which is located on the solid-state light emitting device 11 contained in the light source 10C, $P_{1V}$ denotes a size of the light emitting region in the second direction or a direction corresponding thereto, which is located on the solid-state light emitting device 11 contained in the light source 10A, $P_{2V}$ denotes a size of the light emitting region in the second direction or a direction corresponding thereto, which is located on the solid-state light emitting device 11 contained in the light source 10B, $P_{3V}$ denotes a size of the light emitting region in the second direction or a direction corresponding thereto, which is located on the solid-state light emitting device 11 contained in the light source 10C, $f_{FELH}$ denotes a focal distance of the fly-eye lenses 40A and 40B in the first direction, $f_{FELV}$ denotes a focal distance of the fly-eye lenses 40A and 40B in the second direction, $f_{CL1H}$ denotes a focal distance of the coupling lens 20A in the first direction or a direction corresponding thereto, $f_{CL2H}$ denotes a focal distance of the coupling lens 20B in the first direction or a direction corresponding thereto, $f_{CL3H}$ denotes a focal distance of the coupling lens 20C in the first direction or a direction thereto, $f_{CL1V}$ denotes a focal distance of the coupling lens 20A in the second direction or a direction corresponding thereto, $f_{CL2V}$ denotes a focal distance of the coupling lens 20B in the second direction or a direction corresponding thereto, $f_{CL3V}$ denotes a focal distance of the coupling lens 20C in the second direction or a direction corresponding thereto, $h_{FEL2H}$ denotes a size of one cell 42 in the fly-eye lens 40B in the first direction, and $h_{FEL2V}$ denotes a size of one cell 42 in the fly-eye lens 40B in the second direction.

As used herein, the wording "first direction or a direction corresponding thereto" refers to the first direction, if the light sources 10A, 10B, and 10C, and the coupling lenses 20A, 20B and 20C are aligned with the optical axis of the integrator 40. Meanwhile, the wording "first direction or a direction corresponding thereto" refers to a direction corresponding to the first direction, which is determined on the basis of the layout of the optical devices on the optical paths between the respective light sources 10A, 10B, and 10C and the integrator 40, if light sources 10A, 10B, and 10C and the coupling lenses 20A, 20B and 20C are aligned with an optical axis deviating from the optical axis of the integrator 40.

Likewise, as used herein, the wording "second direction or a direction corresponding thereto" refers to the second direction, if the light sources 10A, 10B, and 10C, and the coupling lenses 20A, 20B and 20C are aligned with the optical axis of the integrator 40. Meanwhile, the wording "second direction or a direction corresponding thereto" refers to the direction corresponding to the second direction, which is determined on the basis of the layout of the optical devices on the optical paths between the respective light sources 10A, 10B, and 10C and the integrator 40, if light sources 10A, 10B, and 10C and the coupling lenses 20A, 20B and 20C are aligned with an optical axis deviating from the optical axis of the integrator 40.

When the solid-state light emitting device 11 in the light source 10A is configured of the single chip 11A, the $P_{1H}$ is equal to the size of the light emitting spot 11B on the chip 11A in the first direction or a direction corresponding thereto. Likewise, when the solid-state light emitting device 11 in the light source 10B is configured of the single chip 11A, the $P_{2H}$ is equal to the size of the light emitting spot 11B on the chip 11A in the first direction or a direction corresponding thereto. When the solid-state light emitting device 11 in the light source 10C is configured of the single chip 11A, the $P_{3H}$ is equal to the size of the light emitting spot 11B on the chip 11A in the first direction or a direction corresponding thereto. Meanwhile, when the solid-state light emitting device 11 in the light source 10A is configured of the multiple chips 11A, the $P_{1H}$ is equal to the size of a region, in the first direction or a direction corresponding thereto, which is defined by the outer frame of the light emitting spots 11B of the chips 11A when all the chips 11A are arranged so as to minimize an occupied region thereof. Likewise, when the solid-state light emitting device 11 in the light source 10B is configured of the multiple chips 11A, the $P_{2H}$ is equal to the size of a region, in the first direction or a direction corresponding thereto, which is defined by the outer frame of the light emitting spots 11B of the chips 11A when all the chips 11A are arranged so as to minimize an occupied region thereof. When the solid-state light emitting device 11 in the light source 10C is configured of the multiple chips 11A, then the $P_{3H}$ is equal to the size of a region, in the first direction or a direction corresponding thereto, which is defined by the outer frame of the light emitting spots 11B of the chips 11A when all the chips 11A are arranged so as to minimize an occupied region thereof. When the solid-state light emitting device 11 in the light source 10A is configured of the single chip 11A, the $P_{1V}$ is equal to the size of the light emitting spot 11B on the chip 11A in the second direction or a direction corresponding thereto. Likewise, when the solid-state light emitting device 11 in the light source 10B is configured of the single chip 11A, the $P_{2V}$ is equal to the size of the light emitting spot 11B on the chip 11A in the second direction or a direction corresponding thereto. When the solid-state light emitting device 11 in the light source 10C is configured of the single chip 11A, the $P_{3V}$ is equal to the size of the light emitting spot 11B on the chip 11A in the second direction or a direction corresponding thereto. Meanwhile, when the solid-state light emitting device 11 in the light source 10A is configured of the multiple chips 11A, the $P_{1V}$ is equal to the size of a region, in the second direction or a direction corresponding thereto, which is defined by the outer frame of the light emitting spots 11B of the chips 11A when all the chips 11A are arranged so as to minimize an occupied region thereof. Likewise, when the solid-state light emitting device 11 in the light source 10B is configured of the multiple chips 11A, the $P_{2V}$ is equal to the size of a region, in the second direction or the direction corresponding thereto, which is defined by the outer frame of the light emitting spots 11B of the chips 11A when all the chips 11A are arranged so as to minimize an occupied region thereof. Furthermore, when the solid-state light emitting device 11 in the light source 10C is configured of the multiple chips 11A, the $P_{3V}$ is equal to the size of a region, in the second direction or the direction corresponding thereto, which is defined by the outer frame of the light emitting spots 11B of the chips 11A when all the chips 11A are arranged so as to minimize an occupied region thereof.

Figure 19:
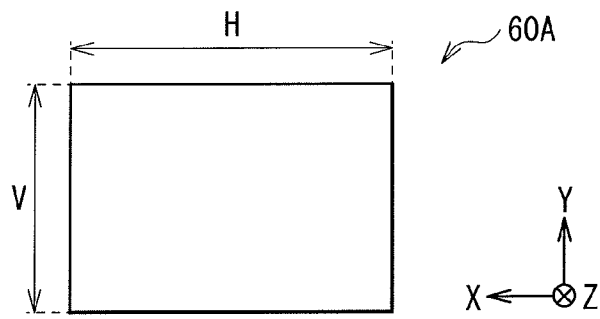
FIG. 19 schematically illustrates a size of an illumination region.

In this embodiment, if each of the cells 41 in the fly-eye lenses 40A and the cells 42 in the fly-eye lenses 40B, respectively, has an aspect ratio other than 1, then it is preferable that the aspect ratios of each cell 41 in the fly-eye lens 40A and of the illumination region 60A satisfy a relationship defined by the following equation (13). Note that the aspect ratio (H/V) (see FIG. 19) of the illumination region 60A is correlated with the resolution of the spatial modulation device 60. For example, if the resolution (VGA) of the spatial modulation device 60 is 640×480, then the aspect ratio (H/V) of the illumination region 60A is 640/480. For example, if the resolution (WVGA) of the spatial modulation device 60 is 800×480, then the aspect ratio (H/V) of the illumination region 60A is 800/480.

$$h_{FEL1H}/h_{FEL1V}=H/V \tag{13}$$

where $h_{FEL1H}$ denotes a size of one cell in the fly-eye lens 40A in the first direction, $h_{FEL1V}$ denotes a size of one cell in the fly-eye lens 40A in the second direction, H denotes a size of the illumination region 60A in the first direction, and V denotes a size of the illumination region 60A in the second direction.

[Fourth Part]

In this embodiment, it is preferable that the focal distances and numerical apertures (NAs) of the coupling lenses 20A, 20B and 20C be determined such that the size of the light beams incident on the coupling lenses 20A, 20B and 20C is not larger than the size of these coupling lenses. These conditions are represented by the following equations (14) to (16).

$$\phi_{CL1}=2\times f_{CL1}\times NA_1 \leq h_{CL1} \tag{14}$$

$$\phi_{CL2}\times 2\times f_{CL2}\times NA_2 \leq h_{CL2} \tag{15}$$

$$\phi_{CL3}=2\times f_{CL3}\times NA_3 \leq h_{CL3} \tag{16}$$

where $\phi_{CL1}$: denotes a size of a light beam incident on the coupling lens 20A, $\phi_{CL2}$: denotes a size of a light beam incident on the coupling lens 20B, $\phi_{CL3}$: denotes a size of a light beam incident on the coupling lens 20C, $NA_1$ denotes an NA of the coupling lens 20A, $NA_2$ denotes an NA of the coupling lens 20B, $NA_3$ denotes an NA of the coupling lens 20C, $h_{CL1}$ denotes a size of the coupling lens 20A, $h_{CL2}$ denotes a size of the coupling lens 20B, and $h_{CL3}$ denotes a size of the coupling lens 20C.

In this embodiment, if the coupling lenses 20A, 20B and 20C have the aspect ratio other than 1, then it is preferable that the focal distances and NAs of the coupling lenses 20A, 20B and 20C satisfy a relationship defined by the following equations (17) to (22).

$$\phi_{CL1H}=2\times f_{CL1H}\times NA_{1H} \leq h_{CL1H} \tag{17}$$

$$\phi_{CL2H}=2\times f_{CL2H}\times NA_{2H} \leq h_{CL2H} \tag{18}$$

$$\phi_{CL3H}=2\times f_{CL3H}\times NA_{3H} \leq h_{CL3H} \tag{19}$$

$$\phi_{CL1V}=2\times f_{CL1V}\times NA_{1V} \leq h_{CL1V} \tag{20}$$

$$\phi_{CL2V}=2\times f_{CL2V}\times NA_{2V} \leq h_{CL2V} \tag{21}$$

$$\phi_{CL3V}=2\times f_{CL3V}\times NA_{3V} \leq h_{CL3V} \tag{22}$$

where $\phi_{CL1H}$ denotes a size of a light beam incident on the coupling lens 20A in the first direction (for example, lateral direction) or a direction corresponding thereto, $\phi_{CL2H}$ denotes a size of a light beam incident on the coupling lens 20B in the first direction (for example, lateral direction) or a direction corresponding thereto, $\phi_{CL3H}$ denotes a size of a light beam incident on the coupling lens 20C in the first direction (for example, lateral direction) or a direction corresponding thereto, $\phi_{CL1V}$ denotes a size of a light beam incident on the coupling lens 20A in the second direction (for example, lateral direction) or a direction corresponding thereto, $\phi_{CL2V}$ denotes a size of a light beam incident on the coupling lens 20B in the second direction (for example, lateral direction) or a direction corresponding thereto, $\phi_{CL3V}$ denotes a size of a light beam incident on the coupling lens 20C in the second direction (for example, lateral direction) or a direction corresponding thereto, $NA_{1H}$ denotes an NA of the coupling lens 20A in the first direction or a direction corresponding thereto, $NA_{2H}$ denotes an NA of the coupling lens 20B in the first direction or a direction corresponding thereto, $NA_{3H}$ denotes an NA of the coupling lens 20C in the first direction or a direction corresponding thereto, $NA_{1V}$ denotes an NA of the coupling lens 20A in the second direction or a direction corresponding thereto, $NA_{2V}$ denotes an NA of the coupling lens 20B in the second direction or a direction corresponding thereto, $NA_{3V}$ denotes an NA of the coupling lens 20C in the second direction or a direction corresponding thereto, $h_{CL1H}$ denotes a size of the coupling lens 20A in the first direction or a direction corresponding thereto, $h_{CL2H}$ denotes a size of the coupling lens 20B in the first direction or a direction corresponding thereto, $h_{CL3H}$ denotes a size of the coupling lens 20C in the first direction or a direction corresponding thereto, $h_{CL1V}$ denotes a size of the coupling lens 20A in the second direction or a direction corresponding thereto, $h_{CL2V}$ denotes a size of the coupling lens 20B in the second direction or a direction corresponding thereto, and $h_{CL3V}$ denotes a size of the coupling lens 20C in the second direction or a direction corresponding thereto.

[Function and Effect of Projector 1]

Next, a description will be given below of a function and effect of the projector 1 according to this embodiment.

In this embodiment, at least one of all the chips 11A in the light sources 10A, 10B, and 10C is configured of an LD. Accordingly, a laser light beam that is emitted from the light emitting spot 11B in the chip 11A configured of an LD exhibits the far filed pattern (FFP) of the sharp (non-isotropic) luminance distribution shape (elliptic shape in this embodiment), as in an example shown in FIG. 14.

In this embodiment, the luminance distribution (Lind) shape of the light beam incident on the incidence plane of the fly-eye lens 40A has a major axis extending in a direction different from any of the directions the cells 41 of the fly-eye lens 40A are arrayed in, as the example of FIGS. 15A and 15B. Specifically, each of the major and minor axes of the luminance distribution (Lind) of the incident light beam extends in the direction different from any of the array directions (or lateral (X-axis) and vertical (Y-axis) directions) of the cells 41. In order to incline (or rotate) the major axis of the luminance distribution (Lind) with respect to the array directions of the cells 41, the light sources 10A, 10B, and 10C may be inclined (or rotated), as in the example of FIG. 16. For example, the chip 11A configured of an LD is inclined (or rotated), such that the major axis (or minor axis) of the luminance distribution (Lind) of the FFP of the laser beam, which the chip 11A of the LD emits from the light-emitting spot 11B, extends in a direction different from any of the lateral and vertical directions of the fly-eye lens 40A.

Figure 20:
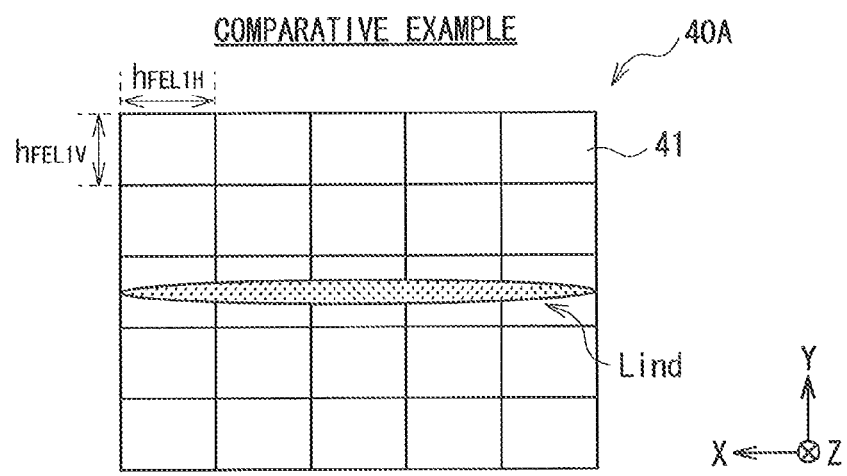
FIG. 20 schematically illustrates exemplary luminance distribution of a light beam incident on the primary fly-eye lens in a projector of a comparative example.
Figure 21A:
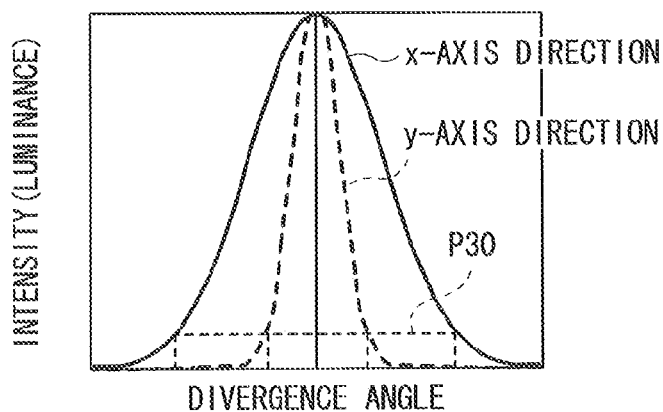
FIGS. 21A and 21B illustrate a detailed property of the luminance distribution shown in FIG. 20.
Figure 21B:
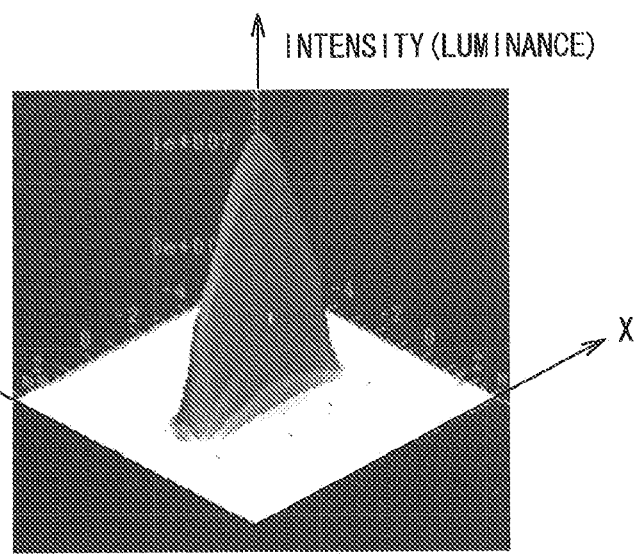

On the other hand, in a projector of a comparative example, the major axis of the luminance distribution (Lind) of a light beam incident on the incidence plane of the fly-eye lens 40A is aligned with one of the directions (lateral (X-axis) direction in this embodiment) the cells 41 of the fly-eye lens 40A are arrayed in, as in an example of FIG. 20. Specifically, as opposed to the examples of FIGS. 15A and 15B according to the present embodiment, the major axis of the luminance distribution (Lind) and any of the array directions (X-axis direction in this case) of the cells 41 do not form a predetermined angle $\theta$ ($\theta=0°$). Note that the shape of the luminance distribution (Lind) (luminance distribution (Lind) shape) of the incident light beam as shown in FIGS. 15A, 15B, 20, etc. corresponds to a shape formed by contour lines (luminance contour lines), each of which indicates a predetermined intensity value (luminance value). Specifically, if a laser beam emitted from the light emitting spot 11B of the chip 11A configured of an LD exhibits a sharp luminance distribution shape, as an example shown in FIGS. 21A and 21B, then the shape of the luminance distribution (Lind) corresponds to a shape formed by luminance contour lines, each of which has a luminance value denoted by "P30" in FIG. 21A.

Figure 22:
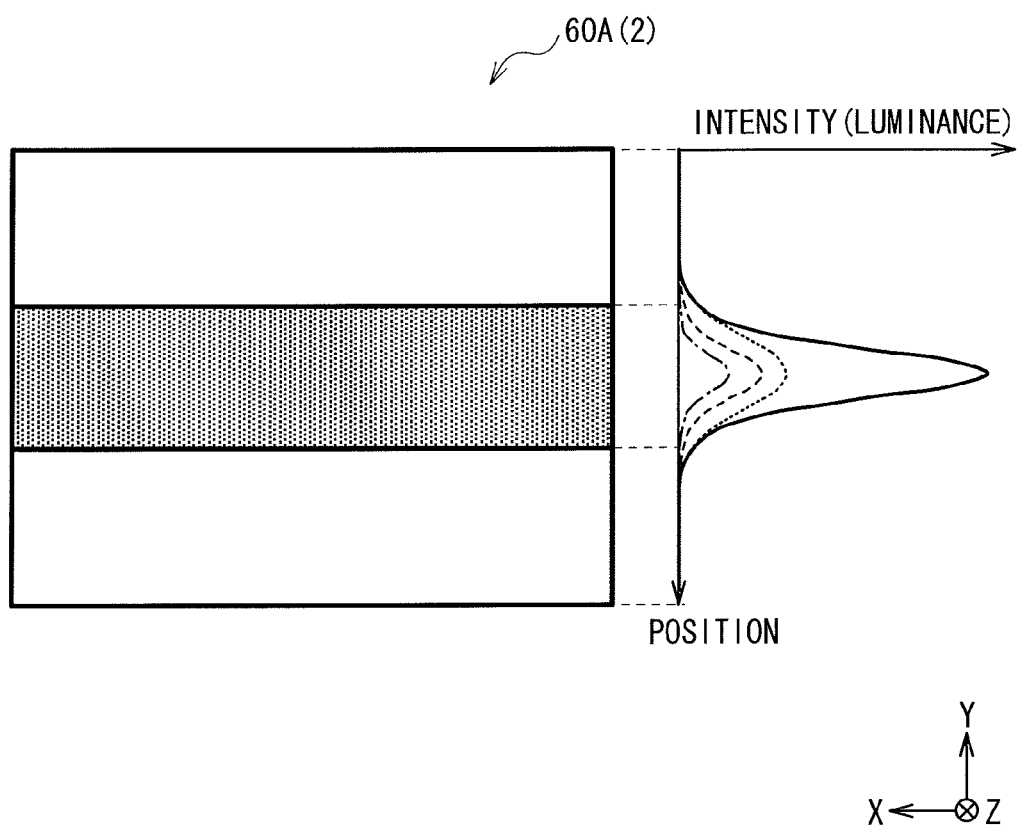
FIG. 22 illustrates exemplary luminance distribution of a light beam incident on the primary fly-eye lens in a projector of a comparative example.

In the projector of this comparative example, the laser beam that is emitted from the light emitting spot 11B of the chip 11A configured of an LD exhibits the sharp luminance distribution shape (for example, the FFP having non-circular (non-isotropic) or elliptic shape), as described above. Hence, if the laser light beam exhibits an excessively sharp luminance distribution shape, (for example, if the luminance distribution shape is sharper than that of the cells 41 and 42 in the fly-eye lens 40A and 40B, respectively), then the integrator 40 may not be able to decrease the degree of the luminance non-uniformity of the illumination light (incident light) (or to equalize the luminance distribution). In this case, on the illumination region 60A and the screen 2 to which the illumination light and the image light (displayed light) are projected, the luminance non-uniformity may appear, as in an example shown in FIG. 22, thereby degrading the quality of the displayed image.

In contrast, in this embodiment, the luminance distribution (Lind) shape, which a light beam incident on the surface of the fly-eye lens 40A exhibits, has the major axis extending in a direction different from any of the array directions of the cells 41 in the fly-eye lens 40A, as described above. This makes it easier for the integrator 40 to decrease the degree of the luminance non-uniformity of the illumination light, even when the laser beam, which is output from the light source including the chip 11A configured of an LD, exhibits a sharp luminance distribution shape (for example, the FFP has a non-circular (non-isotropic) or elliptic shape). Concretely, the cells 41 of the fly-eye lens 40A overlay multiple incident light beams of a luminance distribution (Lind) shape (produces the overlay effect), as in an example in (A) of FIG. 23, thereby decreasing the degree of the luminance non-uniformity effectively, as shown in (B) of FIG. 23. Thus, the projector 1 of this embodiment decreases the degree of the luminance non-uniformity of the illumination light and displayed light more effectively than the projector of the comparative example does (the projector 1 prevents the occurrence of the luminance non-uniformity in this embodiment). Consequently, the projector 1 of this embodiment exhibits the improved display quality.

Especially when an angle which the major axis of the luminance distribution (Lind) shape of the incident light beam forms with one of the array directions (X-axis direction in this case) of the cells 41 satisfies the relationship shown by the expression ($\theta=\tan^{-1}(h_{FEL1V}/(h_{FEL1H} \times n_H))$), the integrator 40 decreases the degree of the luminance non-uniformity of the illumination light and the displayed light more effectively. This is because if the incident light of the luminance distribution (Lind) is irradiated across the whole width (period) of the fly-eye lens 40A and over the multiple cells in the vertical direction, then nonuniform luminance distribution patterns may appear on a displayed image at regular intervals. In this case, the significant effect on the decrease in the luminance non-uniformity of the illumination light may not be provided.

Figures 23, 24:
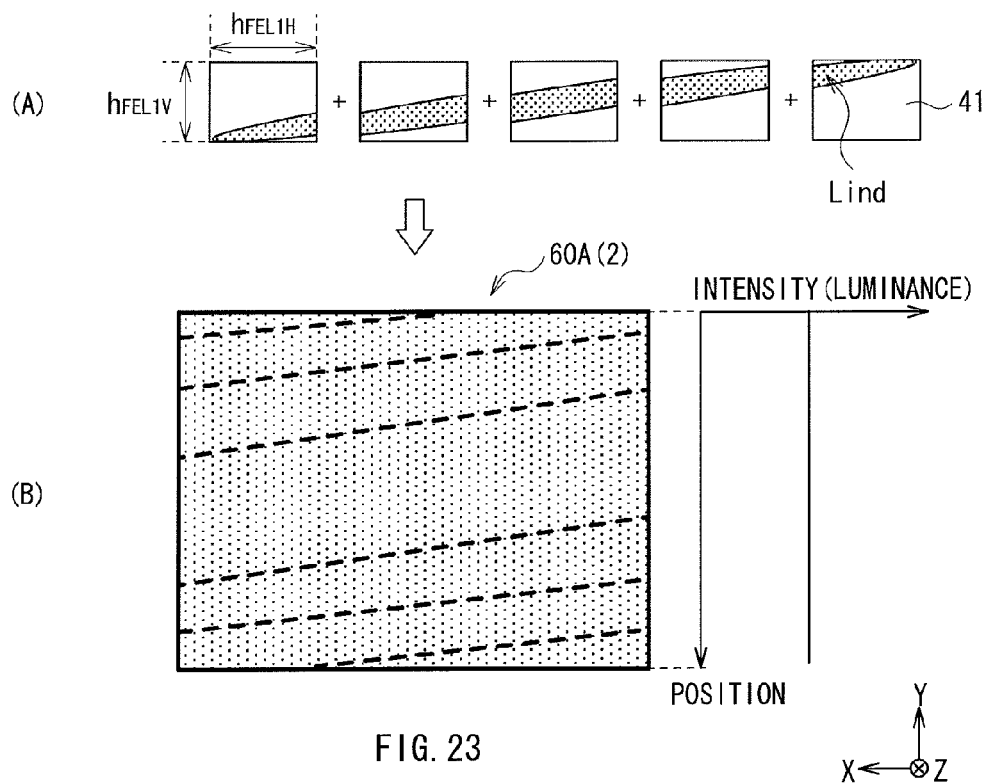
FIG. 23 illustrates a function of decreasing the degree of luminance non-uniformity by the illumination optical system of the first embodiment.
FIG. 24 illustrates exemplary characteristics of a projector according to an example of the first embodiment.

FIG. 24 shows an example of individual properties (relationship between the aspect ratio on the illumination region 60A and the abovementioned parameters $n_H$, $h_{FEL1H}$, $h_{FEL1V}$, and $\theta$) in this embodiment. It can be seen from this example that the integrator 40 has the most major effect on the decrease in the degree of the luminance non-uniformity, when the angle $\theta$ falls within a range of approximately 2.7 degrees to 7.1 degrees.

In this embodiment, when at least one of the light sources 10A, 10B, and 10C (first light source) is provided with the multiple light emitting spots 11B formed on the chip or chips 11A configured of an LD, as in the examples of FIGS. 17A and 17B, the following function and effect are achieved when the projector 1 is configured as follows. Namely, the minor axes of the FFPs of the light beams from the light emitting spots 11B are adjusted to be substantially aligned with the minor axis on a plane perpendicular to the optical axis of the integrator 40. By this adjustment, the minor axes of the FFPs of the light beams from the light emitting spots 11B are also substantially aligned with the minor axis of the outer case of the projector 1. This makes it possible to achieve further compactness of the projector 1. Furthermore, if the first light source emits light beams of two or more different wavelengths, when the major axes of the FFPs of the light beams from the light emitting spots 11B are substantially aligned with one another, it is possible to decrease the loss of the light beam in the illumination optical system of the projector 1 in an example where, for example, an I-cut lens is used. Specifically, by positioning the slit of the I-cut lens so as to be aligned with the major axes of the FFPs of light beams from the LDs, the loss of the light beams is reduced, although the active region of the light beams is narrowed.

In this embodiment, when the focal distances ($f_{CL1}$, $f_{CL2}$, $f_{CL3}$, and $f_{FEL}$) of the coupling lenses 20A, 20B and 20C and of the fly-eye lenses 40A and 40B are determined such that the sizes of the light source images which the cells 41 of the fly-eye lens 40A forms on the fly-eye lens 40B are not larger than the sizes of the corresponding cells 42 of the fly-eye lens 40B, as in the example of FIG. 18, the projector 1 of this embodiment provides the following function and effect. The solid-state light emitting device 11 is adapted to emit one or more light beams from the light emitting region including one or more light emitting spots of a dot or non-dot shape, and this solid-state light emitting device 11 is configured by, for example, one or more LEDs, OLEDs, or LDs. Therefore, even if the fly-eye lens 40B is positioned at the focal positions of the fly-eye lens 40A, the light source images S which the cells of the fly-eye lens 40A form on the fly-eye lens 40B are not perfect dot-shape, and each of the images S has a certain size (see FIG. 18). However, in this embodiment, since it is unlikely that the light source images S is formed over the multiple cells, the light beams incident on the fly-eye lens 40B are delivered to the illumination region 60A efficiently. It is thus possible to improve the efficiency of utilizing the light in the illumination optical system 1A.

In this embodiment, if each of the cells 41 and 42 in the fly-eye lenses 40A and 40B, respectively, has an aspect ratio other than 1, then the focal distances ($f_{CL1H}$, $f_{CL2H}$, $f_{CL3H}$, $f_{CL1V}$, $f_{CL2V}$, $f_{CL3V}$, $f_{FELH}$, and $f_{FELV}$) of the coupling lenses 20A, 20B and 20C and of the fly-eye lenses 40A and 40B may be determined in consideration of this aspect ratio, so that the efficiency of utilizing the light in the illumination optical system 1A is further improved. Moreover, in this embodiment, if the coupling lenses 20A, 20B and 20C have an aspect ratio other than 1, then the focal distances ($f_{CL1H}$, $f_{CL2H}$, $f_{CL3H}$, $f_{CL1V}$, $f_{CL2V}$, and $f_{CL3V}$) and the NAs ($NA_{1H}$, $NA_{2H}$, $NA_{3H}$, $NA_{1V}$, $NA_{2V}$, and $NA_{3V}$) of the coupling lenses 20A, 20B and 20C may be determined in consideration of this aspect ratio, so that the efficiency of utilizing the light in the illumination optical system 1A is further improved. Furthermore, in this embodiment, if the directivity angles of the light sources 10A, 10B, and 10C differ from one another, then the focal distances ($f_{CL1H}$, $f_{CL2H}$, $f_{CL3H}$, $f_{CL1V}$, $f_{CL2V}$, and $f_{CL3V}$) and the NAs ($NA_{1H}$, $NA_{2H}$, $NA_{3H}$, $NA_{1V}$, $NA_{2V}$, and $NA_{3V}$) of the coupling lenses 20A, 20B and 20C may be determined in consideration of this difference in the directivity angle, so that the efficiency of utilizing the light in the illumination optical system 1A is further improved.

Up to this point, the projector 1 of the first embodiment has been described. Subsequently, a description will be given below of projectors according to other embodiments (second to fifth embodiments). Note that in the following embodiments, the same components as those in the first embodiment are denoted with the same reference numbers, and the explanation thereof will be omitted as appropriate.

Second Embodiment

Figure 25:
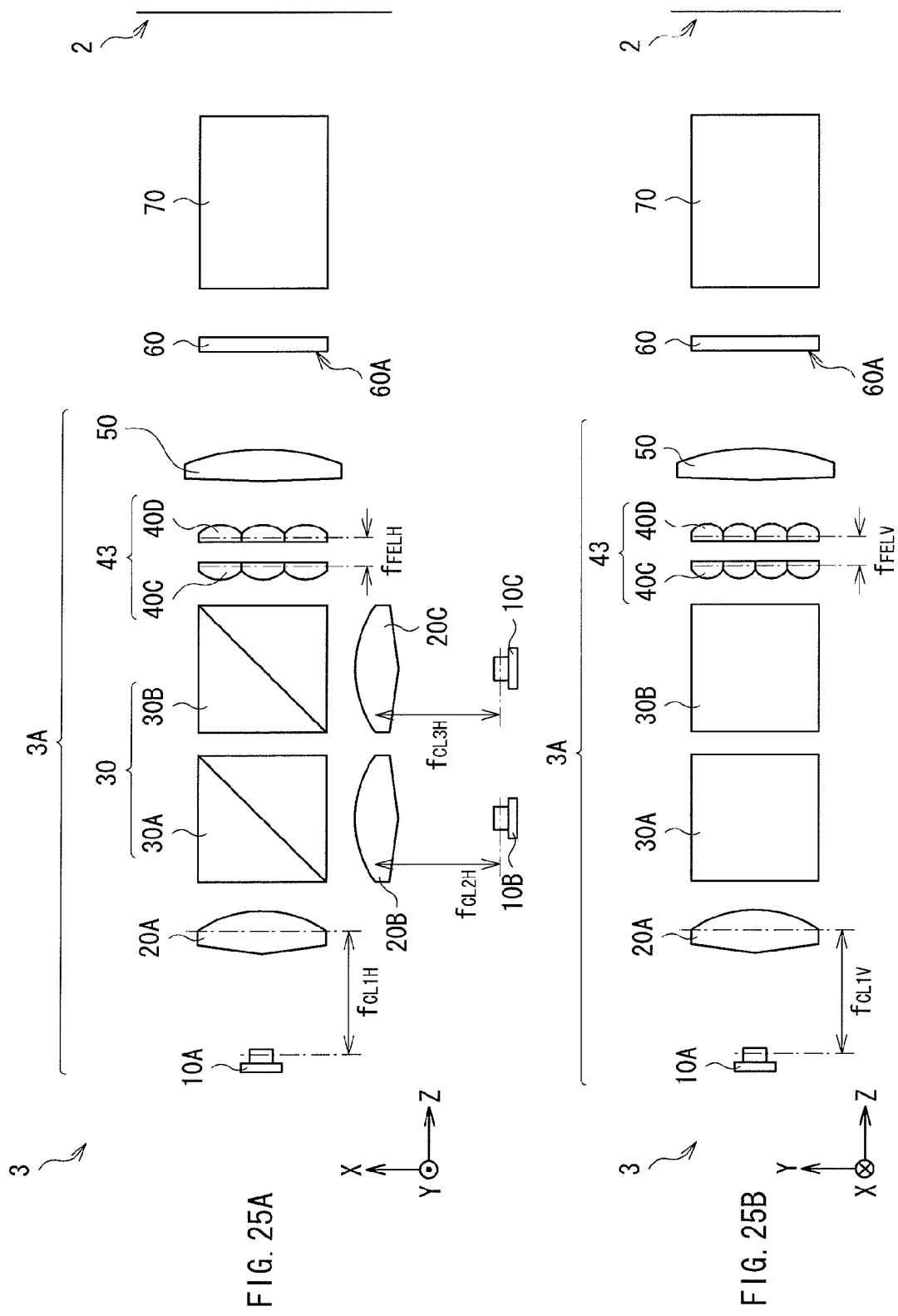
FIGS. 25A and 25B illustrate a schematic structure of a projector according to a second embodiment of the present disclosure.

FIGS. 25A and 25B show a schematic structure of a projector (projector 3) according to a second embodiment of the present disclosure. This projector 3 corresponds to a concrete example of the "projection display unit" according to an embodiment of the present disclosure. FIG. 25A shows an exemplary structure of the projector 3 from the above (in a Y-axis direction), and FIG. 25B shows the exemplary structure of the projector 3 from the side (in an X-axis direction).

The projector 3 of this embodiment is provided with an illumination optical system 3A, and therefore, a structure thereof differs from that of the projector 1 provided with the illumination optical system 1A. Accordingly, the following description will be mainly focused on differences from the projector 1, and the description of the same points will be omitted as appropriate. The illumination optical system 3A corresponds to a concrete example of the "illumination unit" according to an embodiment of the present disclosure.

[Structure of Illumination Optical System 3A]

The illumination optical system 3A includes an integrator 43 having a pair of fly-eye lenses 40C and 40D, instead of the integrator 40 having the pair of fly-eye lenses 40A and 40B in the illumination optical system 1A. In other words, the illumination optical system 3A is provided with the fly-eye lenses 40C and 40D as will be described later, instead of the fly-eye lenses 40A and 40B in the illumination optical system 1A. These fly-eye lenses 40C and 40D have cells 41 and 42, respectively, and the array geometry of the cells 41 corresponds to that of the cells 42. Therefore, the following description will be mainly centered on the fly-eye lens 40C.

Figure 26:
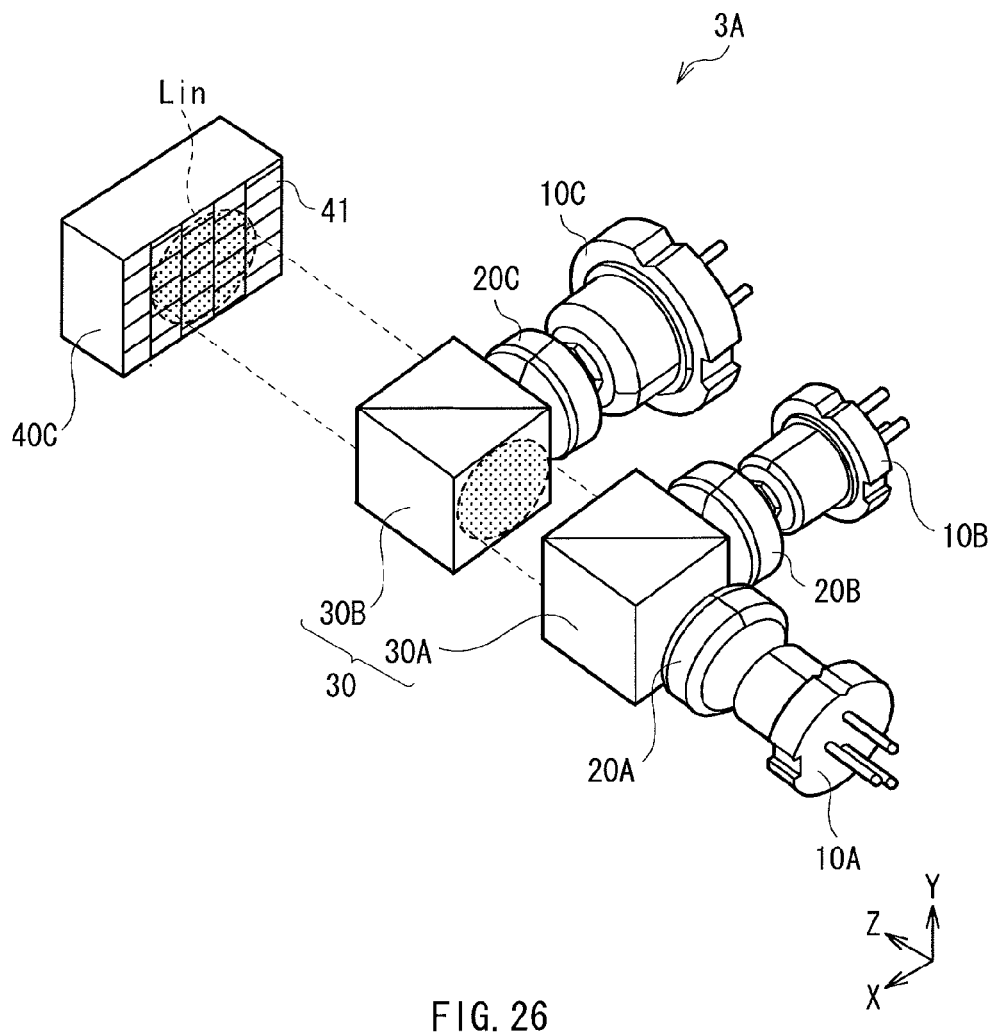
FIG. 26 illustrates an exemplary structure of main parts of the illumination optical system of FIGS. 25A and 25B in perspective.

As in an example of FIG. 26, the structure of this illumination optical system 3A differs from that of the illumination optical system 1A (see FIG. 16), because all the light sources 10A, 10B, and 10C and any other optical members are not inclined (not rotated). Accordingly, in the illumination optical system 3A, as in an example shown in FIG. 27, the major axis of the luminance distribution (Lind) of a light beam incident on the fly-eye lens 40C is not inclined (rotated) with respect to any of the array directions of the cells 41, as opposed to the illumination optical system 1A (see FIGS. 15A and 15B) (similar to the comparative example of FIG. 20).

Figure 27:
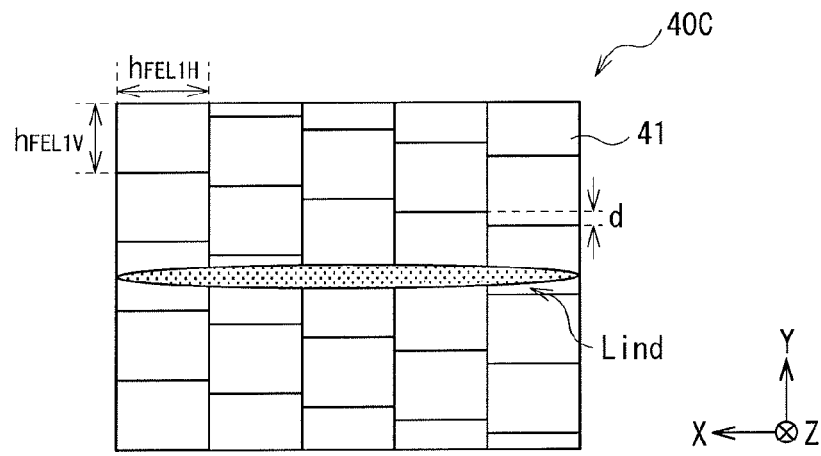
FIG. 27 schematically illustrates exemplary detailed structure of the primary fly-eye lens shown in FIG. 26.

In the fly-eye lens 40C of the illumination optical system 3A, positions of the cells 41 in the vertical direction (Y axis or second direction) are different from one another at least partially among a plurality of cell rows arranged along the lateral direction (X axis or first direction), as in the example of FIG. 27. Specifically, the fly-eye lens 40C has a misalignment structure where the cells 41 are shifted from one another among the cell rows in a direction along the minor axis (in the vertical direction) orthogonal to the major axis (lateral direction) of the luminance distribution (Lind) of the incident light beam. To give one example, the positions of the cells 41 in the lateral direction are shifted in the same direction between adjacent cell rows among the cell rows arranged in the vertical direction (shift amount; "d"), as in the example of FIG. 27. In this case, it is preferable that the shift amount "d" between the adjacent cell rows satisfy the following relational equation.

$$d=(h_{FEL1V}/n_H),$$

where $h_{FEL1V}$: a size of one cell 41 in the fly-eye lens 40C in the second direction, and $n_H$: the number of cells 41 in the fly-eye lens 40C in the first direction (the number of cells 41).

[Function and Effect of Projector 3]

Figure 28:
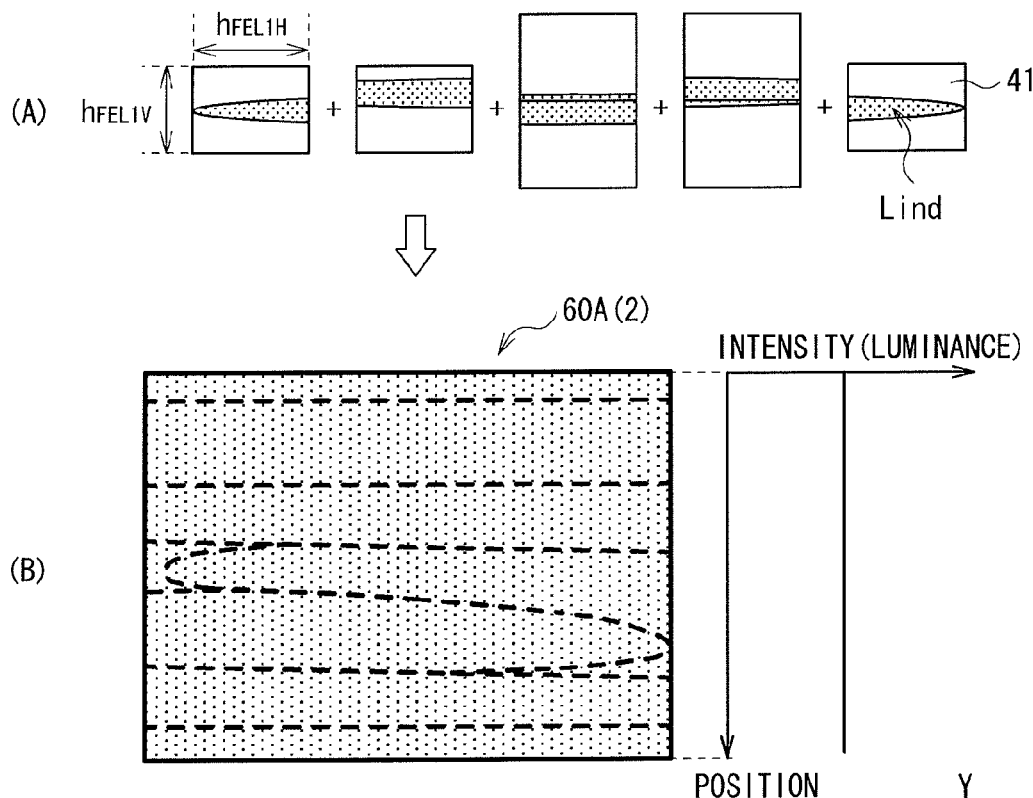
FIG. 28 illustrates a function of decreasing the degree of luminance non-uniformity by the illumination optical system of the second embodiment.

The present embodiment having the configuration discussed above, similar to that of the first embodiment, makes it easier for the integrator 43 to decrease the degree of the luminance non-uniformity of the incident light beam, even when a laser light beam, which the light source containing the chip 11A configured of an LD emits, exhibits a sharp luminance distribution shape. Specifically, the cells 41 of the fly-eye lens 40C overlay the incident light beams of the luminance distribution (Lind), as in an example in (A) of FIG. 28, thereby decreasing the degree of the luminance non-uniformity of the illumination light or displayed light effectively, as in an example in (B) of FIG. 28. Consequently, this embodiment also makes it possible to decrease the degree of the luminance non-uniformity of the illumination light or displayed light effectively (to prevent the occurrence of the luminance non-uniformity in this embodiment), thereby exhibiting the improved display quality.

Especially when the shift amount "d" between the adjacent cells 41 in the fly-eye lens 40C satisfies the relational equation shown by $d=(h_{FEL1V}/n_H)$, the degree of the luminance non-uniformity of the illumination light and the displayed light is decreased more effectively. Similar to the description in the first embodiment, if the incident light of the luminance distribution (Lind) is irradiated across the whole width (period) of the fly-eye lens 40A and over the multiple cells in the vertical direction, then nonuniform luminance distribution patterns may appear on a displayed image at regular intervals. In this case, the significant effect on the decrease in the degree of the luminance non-uniformity of the illumination light may not be provided.

Note that the structure of the fly-eye lens 40C of this embodiment is not limited to the misalignment structure where the positions of the cells 41 in the lateral direction are shifted in the same direction between the adjacent cell rows among the cell rows arranged in the vertical direction, as in the example of FIG. 27 and an example of FIG. 29A. Alternatively, the fly-eye lens 40C may have another misalignment structure. Specifically, the fly-eye lens 40C may employ any other misalignment structure, as long as the positions of the cells 41 in the vertical direction are different from one another at least partially among the cell rows arranged in the lateral direction. In more detail, the fly-eye lens 40C may have a misalignment structure where the respective shift amounts between the cell rows adjacent to each other in the lateral direction are provided in different directions (for example, upper and lower directions), as in an example shown in FIG. 29B. Alternatively, the cells 41 may not be shifted between some of the respective cell rows adjacent to each other in the lateral direction, i.e., a region may be present in which the misalignment is not provided between the cell rows adjacent to each other in the lateral direction, as in an example of FIG. 29C. In addition, the fly-eye lens 40C may have a misalignment structure where the cells 41 are shifted in alternate directions between the respective cell rows adjacent to each other in the lateral direction (in a zigzag form), as in an example of FIG. 29D.

Third Embodiment

Figures 30A, 30B:
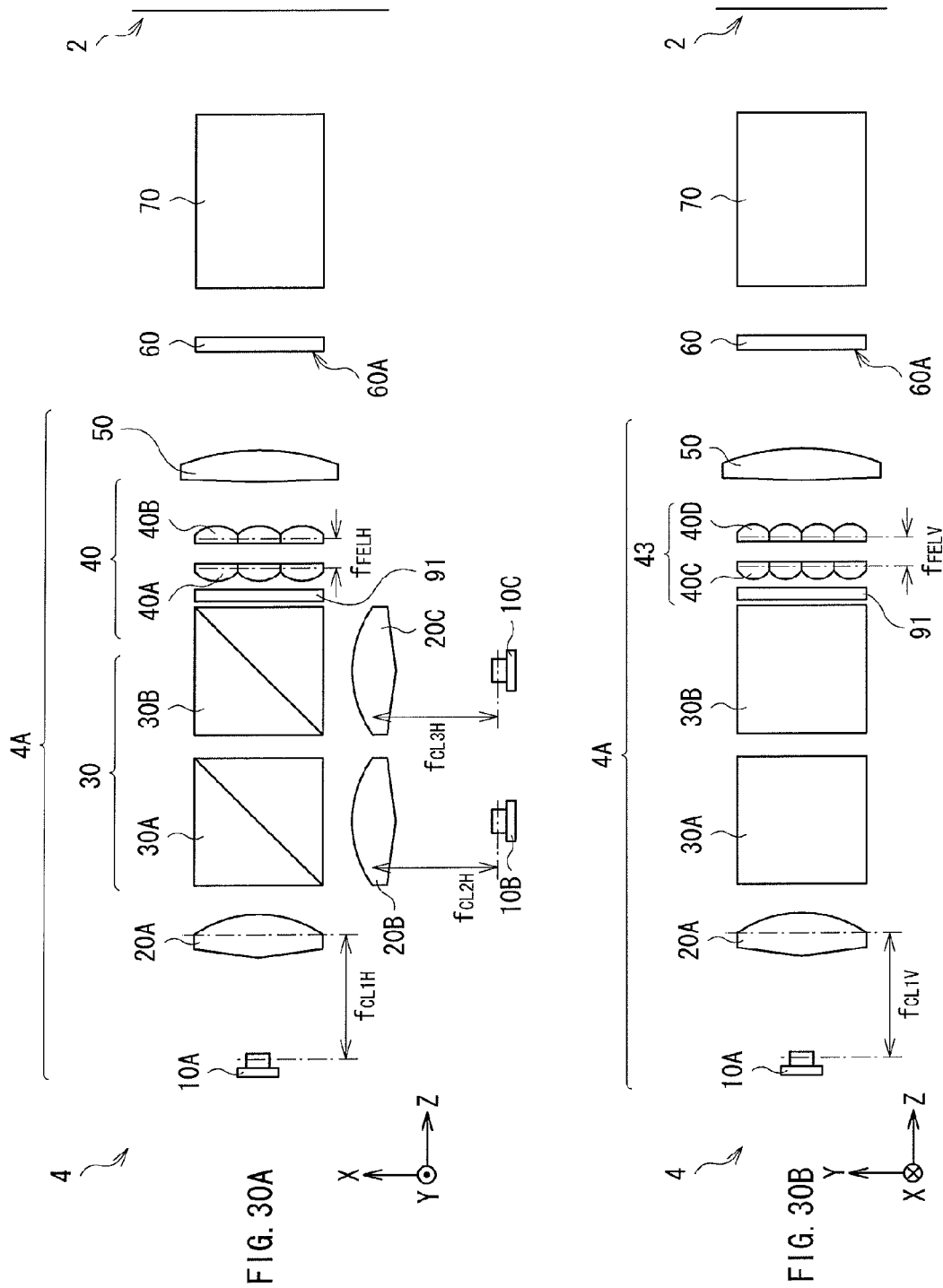
FIGS. 30A and 30B illustrate a schematic structure of a projector according to a third embodiment of the present disclosure.

FIG. 30 shows a schematic structure of a projector (projector 4) according to a third embodiment of the present disclosure. This projector 4 corresponds to one concrete example of the "projection display unit" according to an embodiment of the present disclosure. FIG. 30A shows an exemplary structure of the projector 4 from the above (in a Y-axis direction), and FIG. 30B shows the exemplary structure of the projector 4 from the side (in an X-axis direction).

The projector 4 of this embodiment is provided with an illumination optical system 4A, and therefore, a structure thereof differs from that of the projector 1 provided with the illumination optical system 1A. Accordingly, the following description will be mainly focused on differences from the projector 1, and the description of the same points will be omitted as appropriate. The illumination optical system 4A corresponds to a concrete example of the "illumination unit" according to an embodiment of the present disclosure.

[Structure of Illumination Optical System 4A]

The illumination optical system 4A has a configuration in which an anamorphic lens 91, which will be described later, is provided on the optical path between the optical path unifying device 30 and the integrator 40 in the illumination optical system 1A.

Figure 31:
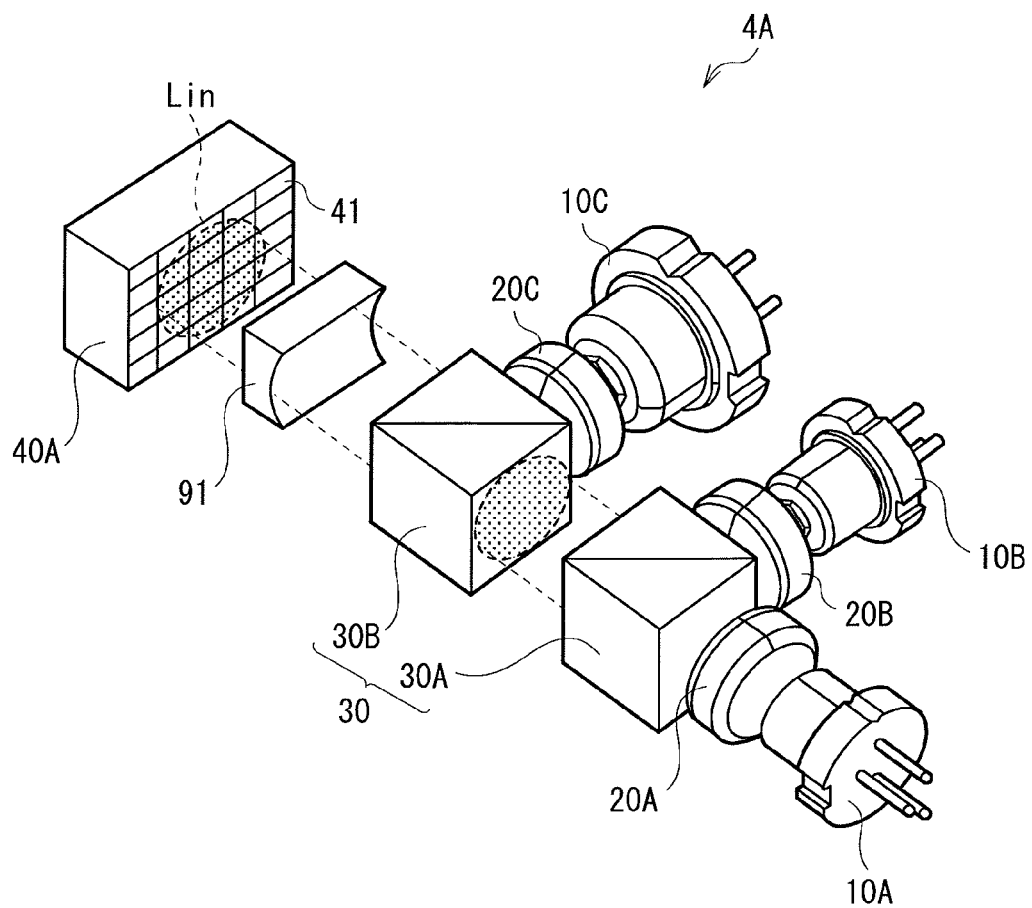
FIG. 31 illustrates an exemplary structure of main parts of the illumination optical system of FIGS. 30A and 30B in perspective.

As in an example of FIG. 31, the structure of this illumination optical system 4A differs from that of the illumination optical system 1A (see FIG. 16), because all the light sources 10A, 10B, and 10C and any other optical members are not inclined (not rotated). Accordingly, in the illumination optical system 4A, as in an example shown in FIG. 32, the major axis of the luminance distribution (Lind) of a light beam incident on the fly-eye lens 40A is not inclined (rotated) with respect to any of the array directions of the cells 41, as opposed to the illumination optical system 1A (see FIGS. 15A and 15B) (similar to the comparative example of FIG. 20 and the illumination optical system 3A of the second embodiment).

Figure 32:
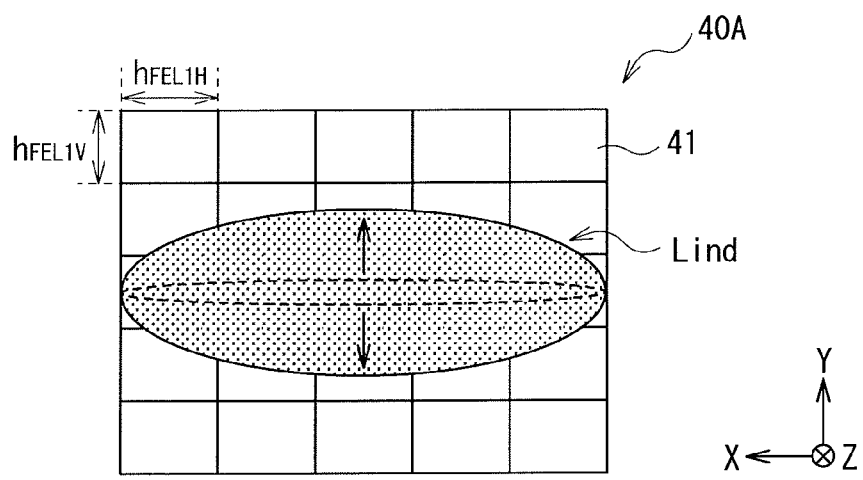
FIG. 32 schematically illustrates an effect of an anamorphic lens shown in FIG. 31.

The anamorphic lens 91 is an optical device for expanding the luminance distribution (Lind) shape of a light beam incident on the fly-eye lens 40A in the direction parallel to the minor axis (in a Y-axis or second direction), as denoted by arrows in an example shown in FIG. 32. This anamorphic lens 91 may be implemented by, for example, a cylindrical lens (lenticular lens), and the respective optical properties (for example, focal distances) in the vertical and lateral directions (X-axis and first directions) differ from each other. Specifically, the focal distance in the lateral direction is longer than that in the vertical direction (vertical focal distance<lateral focal distance).

[Function and Effect of Projector 4]

Figure 33:
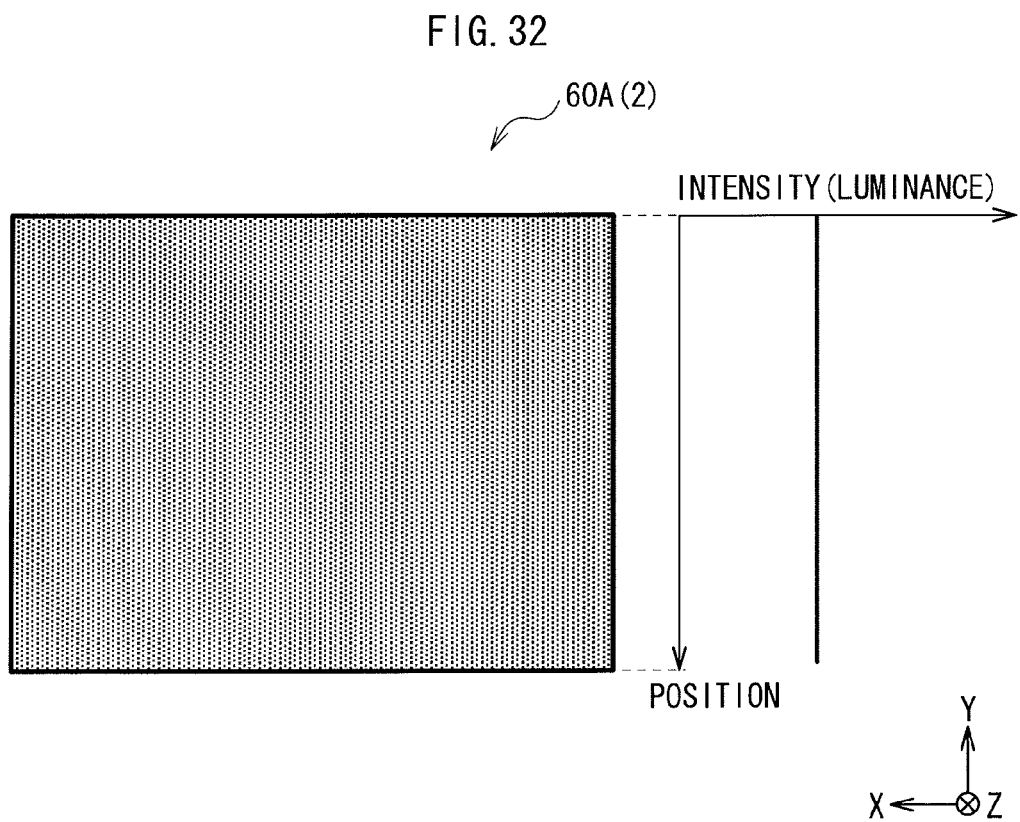
FIG. 33 illustrates the function of decreasing the degree of luminance non-uniformity by the illumination optical system of the third embodiment.

In this embodiment, the anamorphic lens 91 expands the luminance distribution (Lind) shape of the light beam incident on the fly-eye lens 40A in the direction parallel to the minor axis, as in the example of FIG. 32, thereby providing function and effect similar to those of the first embodiment. Namely, even when a laser light beam, which the light source containing a chip 11A configured of an LD emits, exhibits a sharp luminance distribution shape, the present embodiment makes it easier to decrease the degree of the luminance non-uniformity of the incident light beam by the integrator 40. Consequently, as an example shown in FIG. 33, this embodiment also makes it possible to decrease the degree of the luminance non-uniformity of the illumination light or displayed light effectively (to prevent the occurrence of the luminance non-uniformity in this embodiment), thereby exhibiting the improved display quality.

Note that the anamorphic lens 91 of this embodiment is a single independent component, although it is not limited thereto. Alternatively, the anamorphic lens 91 may be integrally formed in the coupling lenses 20A, 20B, and 20C and the like.

Fourth Embodiment

Figures 34A, 34B:
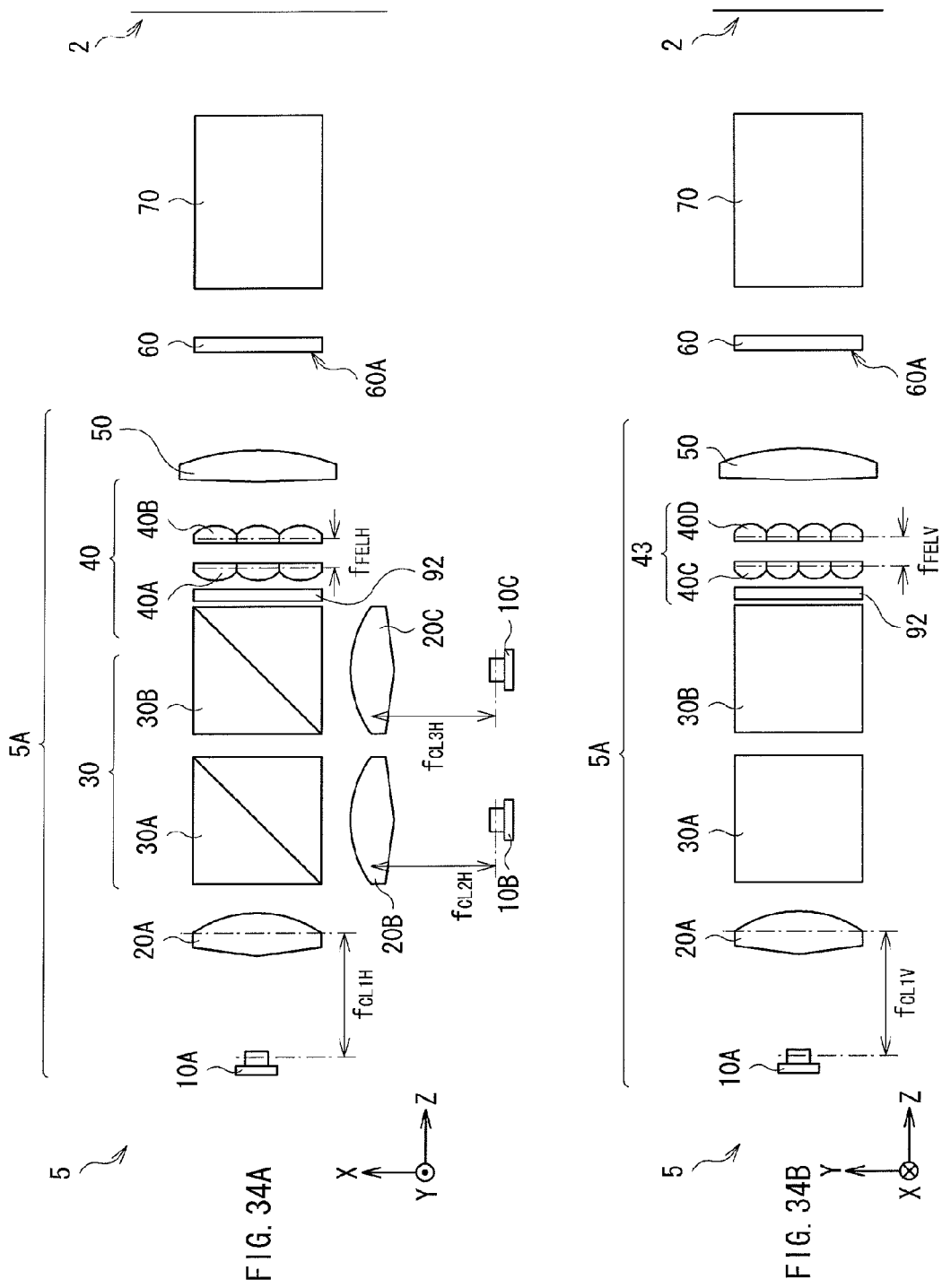
FIGS. 34A and 34B illustrate a schematic structure of a projector according to a fourth embodiment of the present disclosure.

FIGS. 34A and 34B show a schematic structure of a projector (projector 5) according to a fourth embodiment of the present disclosure. This projector 5 corresponds to a concrete example of the "projection display unit" according to an embodiment of the present disclosure. FIG. 34A shows an exemplary structure of the projector 5 from the above (in a Y-axis direction), and FIG. 34B shows the exemplary structure of the projector 5 from the side (in an X-axis direction).

The projector 5 of this embodiment is provided with an illumination optical system 5A, and therefore, a structure thereof differs from that of the projector 1 provided with the illumination optical system 1A. Accordingly, the following description will be mainly focused on the differences from the projector 1, and the description of the same points will be omitted as appropriate. The illumination optical system 5A corresponds to a concrete example of the "illumination unit" according to an embodiment of the present disclosure.

[Structure of Illumination Optical System 5A]

The illumination optical system 5A has a configuration in which an optical path branching device 92, which will be described later, is provided on the optical path between the optical path unifying device 30 and the integrator 40 in the illumination optical system 1A.

As in an example of FIG. 35, the structure of this illumination optical system 5A differs from that of the illumination optical system 1A (see FIG. 16), because all the light sources 10A, 10B, and 10C and any other optical members are not inclined (not rotated). Accordingly, in the illumination optical system 5A, as in examples shown in FIGS. 37A and 37B, the major axis of the luminance distribution (Lind) of a light beam incident on the fly-eye lens 40A is not inclined (rotated) with respect to any of the array directions of the cells 41, as opposed to the illumination optical system 1A (see FIGS. 15A and 15B) (similar to the comparative example of FIG. 20, and the illumination optical systems 3A and 4A of the second and third embodiments, respectively).

The optical path branching device 92 is an optical device for branching the optical path of an light beam to enter the fly-eye lens 40A into multiple optical paths arranged on a minor axis of the luminance distribution (Lind) (in the vertical direction in this embodiment (Y-axis or second direction)). This optical path branching device 92 may be, for example, a diffractive device 92A for outputting multiple orders of diffractive light beams as shown in FIG. 36A, or a half mirror (or prism) 92B as shown in FIG. 36B.

[Function and Effect of Projector 5]

Figure 37A:
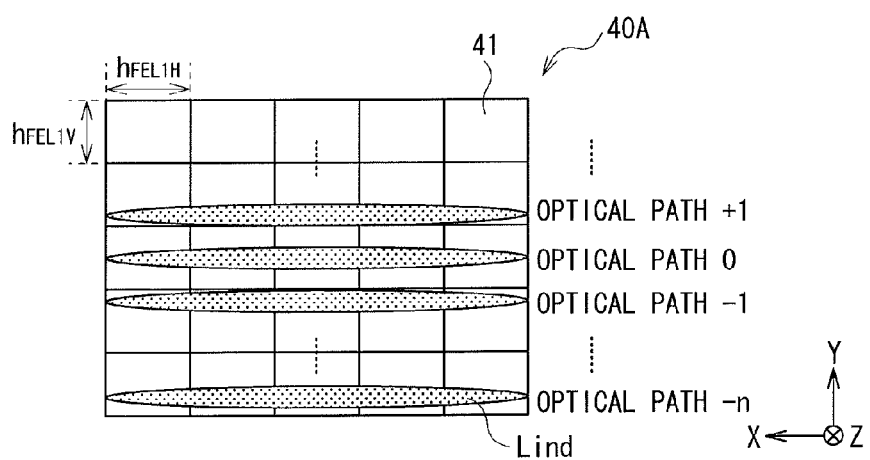
FIGS. 37A and 37B illustrate the function of decreasing the degree of luminance non-uniformity by the illumination optical system of the fourth embodiment.
Figure 37B:
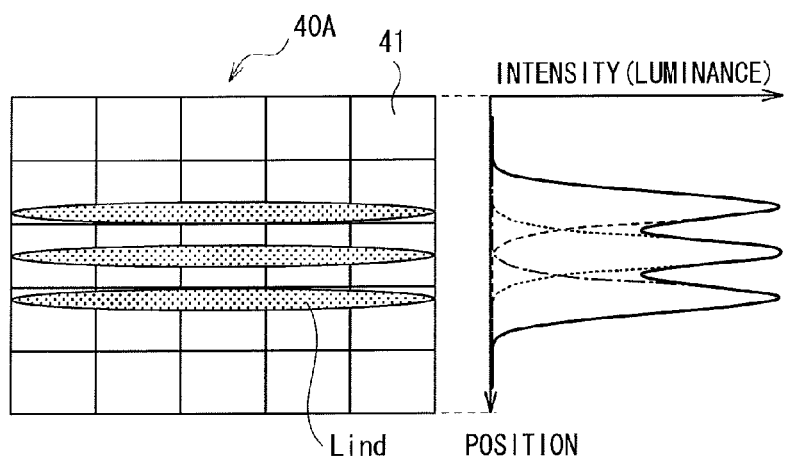

As in examples shown in FIGS. 37A and 37B, the optical path branching device 92 branches the optical path of an light beam to enter the fly-eye lens 40A into multiple optical paths arranged on the minor axis of the luminance distribution (Lind), thereby providing function and effect similar to those of the first embodiment. Thus, even when a laser light beam, which the light source containing the chip 11A configured of an LD emits, exhibits a sharp luminance distribution shape, the present embodiment makes it easier to decrease the degree of the luminance non-uniformity of the incident light beam by the integrator 40. Consequently, this embodiment also makes it possible to decrease the degree of the luminance non-uniformity of the illumination light or displayed light effectively (to prevent the occurrence of the luminance non-uniformity in this embodiment), thereby exhibiting the improved display quality.

This embodiment has been described for a case where the optical path branching device 92 is the diffractive device 92A or the half mirror (or prism) 92B, although it is not limited thereto. Alternatively, the optical path branching device 92 may be another optical component.

Fifth Embodiment

Figures 38A, 38B:
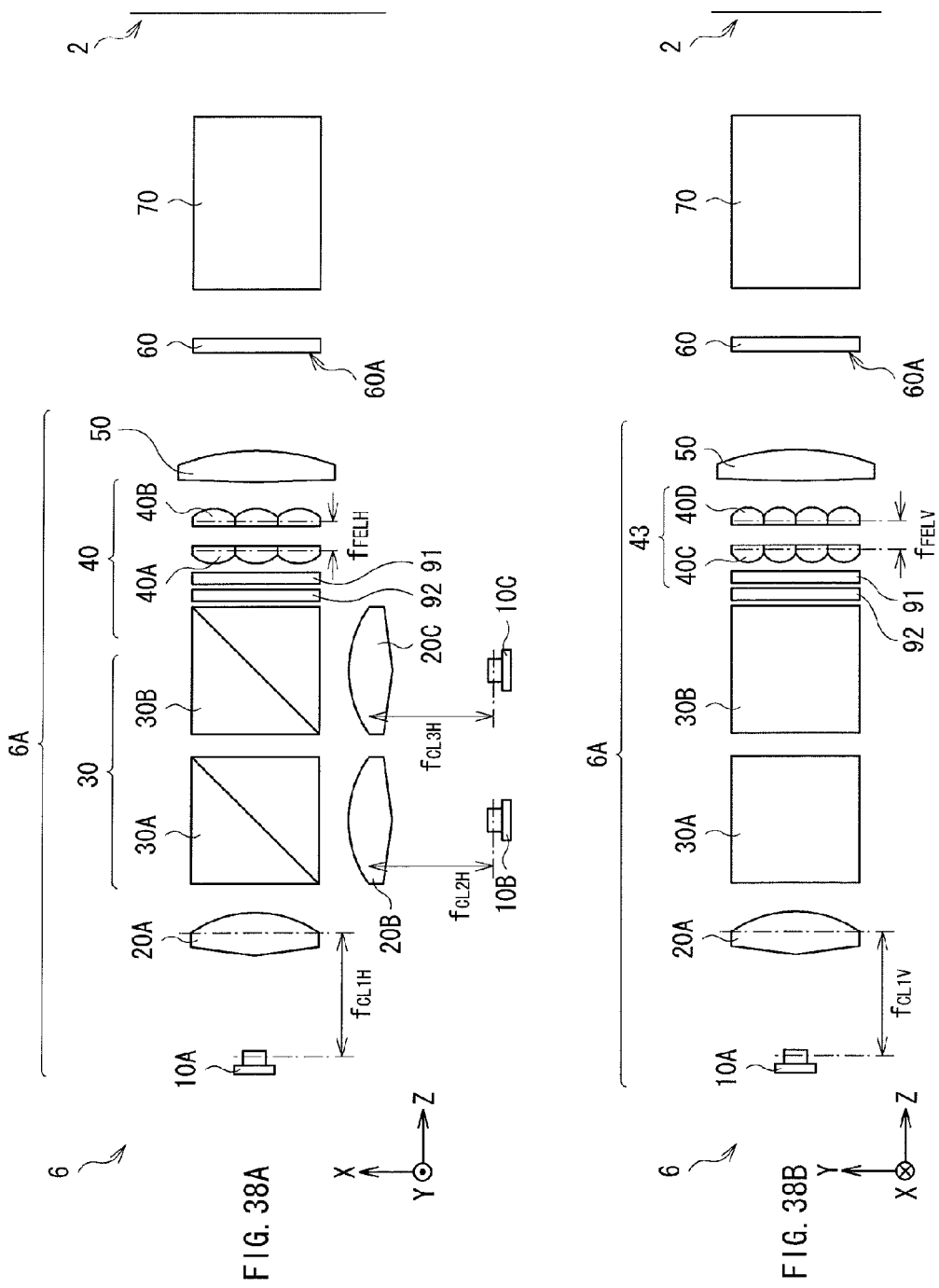
FIGS. 38A and 38B illustrate a schematic structure of a projector according to a fifth embodiment of the present disclosure.

FIGS. 38A and 38B shows a schematic structure of a projector (projector 6) according to a fifth embodiment of the present disclosure. This projector 6 corresponds to one concrete example of the "projection display unit" according to an embodiment of the present disclosure. FIG. 38A shows an exemplary structure of the projector 6 from the above (in a Y-axis direction), and FIG. 38B shows the exemplary structure of the projector 6 from the side (in an X-axis direction).

The projector 6 of this embodiment is provided with an illumination optical system 6A, and therefore, a structure thereof differs from that of the projector 1 provided with the illumination optical system 1A. Accordingly, the following description will be mainly focused on differences from the projector 1, and the description of the same points will be omitted as appropriate. The illumination optical system 6A corresponds to a concrete example of the "illumination unit" according to an embodiment of the present disclosure.

[Structure of Illumination Optical System 6A]

The illumination optical system 6A has a configuration in which the optical path branching device 92 of the fourth embodiment and the anamorphic lens 91 of the third embodiment are provided on the optical path between optical path unifying device 30 and the integrator 40 in the illumination optical system 1A, so as to be arranged in this order from the location of the optical path unifying device 30. Note that the other components and arrangements are similar to those of the illumination optical system 4A of the third embodiment or the illumination optical system 5A of the fourth embodiment.

[Function and Effect of Projector 6]

The projector 6 of this embodiment configured above achieves function and effect similar to those of the projector 4 of the third embodiment and those of the projector 5 of the fourth embodiment. Namely, the present embodiment makes it possible to decrease the degree of the luminance non-uniformity of the illumination light or displayed light effectively (to prevent the occurrence of the luminance non-uniformity in this embodiment), thereby exhibiting the improved display quality. Moreover, this embodiment makes it possible to decrease the degree of the luminance non-uniformity of the illumination light or displayed light more effectively due to the combination of the optical path branching device 92 and the anamorphic lens 91, thereby exhibiting the further improved display quality.

This embodiment has been described for the case where the optical path branching device 92 and the anamorphic lens 91 are arranged on the optical path between the optical path unifying device 30 and the integrator 40 in this order from the location of the optical path unifying device 30, although it is not limited thereto. Alternatively, the arrangement order may be the opposite. In more detail, the anamorphic lens 91 and the optical path branching device 92 may be arranged on the optical path between the optical path unifying device 30 and the integrator 40 in this order from the location of the optical path unifying device 30.

[MODIFICATIONS]

Next, a description will be given below of modifications (modifications 1 to 3) applicable to the first to fifth embodiments in common. Note that the same reference numerals are given the same components as those in the abovementioned embodiments, and the detailed description thereof is omitted as appropriate. Furthermore, the following description is given mainly for a case where the modifications are applied to the projector 1 (illumination optical system 1A) of the first embodiment. However, note that the modifications are also applicable to the projectors 3 to 6 (illumination optical systems 3A, 4A, 5A, and 6A) of the other embodiments (second to fifth embodiments, respectively).

[Modification 1]

FIGS. 39A and 39B show a schematic structure of a projector (projector 7) according to modification 1 of the embodiments of the present disclosure. This projector 7 corresponds to a concrete example of the "projection display unit" according to an embodiment of the present disclosure. FIG. 39A shows an exemplary structure of the projector 7 from the above (in a Y-axis direction), and FIG. 39B shows the exemplary structure of the projector 7 from the side (in an X-axis direction).

The projector 7 of this modification is provided with an illumination optical system 7A and a reflection type device functioning as the spatial modulation device 60 and, therefore a structure thereof differs from that of the projector 1 provided with the illumination optical system 1A. Accordingly, the following description will be mainly focused on differences from the projector 1, and the description of the same points will be omitted as appropriate. The illumination optical system 7A corresponds to a concrete example of the "illumination unit" according to an embodiment of the present disclosure.

The illumination optical system 7A is provided with a condenser lens 50A, instead of the condenser lens 50 in the illumination optical system 1A. This condenser lens 50A serves a purpose of converting the light beams from the multiple light sources formed by the integrator 40 into collimated light beams and irradiating a condenser lens 50B with the light beams through a polarization beam splitter 51.

In this modification, the spatial modulation device 60 is configured from, for example, a reflection type liquid crystal panel or some other reflection type device, as described above. Accordingly, the projector 7 is provided with the condenser lens 50B and the polarization beam splitter 51, as opposed to the projector 1. The polarization beam splitter 51 is an optical member for selectively allowing light of a specific polarization (for example, P polarization) to pass therethrough and selectively reflecting light of another polarization (for example, S polarization). The spatial modulation device 60 applies light modulation to the light beam, while reflecting the light beam such that the respective polarizations (for example, S and P polarizations) of the input and output light beams differ from each other. Consequently, the light beam (for example, light of S polarization) from the illumination optical system 7A is selectively reflected by the polarization beam splitter 51, and enters the spatial modulation device 60. Meanwhile, the image light (for example, light of P polarization) from the spatial modulation device 60 is selectively made to pass through the polarization beam splitter 51, and enters the projection optical system 70. The condenser lens 50B collects the light beams, which is output from the multiple light sources formed by the integrator 40 through the condenser lens 50A and the polarization beam splitter 51, and overlays the light beams onto the illumination region 60A.

The projector 7 configured above of this modification also provides function and effect similar to those of the projector 1 of the first embodiment and the like.

The projector 7 of this modification has a size in the X-axis direction that is longer than that in the Y axis, on a plane (parallel to the X-Y plane) perpendicular to the optical axis of the integrator 40. Accordingly, by aligning the minor axis (parallel to the Y axis) of the outer frame of the projector 7 with those of the FFPs of the light beams from the individual light emitting spots, the whole projector 7 is advantageously made compact.

[Modification 2]

Figures 40A, 40B:
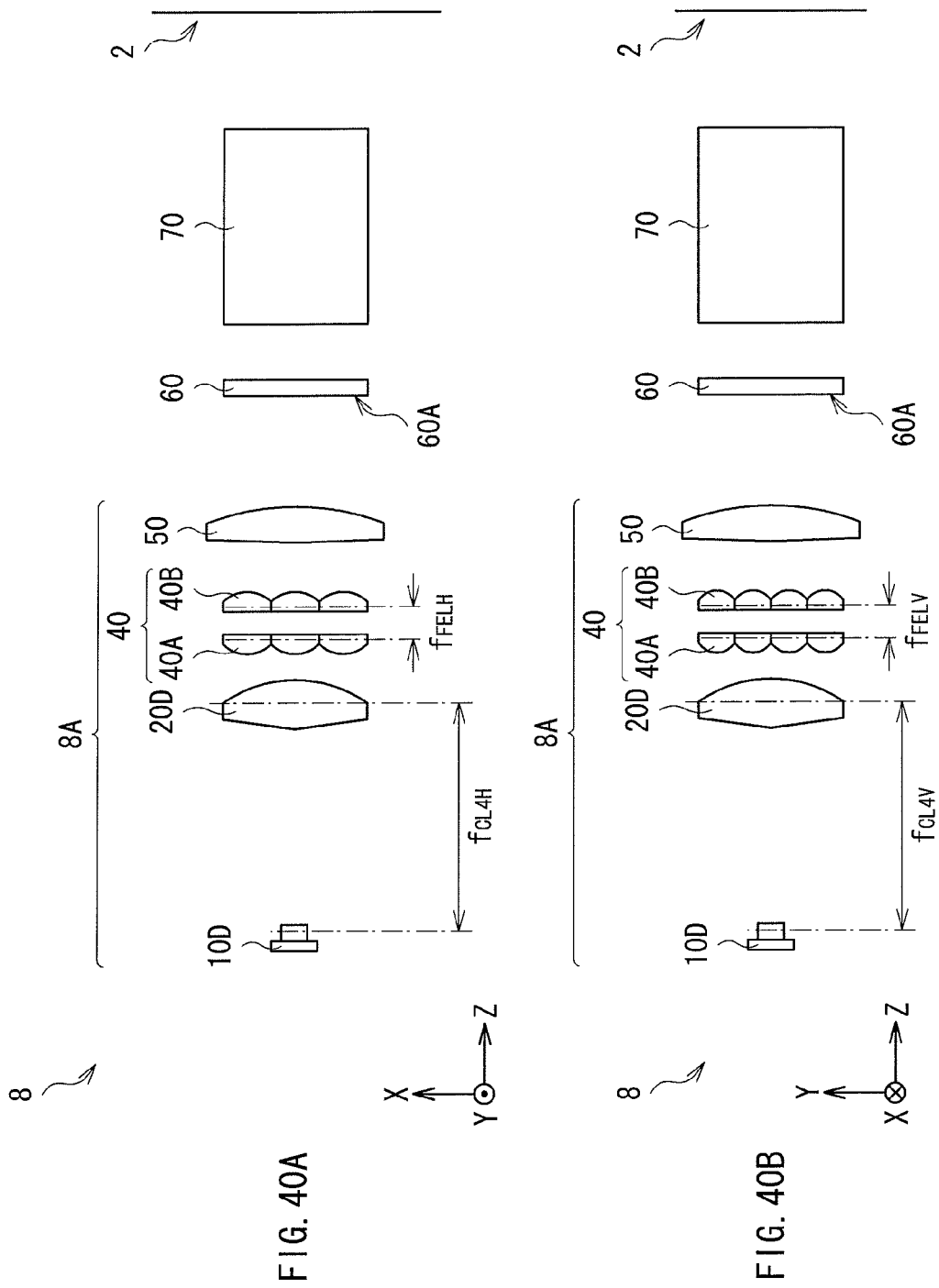
FIGS. 40A and 40B illustrate a schematic structure of a projector according to modification 2 of the first to fifth embodiments.

FIGS. 40A and 40B show a schematic structure of a projector (projector 8) according to modification 2 of the embodiments of the present disclosure. This projector 8 corresponds to a concrete example of the "projection display unit" according to an embodiment of the present disclosure. FIG. 40A shows an exemplary structure of the projector 8 from the above (in a Y-axis direction), and FIG. 40B shows the exemplary structure of the projector 8 from the side (in an X-axis direction). Furthermore, FIGS. 41A and 41B show an example of optical paths in the projector 8 of FIGS. 40A and 40B. FIG. 41A shows the exemplary optical paths in the projector 8 from the above (in a Y-axis direction), and FIG. 40B shows the exemplary optical path in the projector 8 from the side (in an X-axis direction).

The projector 8 of this modification is provided with an illumination optical system 8A, and therefore, a structure thereof differs from that of the projector 1 provided with the illumination optical system 1A. Accordingly, the following description will be mainly focused on differences from the projector 1, and the description of the same points will be omitted as appropriate. The illumination optical system 8A corresponds to a concrete example of the "illumination unit" according to an embodiment of the present disclosure.

In the illumination optical system 8A, the light sources 10A, 10B, and 10C and the dichroic mirrors 30A and 30B are eliminated from the illumination optical system 1A, and a light source 10D is provided instead. The light source 10D is placed on an optical axis of a coupling lens 20D, so that a light beam output from the light source 10D directly enters the coupling lens 20D.

The light source 10D includes, for example, the solid-state light emitting device 11, and the package 12 for supporting and covering the solid-state light emitting device 11 (or a base material on which the solid-state light emitting device 11 is to be mounted). Thus, in this case, the chip 11A is an upper surface emitting type device. Alternatively, the light source 10D may be implemented by a can where the solid-state light emitting device 11 configured of one or more end face emitting type chips 11A is placed within the inner space defined by the stem 13 and the cap 14. In this case, the chip 11A is an end surface emitting type device.

The solid-state light emitting device 11 in the light source 10D has the light emitting region configured of one or more light emitting spots of a dot or non-dot shape, and from this the light emitting region, one or more light beams are emitted. The solid-state light emitting device 11 in the light source 10D may be configured of, for example, the single chip 11A for emitting a light beam of a predetermined wavelength, or the multiple chips 11A for emitting light beams of the same wavelength or different wavelengths. When the solid-state light emitting device 11 is configured of the multiple chips 11A in the light source 10D, the chips 11A may be arranged, for example, laterally in a line or arranged laterally and longitudinally, namely, in a matrix form.

The chip 11A may be an LED, OLED, or LD. In any case, however, one or more of the chips 11A included in the light source 10D is configured by the LD.

If the solid-state light emitting device 11 in the light source 10D is configured of the multiple chips 11A, then the chips 11A may be ones for emitting light beams of the same wavelength or different wavelengths. Moreover, all of the chips 11A may be ones for emitting light beams having a wavelength of approximately 400 nm to 500 nm (B), approximately 500 nm to 600 nm (G), or approximately 600 nm to 700 nm (R). Furthermore, when the solid-state light emitting device 11 in the light source 10D is configured of the multiple chips 11A, the chips 11A may be, for example, a combination of ones for emitting light beams having a wavelength of approximately 400 nm to 500 nm (B), approximately 500 nm to 600 nm (G), and approximately 600 nm to 700 nm (R).

[Modification 3]

Figure 42:
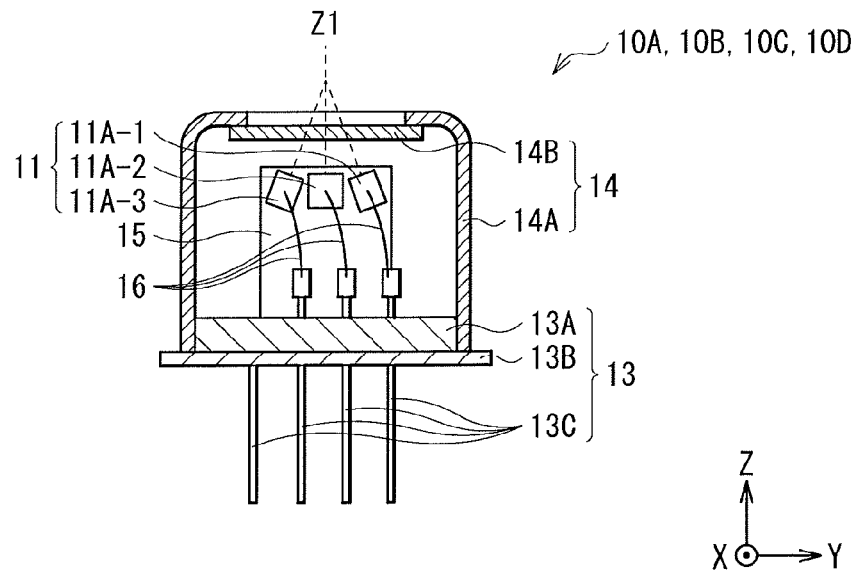
FIG. 42 illustrates a cross section of an exemplary light source according to modification 3 of the first to fifth embodiments.

FIG. 42 shows an example of a cross section of the light source (light source 10A, 10B, 10C, or 10D) according to modification 3. The light source of this modification differs from the abovementioned light sources, and has the following structure. Specifically, at least one of the chips 11A configured of LDs in the abovementioned first light source (for example, light source 10A, 10B, 10C, or 10D) is positioned angled with respect to an optical axis Z1. In more detail, among three chips 11A-1, 11A-2, and 11A-3, the chips 11A-1 and 11A-3 are positioned angled with respect to the optical axis Z1 of a second light source. In contrast to the chips 11A-1 and 11A-3, the remaining chip 11A-2 is positioned parallel to the optical axis Z1. Accordingly, the light beam emitted from the chip 11A-2 travels on an optical axis parallel to the optical axis Z1, while the respective light beams emitted from the chips 11A-1 and 11A-3 travel on optical axes angled with respect thereto. Thus, in this modification, the intensities of the light beams after the change in the optical paths (combining of the optical paths) are peaked on the optical axis Z1.

Figure 43:
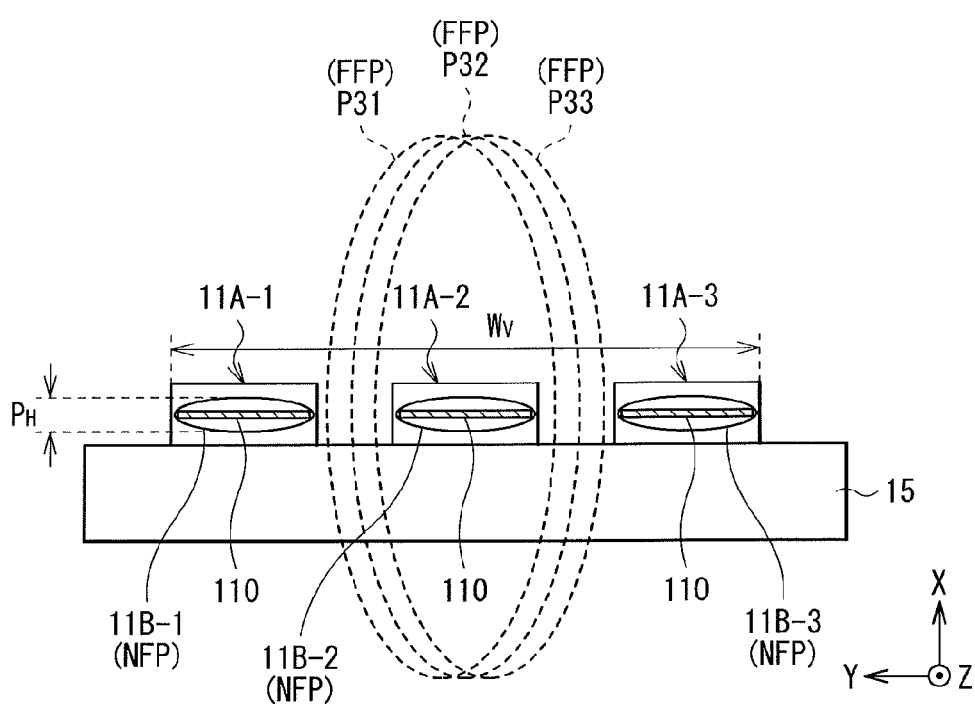
FIG. 43 illustrates an exemplary arrangement of FFPs and light emitting spots formed on a light source of FIG. 42.

Even in this modification, as in an example shown in FIG. 43, it is preferable that the minor axes of the FFPs of the laser beams from the light emitting spots 11B-1, 11B-2, and 11B-3 on the chips 11A-1, 11A-2, and 11A-3, respectively, be substantially aligned with the minor axis (parallel to the Y axis in this case) on a plane perpendicular to the optical axis of the integrator 40. Furthermore, if the first light source emits light beams of two or more different wavelengths, then it is preferable that the major axes (parallel to the X axis in this case) of the FFPs of the light beams from the light emitting spots 11B-1, 11B-2, and 11B-3 be substantially aligned with one another.

[Other Modifications]

Up to this point, the explanation has been given of the embodiments of the present disclosure and the modifications applicable to the embodiments. However, the present disclosure is not limited thereto, and other various modifications to the present disclosure may be made.

In the above embodiments, the illumination optical systems 1A, 3A, 4A, 5A, 6A, 7A, and 8A employ an infinity optical system in which the collimated light beam enters the fly-eye lens 40A or 40C. However, alternatively, the illumination optical systems 1A, 3A, 4A, 5A, 6A, 7A, and 8A may employ a finite optical system in which a convergent or divergent light beam enters the fly-eye lens 40A or 40C, instead of the infinity optical system. In this case, in these embodiments, respective directivity angle changing devices which have a function of converging or diverging the light beams from the light sources 10A to 10D may be provided, instead of the coupling lens 20A to 20D. However, it is preferable that the optical magnification determined by the directivity angle changing devices and the fly-eye lenses 40A (or 40C) and 40B be adjusted such that the sizes of the light source images S which the cells 41 of the fly-eye lens 40A or 40C forms on the fly-eye lens 40B are not larger than the sizes of the corresponding cells 42 of the fly-eye lens 40B. In other words, it is preferable that the optical magnification determined by the directivity angle changing devices and the fly-eye lenses 40A (or 40C) and 40B have a relationship defined by the following relational equation. Moreover, it is preferable that if the cells 41 and 42 of the fly-eye lenses 40A, 40B, and 40C have an aspect ratio other than 1, then the illumination optical systems 1A, 3A, 4A, 5A, 6A, 7A, and 8A employ the anamorphotic optical system, $$h = P \times m \leq h_{FEL2},$$

where m: denotes an optical magnification determined by the directivity angle changing devices and the fly-eye lenses 40A (or 40C) and 40B.

The elements or components of the above-mentioned illumination optical systems and projectors may be combined in any combination. Specifically, for example, the structure of the illumination optical system 1A of the first embodiment and any of the structure of the illumination optical systems 3A, 4A, 5A, and 6A of the second to fifth embodiments, respectively, may be combined. In addition, for example, the structure of the illumination optical system 3A of the second embodiment and any of the structures of the illumination optical systems 4A, 5A, and 6A of the third to fifth embodiments, respectively, may be combined. Thus, the combination of the elements or the components according to the embodiments decreases the degree of the luminance non-uniformity synergistically, thereby further improving the display quality.

Figure 44:
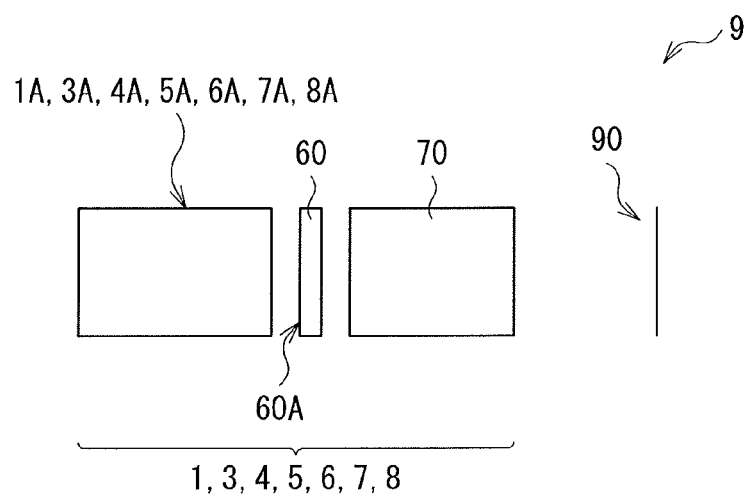
FIG. 44 schematically illustrates an exemplary rear-projection display unit to which the illumination optical system according to any one of the first to the fifth embodiments and the modifications 1 to 3 is applied.

In the above embodiments and the modifications, the explanation has been given for the case where the illumination optical systems 1A, 3A, 4A, 5A, 6A, 7A and 8A are applied to the projection display unit. However, these illumination optical systems are applicable to other display units. As in an example shown in FIG. 44, the illumination optical systems 1A, 3A, 4A, 5A, 6A, 7A and 8A may be applicable to a rear-projection display unit 9. This rear-projection display unit 9 includes any of the projectors 1, 3, 4, 5, 6, 7, and 8 having the illumination optical systems 1A, 3A, 4A, 5A, 6A, 7A, and 8A, respectively, (or a combination of any of them) and a light-transmitting type screen (transmissive screen) 90 on which the image light projected by the projector 1, 3, 4, 5, 6, 7, 8 or the like (projection optical system 70) is to appear. Using of the illumination optical system 1A, 3A, 4A, 5A, 6A, 7A, 8A or the like decreases the degree of the luminance non-uniformity of illumination light (image light or displayed light), thereby improving the display quality.

In the above embodiments and the modifications, the explanation has been given for the case where the spatial modulation device 60 is implemented by a light-transmitting type or reflection type device, although it is not limited thereto. Alternatively, the spatial modulation device 60 may be configured from a digital micro-mirror device (DMD).

In the abovementioned embodiments and the modifications, the explanation has been given by citing various elements and components for use in the illumination optical systems and the display units. However, the illumination optical systems and the projector according to the embodiments and the modifications are not necessary to includes all the elements and the components. Also, other additional elements and components may be further provided therein.

In the above embodiments and the modifications, the explanation has been given for the case where the illumination units are applied to the projection display units. However, the application of the illumination units is not limited to projection display units. Alternatively, it may be applied to exposure devices such as steppers.

It is possible to achieve at least the following configurations (1) to (15) from the above-described example embodiments and the modifications of the disclosure.

(1) An illumination unit, including:
one or more light sources each including a solid-state light-emitting device configured to emit light from a light emission region including a single or a plurality of light-emitting spots; and
an optical member allowing the light incident from the solid-state light-emitting device to pass therethrough and exit therefrom,
the solid-state light-emitting device including a single chip or a plurality of chips each emitting the light,
wherein
one or more of the chips in the one or more light sources as a whole is a laser diode,
the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device,
each of the first fly-eye lens and the second fly-eye lens has a plurality of cells, the cells of the first fly-eye lens being arranged in a first direction and a second direction that intersect each other, and
positions of the cells in the second direction are different from one another at least partially among a plurality of cell rows arranged along the first direction in the first fly-eye lens.
(2) The illumination unit according to (1), wherein the first fly-eye lens has a misalignment structure among the cell rows, in a direction orthogonal to a major axis direction of a shape of a luminance distribution of incidence light on an incidence plane of the first fly-eye lens.
(3) The illumination unit according to (1) or (2), wherein the positions of the cells in the second direction are shifted in a same direction between adjacent cell rows among the cell rows arranged along the first direction.
(4) The illumination unit according to (3), wherein an amount "d" by which the cells are shifted between the adjacent cell rows satisfies a relational equation:

$$d=(h_{FEL1y}/n_x)$$

where $h_{FEL1y}$ is a size of one of the cells in the first fly-eye lens in the second direction, and $n_x$ is the number of cells in the first fly-eye lens in the first direction.
(5) The illumination unit according to any one of (1) to (4), further including an optical device disposed on an optical path between the first fly-eye lens and the one or more light sources including the one or more chips configured by the laser diode, the optical device allowing a shape of a luminance distribution of incidence light on an incidence plane of the first fly-eye lens to be expanded along a minor axis direction of the shape of the luminance distribution.
(6) The illumination unit according to (5), wherein the optical device includes an anamorphic lens having a focal distance in the first direction that is longer than a focal distance in the second direction.
(7) The illumination unit according to (5) or (6), further including an optical path branching device provided on the optical path between the first fly-eye lens and the one or more light sources including the one or more chips configured by the laser diode, the optical path branching device branching an optical path of the incidence light into a plurality of optical paths along the minor axis direction of the shape of the luminance distribution of the incidence light.
(8) The illumination unit according to (7), wherein the optical path branching device includes a diffractive device, a half mirror, or a prism.
(9) The illumination unit according to any one of (1) to (4), further including an optical path branching device provided on an optical path between the first fly-eye lens and the one or more light sources including the one or more chips configured by the laser diode, the optical path branching device branching an optical path of incident light on an incidence plane of the first fly-eye lens into a plurality of optical paths along a minor axis direction of a shape of a luminance distribution of the incidence light.
(10) The illumination unit according to (9), wherein the optical path branching device includes a diffractive device, a half mirror, or a prism.
(11) The illumination unit according to any one of (1) to (10), the first fly-eye lens is disposed substantially in a focal position of the second fly-eye lens, and the second fly-eye lens is disposed substantially in a focal position of the first fly-eye lens.
(12) The illumination unit according to any one of (1) to (11), wherein the optical member includes:
one or more traveling-direction angle conversion devices each converting a traveling-direction-angle of the light incident from the solid-state light-emitting device; and
the integrator uniformalizing the illuminance distribution of the light in the predetermined illumination region illuminated by the light having passed through the one or more traveling-direction angle conversion devices.
(13) The illumination unit according to any one of (1) to (12), wherein the one or more light sources is formed in a manner of a package incorporating the solid-state light-emitting device, or is formed in a manner of a package where the solid-state light-emitting device is mounted on a substrate.
(14) A projection display unit, including:
an illumination optical system;
a spatial modulation device modulates, based on a picture signal inputted, light from the illumination optical system to thereby generate image light; and
a projection optical system projecting the image light generated by the spatial modulation device,
the illumination optical system including
one or more light sources each including a solid-state light-emitting device configured to emit light from a light emission region including a single or a plurality of light-emitting spots, and
an optical member allowing the light incident from the solid-state light-emitting device to pass therethrough and exit therefrom, the solid-state light-emitting device including a single chip or a plurality of chips each emitting the light,
wherein
one or more of the chips in the one or more light sources as a whole is a laser diode,
the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device,
each of the first fly-eye lens and the second fly-eye lens has a plurality of cells, the cells of the first fly-eye lens being arranged in a first direction and a second direction that intersect each other, and
positions of the cells in the second direction are different from one another at least partially among a plurality of cell rows arranged along the first direction in the first fly-eye lens.

(15) A direct view display unit, including:
an illumination optical system;
a spatial modulation device modulates, based on a picture signal inputted, light from the illumination optical system to thereby generate image light;
a projection optical system projecting the image light generated by the spatial modulation device; and
a transmissive screen on which the image light projected from the projection optical system is displayed,
the illumination optical system including
one or more light sources each including a solid-state light-emitting device configured to emit light from a light emission region including a single or a plurality of light-emitting spots, and
an optical member allowing the light incident from the solid-state light-emitting device to pass therethrough and exit therefrom,
the solid-state light-emitting device including a single chip or a plurality of chips each emitting the light,
wherein
one or more of the chips in the one or more light sources as a whole is a laser diode,
the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device,
each of the first fly-eye lens and the second fly-eye lens has a plurality of cells, the cells of the first fly-eye lens being arranged in a first direction and a second direction that intersect each other, and
positions of the cells in the second direction are different from one another at least partially among a plurality of cell rows arranged along the first direction in the first fly-eye lens.

The present disclosure contains subject matter related to that disclosed in Japanese Priority Patent Application JP 2011-071151 filed in the Japan Patent Office on Mar. 28, 2011, the entire content of which is hereby incorporated by reference.

It should be understood by those skilled in the art that various modification, combinations, sub-combinations and alterations may occur depending on design requirements and other factors insofar as they are within the scope of the appended claims or the equivalents thereof.

What is claimed is:
1. An illumination unit, comprising:
one or more light sources, each light source including a solid-state light-emitting device configured to emit light from a light emission region; and
an optical member allowing the light incident from each solid-state light-emitting device to pass therethrough and exit therefrom, each solid-state light-emitting device including a single chip or a plurality of chips emitting the light,
wherein
the optical member includes an integrator having a first fly-eye lens on which the light from each solid-state light-emitting device is incident and a second fly-eye lens on which the light from the first fly-eye lens is incident, the integrator providing uniformity to an illuminance distribution of light in a predetermined illumination region illuminated by the light incident from each solid-state light-emitting device,
each of the first fly-eye lens and the second fly-eye lens has a plurality of cells, the cells of the first fly-eye lens being arranged in a first direction and a second direction that intersect each other,
positions of the cells in the second direction are different from one another at least partially among a plurality of cell rows arranged along the first direction in the first fly-eye lens,
the positions of the cells in the second direction are shifted in a same direction between adjacent cell rows among the cell rows arranged along the first direction, and
an amount "d" by which the cells are shifted between the adjacent cell rows satisfies a relational equation in which $d=(h_{FEL1y}/n_x)$, where $h_{FEL1y}$ is a size of one of the cells in the first fly-eye lens in the second direction, and $n_x$ is a number of cells in the first fly-eye lens in the first direction.

2. An illumination unit, comprising:
one or more light sources, each light source including a solid-state light-emitting device configured to emit light from a light emission region; and
an optical member allowing the light incident from each solid-state light-emitting device to pass therethrough and exit therefrom, each solid-state light-emitting device including a single chip or a plurality of chips emitting the light, the optical member including an integrator having a first fly-eye lens on which the light from each solid-state light-emitting device is incident and a second fly-eye lens on which the light from the first fly-eye lens is incident, and
an optical device disposed on an optical path between the first fly-eye lens and the one or more light sources, the optical device allowing a shape of a luminance distribution of incidence light on an incidence plane of the first fly-eye lens to be expanded along a minor axis direction of the shape of the luminance distribution,
wherein
the integrator provides uniformity to an illuminance distribution of light in a predetermined illumination region illuminated by the light incident from each solid-state light-emitting device,
each of the first fly-eye lens and the second fly-eye lens has a plurality of cells, the cells of the first fly-eye lens being arranged in a first direction and a second direction that intersect each other, and positions of the cells in the second direction are different from one another at least partially among a plurality of cell rows arranged along the first direction in the first fly-eye lens.

3. The illumination unit according to claim 2, wherein the optical device includes an anamorphic lens having a focal distance in the first direction that is longer than a focal distance in the second direction.

4. The illumination unit according to claim 2, further comprising an optical path branching device provided on the optical path between the first fly-eye lens and the one or more light sources, the optical path branching device branching an optical path of the incidence light into a plurality of optical paths along the minor axis direction of the shape of the luminance distribution of the incidence light.

5. The illumination unit according to claim 4, wherein the optical path branching device includes a diffractive device, a half minor, or a prism.

6. An illumination unit, comprising:
one or more light sources, each light source including a solid-state light-emitting device configured to emit light from a light emission region; and
an optical member allowing the light incident from each solid-state light-emitting device to pass therethrough and exit therefrom, each solid-state light-emitting device including a single chip or a plurality of chips emitting the light, the optical member including an integrator having a first fly-eye lens on which the light from each solid-state light-emitting device is incident and a second fly-eye lens on which the light from the first fly-eye lens is incident,
an optical path branching device provided on an optical path between the first fly-eye lens and the one or more light sources, the optical path branching device branching an optical path of incident light on an incidence plane of the first fly-eye lens into a plurality of optical paths along a minor axis direction of a shape of a luminance distribution of the incidence light,
wherein
the integrator provides uniformity to an illuminance distribution of light in a predetermined illumination region illuminated by the light incident from each solid-state light-emitting device,
each of the first fly-eve lens and the second fly-eve lens has a plurality of cells, the cells of the first fly-eye lens being arranged in a first direction and a second direction that intersect each other, and
positions of the cells in the second direction are different from one another at least partially among a plurality of cell rows arranged along the first direction in the first fly-eye lens.

7. The illumination unit according to claim 6, wherein the optical path branching device includes a diffractive device, a half minor, or a prism.

8. An illumination unit, comprising:
one or more light sources, each light source including a solid-state light-emitting device configured to emit light from a light emission region; and
an optical member allowing the light incident from each solid-state light-emitting device to pass therethrough and exit therefrom, each solid-state light-emitting device including a single chip or a plurality of chips emitting the light,
wherein
the optical member includes an integrator having a first fly-eye lens on which the light from each solid-state light-emitting device is incident and a second fly-eye lens on which the light from the first fly-eye lens is incident, the integrator providing uniformity to an illuminance distribution of light in a predetermined illumination region illuminated by the light incident from each solid-state light-emitting device,
each of the first fly-eye lens and the second fly-eye lens has a plurality of cells, the cells of the first fly-eye lens being arranged in a first direction and a second direction that intersect each other,
positions of the cells in the second direction are different from one another at least partially among a plurality of cell rows arranged along the first direction in the first fly-eye lens,
the optical member includes:
one or more traveling-direction angle conversion devices, each traveling-direction angle conversion device converting a traveling-direction-angle of the light incident from a respective solid-state light-emitting device; and
the integrator providing uniformity to the illuminance distribution of the light in the predetermined illumination region illuminated by the light having passed through the one or more traveling-direction angle conversion devices.

9. The illumination unit according to claim 8, the first fly-eye lens is disposed substantially in a focal position of the second fly-eye lens, and the second fly-eye lens is disposed substantially in a focal position of the first fly-eye lens.

10. The illumination unit according to claim 8, wherein each solid-state light-emitting device is disposed on a package, or each solid-state light-emitting device is mounted on a substrate.

11. A projection display unit, comprising:
an illumination optical system;
a spatial modulation device that modulates, based on a picture signal inputted, light from the illumination optical system to thereby generate image light; and
a projection optical system projecting the image light generated by the spatial modulation device,
wherein,
the illumination optical system includes
(a) one or more light sources, each light source including a solid-state light-emitting device configured to emit light from a light emission region, and
(b) an optical member allowing the light incident from the solid-state light-emitting device to pass therethrough and exit therefrom, the solid-state light-emitting device including a single chip or a plurality of chips emitting the light,
the optical member includes an integrator having a first fly-eye lens on which the light from the solid-state light-emitting device is incident and a second fly-eye lens on which the light from the first fly-eye lens is incident, the integrator providing uniformity to an illuminance distribution of light in a predetermined illumination region illuminated by the light incident from the solid-state light-emitting device,
each of the first fly-eye lens and the second fly-eye lens has a plurality of cells, the cells of the first fly-eye lens being arranged in a first direction and a second direction that intersect each other,
positions of the cells in the second direction are different from one another at least partially among a plurality of cell rows arranged along the first direction in the first fly-eye lens, and
the optical member includes (a) one or more traveling-direction angle conversion devices, each traveling-direction angle conversion device converting a traveling-direction-angle of the light incident from a respective solid-state light-emitting device, and (b) the integrator providing uniformity to the illuminance distribution of the light in the predetermined illumination region illuminated by the light having passed through the one or more traveling-direction angle conversion devices.

12. The projection display unit according to claim 11, wherein one or more of the chips of the one or more light sources is a laser diode.

13. A direct view display unit, comprising:
an illumination optical system;
a spatial modulation device that modulates, based on a picture signal inputted, light from the illumination optical system to thereby generate image light;
a projection optical system projecting the image light generated by the spatial modulation device; and
a transmissive screen on which the image light projected from the projection optical system is displayed,
the illumination optical system including
(a) one or more light sources each including a solid-state light-emitting device configured to emit light from a light emission region, and
(b) an optical member allowing the light incident from each solid-state light-emitting device to pass therethrough and exit therefrom, the solid-state light-emitting device including a single chip or a plurality of chips emitting the light, wherein
one or more of the chips of the one or more light sources is a laser diode,
the optical member includes an integrator having a first fly-eye lens on which the light from each solid-state light-emitting device is incident and a second fly-eye lens on which the light from the first fly-eye lens is incident, the integrator providing uniformity to an illuminance distribution of light in a predetermined illumination region illuminated by the light incident from each solid-state light-emitting device,
each of the first fly-eye lens and the second fly-eye lens has a plurality of cells, the cells of the first fly-eye lens being arranged in a first direction and a second direction that intersect each other,
positions of the cells in the second direction are different from one another at least partially among a plurality of cell rows arranged along the first direction in the first fly-eye lens, and
the optical member includes (a) one or more traveling-direction angle conversion devices, each traveling-direction angle conversion device converting a traveling-direction-angle of the light incident from a respective solid-state light-emitting device, and (b) the integrator providing uniformity to the illuminance distribution of the light in the predetermined illumination region illuminated by the light having passed through the one or more traveling-direction angle conversion devices.

* * * * *